US012666149B2

(12) United States Patent
Kim et al.

(10) Patent No.: US 12,666,149 B2
(45) Date of Patent: Jun. 23, 2026

(54) CAMERA DEVICE WITH IMAGE SENSOR MOTIONS TO PERFORM HANDSHAKE CORRECTION FUNCTION

(71) Applicant: LG INNOTEK CO., LTD., Seoul (KR)

(72) Inventors: Jung Cheol Kim, Seoul (KR); Sang Ok Park, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 18/709,688

(22) PCT Filed: Jul. 26, 2022

(86) PCT No.: PCT/KR2022/010942
§ 371 (c)(1),
(2) Date: May 13, 2024

(87) PCT Pub. No.: WO2023/085551
PCT Pub. Date: May 19, 2023

(65) Prior Publication Data
US 2025/0016449 A1 Jan. 9, 2025

(30) Foreign Application Priority Data

Nov. 12, 2021 (KR) ........................ 10-2021-0155677

(51) Int. Cl.
*H04N 23/68* (2023.01)
*G03B 13/36* (2021.01)
(Continued)

(52) U.S. Cl.
CPC ........... *H04N 23/687* (2023.01); *G03B 13/36* (2013.01); *G03B 30/00* (2021.01); *H04N 23/52* (2023.01); *H04N 23/54* (2023.01)

(58) Field of Classification Search
CPC ...... H04N 23/687; H04N 23/52; H04N 23/54; H04N 23/55; H04N 23/57; H04N 23/60;
(Continued)

(56) References Cited

U.S. PATENT DOCUMENTS 12,238,400 B1 * 2/2025 Jozefov ................ H04N 23/695
2011/0285889 A1 * 11/2011 Cho ...................... H10F 39/011
348/308

(Continued)

FOREIGN PATENT DOCUMENTS

EP 3 817 362 A1 5/2021
JP 2020-181039 A 11/2020
(Continued)

OTHER PUBLICATIONS

International Search Report dated Nov. 16, 2022 in International Application No. PCT/KR2022/010942.
(Continued)

*Primary Examiner* — Padma Haliyur
(74) *Attorney, Agent, or Firm* — SALIWANCHIK, LLOYD & EISENSCHENK

(57) ABSTRACT

The present embodiment relates to a camera device comprising: a fixed part including a base and a housing; a first moving part moving in an optical axis direction; a second moving part including an image sensor and moving in a direction perpendicular to the optical axis direction; and a wire being disposed between the fixed part and the second moving part, wherein the second moving part includes a first substrate being disposed between the base and the first moving part and a connection substrate connecting the first substrate and the base, wherein the connection substrate includes a first region being coupled to the base, a second region being extended from the first region and bent, and a third region being connected to the second region and the
(Continued)

first substrate, and wherein one end of the wire is coupled to the fixed part, and the other end may be coupled to the second moving part.

20 Claims, 43 Drawing Sheets

(51) Int. Cl.
*G03B 30/00*        (2021.01)
*H04N 23/52*        (2023.01)
*H04N 23/54*        (2023.01)

(58) Field of Classification Search
CPC .... G03B 13/36; G03B 30/00; H02K 41/0356; H02K 33/18
See application file for complete search history.

(56)            References Cited

U.S. PATENT DOCUMENTS

| | | | |
|---|---|---|---|
| 2019/0258141 A1* | 8/2019 | Park | H04N 23/45 |
| 2021/0092297 A1 | 3/2021 | Smyth et al. | |
| 2021/0195073 A1* | 6/2021 | Saito | H04N 23/60 |
| 2021/0325628 A1 | 10/2021 | Min | |
| 2021/0341705 A1* | 11/2021 | Birnbaum | H04N 23/57 |

FOREIGN PATENT DOCUMENTS

| | | | |
|---|---|---|---|
| KR | 10-2018-0009098 A | 1/2018 |
| KR | 10-2018-0047724 A | 5/2018 |
| KR | 10-2019-0015788 A | 2/2019 |
| KR | 10-2020-0027741 A | 3/2020 |
| KR | 10-2020-0084849 A | 7/2020 |
| KR | 10-2021-0092572 A | 7/2021 |
| TW | 201910898 A | 3/2019 |
| TW | 202030512 A | 8/2020 |
| WO | 2022/015746 A1 | 1/2022 |

OTHER PUBLICATIONS

Office Action dated Jun. 16, 2025 in Korean Application No. 10-2025-0052806.
Supplementary European Search Report dated Mar. 31, 2025 in European Application No. 22892974.1.
Office Action dated Mar. 16, 2026 in Taiwanese Application No. 111133416.
Office Action dated Apr. 6, 2026 in Korean Application No. 10-2021-0155677.

* cited by examiner

FIG. 27
10
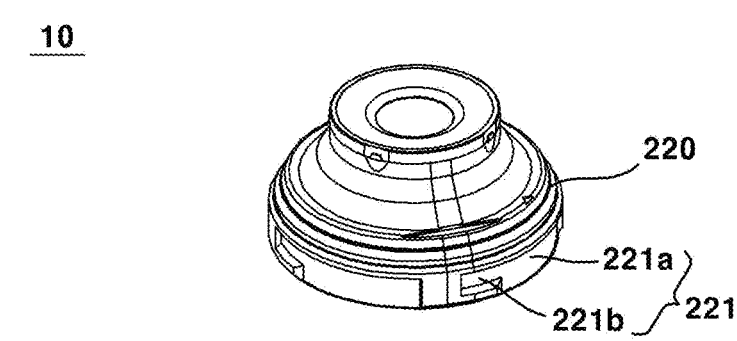
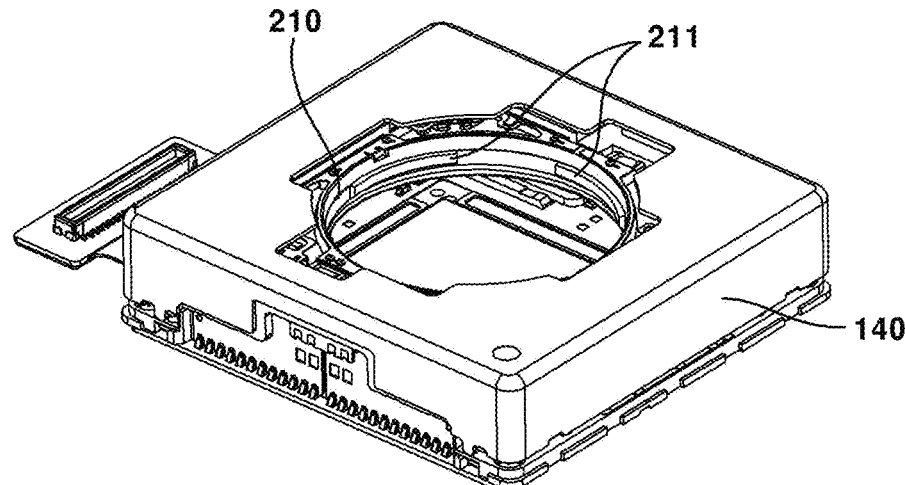

FIG. 48(a)                         FIG. 48(b)
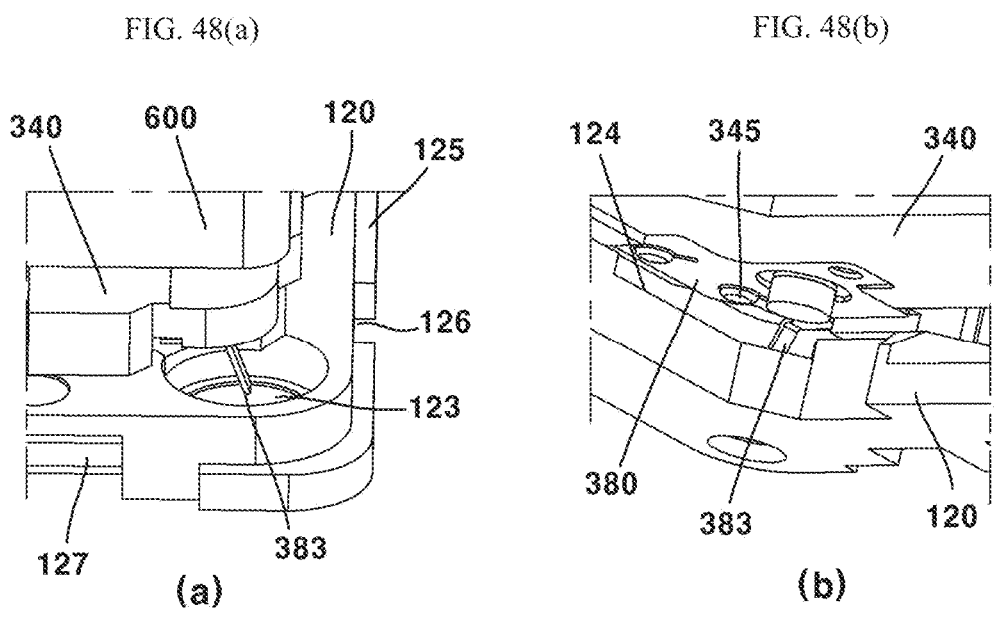
FIG. 49
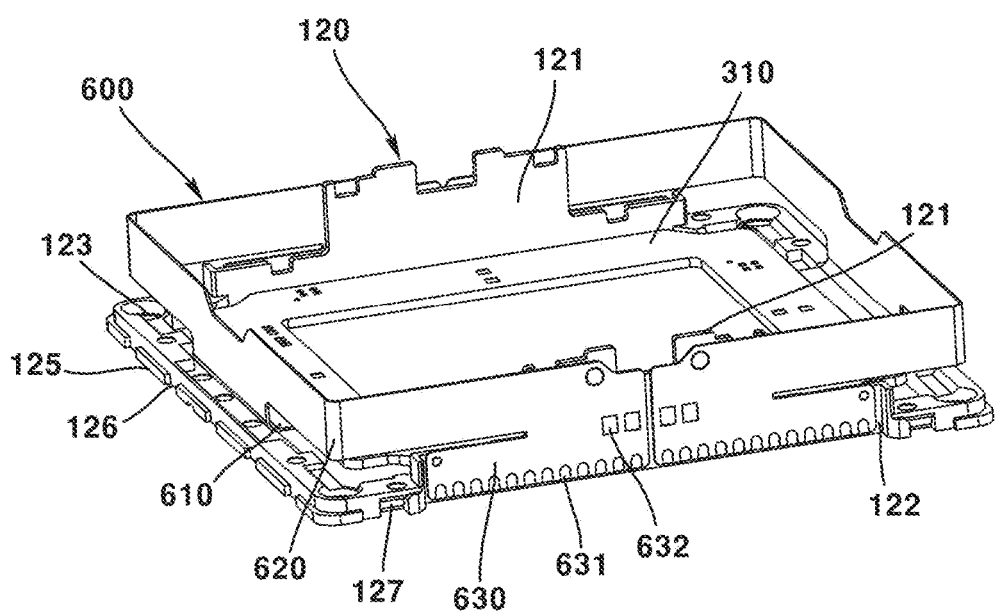

(a)                    (b)

FIG. 56
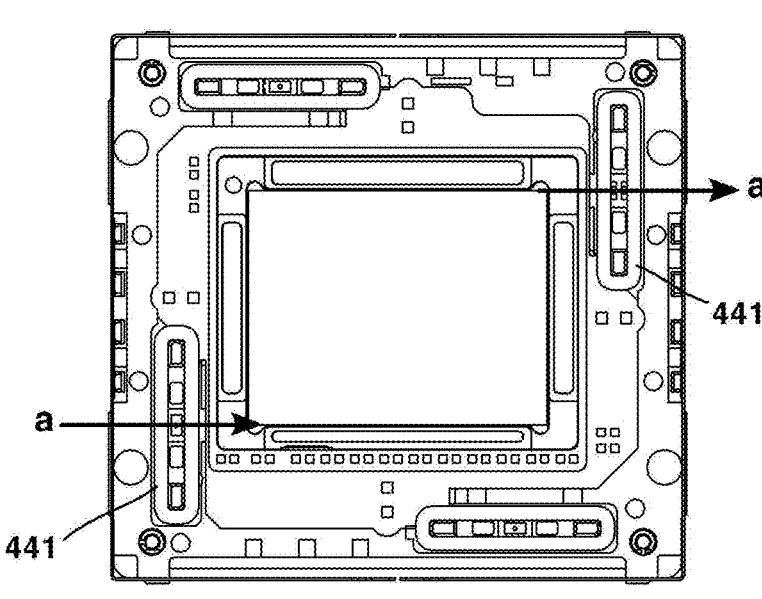
441
441
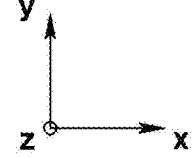

FIG. 57
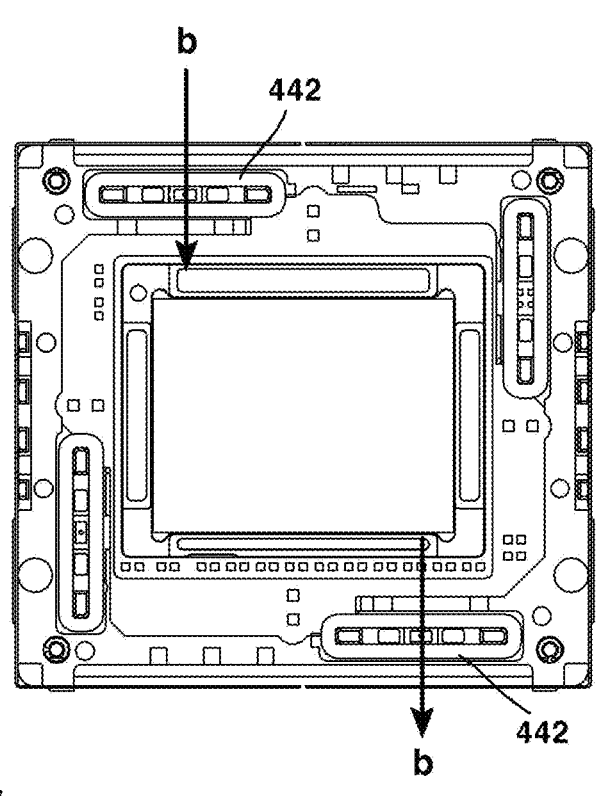
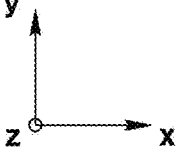

CAMERA DEVICE WITH IMAGE SENSOR MOTIONS TO PERFORM HANDSHAKE CORRECTION FUNCTION

CROSS-REFERENCE TO RELATED APPLICATIONS

This application is the U.S. national stage application of International Patent Application No. PCT/KR2022/010942, filed Jul. 26, 2022, which claims the benefit under 35 U.S.C. § 119 of Korean Application No. 10-2021-0155677, filed Nov. 12, 2021, the disclosures of each of which are incorporated herein by reference in their entirety.

TECHNICAL FIELD

The present embodiment relates to a camera device.

BACKGROUND ART

A camera device is a device that photographs a picture or video of a subject, and is installed in optical apparatuses such as smartphones, drones, and vehicles.

In camera devices, there is a demand for handshake correction, optical image stabilization (OIS), function that corrects image shake caused by user movement to improve image quality.

In the camera device, the handshake correction function is performed by moving the lens in a direction perpendicular to the optical axis. However, in accordance with the recent trend of high pixelation, the diameter of the lens increases, and the weight of the lens increases, and accordingly, there is a problem in that it is difficult to secure electromagnetic force for moving the lens in a limited space.

DETAILED DESCRIPTION OF THE INVENTION

Technical Subject

The present embodiment is intended to provide a camera device that moves an image sensor to perform a handshake correction function.

The present embodiment is intended to provide a camera device that drives the image sensor in three axes: x-axis shift, y-axis shift, and z-axis rolling.

Technical Solution

The camera device according to the present embodiment comprises: a fixed part comprising a base and a housing; a first moving part moving in an optical axis direction; a second moving part comprising an image sensor and moving in a direction perpendicular to the optical axis direction; and a wire being disposed between the fixed part and the second moving part, wherein the second moving part comprises a first substrate being disposed between the base and the first moving part and a connection substrate connecting the first substrate and the base, wherein the connection substrate comprises a first region being coupled to the base, a second region being extended from the first region and bent, and a third region being connected to the second region and the first substrate, and wherein one end of the wire is coupled to the fixed part, and the other end may be coupled to the second moving part.

The second moving part may comprise a shielding member being disposed on one surface of the connection substrate.

The second moving part may comprise a holder being coupled to the first substrate and having a coupling portion being coupled to the third region of the connection substrate.

At least a portion of the third region may be coupled to the holder.

The fixed part comprises an upper spring being coupled to the housing, and the one end of the wire may be connected to the upper spring.

The camera device according to the present embodiment comprises: a fixed part comprising a base; a first moving part moving in the optical axis direction; a second moving part comprising an image sensor, in a direction perpendicular to the optical axis direction; and a wire being disposed between the fixed part and the second moving part, wherein the second moving part comprises a first substrate being disposed between the base and the first moving part, a connection substrate connecting the first substrate and the base, and a holder being coupled to the first substrate, wherein the base comprises a first coupling portion being coupled to the connection substrate, wherein the holder may comprise a second coupling portion being coupled to the connection substrate.

The camera device may comprise a magnet and a coil for moving the second moving part in a direction perpendicular to the optical axis direction against the fixed part, and the coil may be disposed on the holder.

The camera device according to the present embodiment comprises: a base; a housing being coupled to the base; a bobbin being disposed inside the housing; an elastic member being coupled to the housing and the bobbin; a moving part being disposed between the base and the bobbin; and a wire for coupling with the elastic member and the moving part, wherein the moving part comprises a first substrate, a connection substrate being electrically connected to the first substrate, an image sensor being electrically connected to the connection substrate, and a holder being coupled to the first substrate, and wherein the holder may comprise a coupling portion being coupled to the wire.

The moving part may comprise a shielding member being coupled to one surface of the connection substrate.

The camera device according to the present embodiment comprises: a fixed part comprising a base and a housing; a first moving part moving in an optical axis direction; a second moving part comprising an image sensor and moving in a direction perpendicular to the optical axis direction; an upper spring for movably supporting the first moving part; and a wire for movably supporting the second moving part, wherein one end of the wire may be connected to the upper spring.

The second moving part comprises: a first substrate; a connection substrate being electrically connected to the first substrate; an image sensor being electrically connected to the connection substrate; and a holder coupled to the first substrate, wherein the holder may comprise a coupling member being coupled to the other end of the wire.

The second moving part may comprise a shielding member being coupled to one surface of the connection substrate.

The shielding member may be electrically connected to a ground terminal of the image sensor.

The shielding member may comprise an electromagnetic interference (EMI) tape.

The camera device comprises an AF driving unit for moving the first moving part in an optical axis direction, wherein the first moving part comprises a bobbin and a lens being coupled to the bobbin, and wherein the AF driving unit may comprise a coil being disposed in the bobbin and a magnet being disposed in the housing.

Each of the coupling member and the upper spring may comprise a hole through which the wire passes, and a diameter of the hole of the coupling member may be different from a diameter of the hole of the upper spring.

The connection substrate comprises: a connection part being connected to the first substrate; a terminal unit; and an extension portion connecting the connection part and the terminal unit, wherein the connection part and the extension portion are connected through a bent portion of a bent shape, and wherein the connection substrate may comprise a hole being disposed in the bent portion.

The width of the hole in the connection substrate in the optical axis direction may be longer than the width in a direction perpendicular to the optical axis direction.

The camera device comprises an OIS driving unit for moving the second moving part in the direction perpendicular to the optical axis direction, wherein the OIS driving unit may comprise a coil being disposed in the holder and a magnet being disposed in the housing.

The optical apparatus according to the present embodiment may comprise: a main body; a camera device being disposed in the main body; and a display being disposed in the main body and outputting a video or an image photographed by the camera device.

Advantageous Effects

Through the present embodiment, the handshake correction function can be performed by moving the image sensor.

In addition, in the present embodiment, by using the FPCB as an interposer, it is possible to solve the problem of wire disconnection due to current consumption and the problem of loss of image signals.

In addition, in the present embodiment, the restriction on the design freedom for the OIS spring stiffness K of the FPCB can be eliminated. In more detail, as the OIS wire is additionally applied, the degree of freedom in designing the spring stiffness K may be increased by changing the wire diameter and length.

In addition, in the present embodiment, loss of the image signal can be inhibited by attaching the EMI conductive member to the surface of the FPCB.

BRIEF DESCRIPTION OF DRAWINGS

Figure 8:
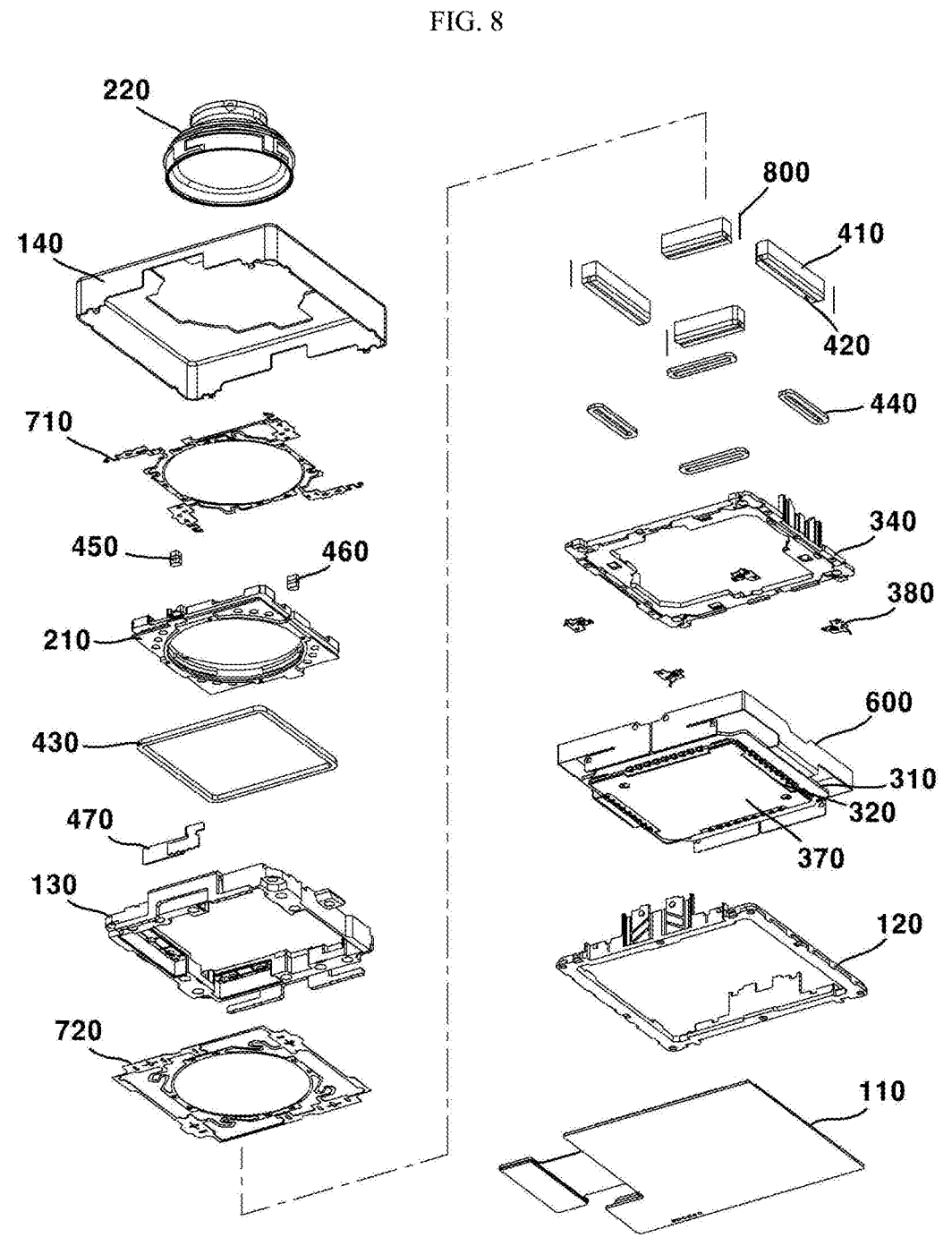

FIG. 8 is an exploded perspective view of a camera device according to the present embodiment viewed from a different direction from that of FIG. 7.

Figure 13:
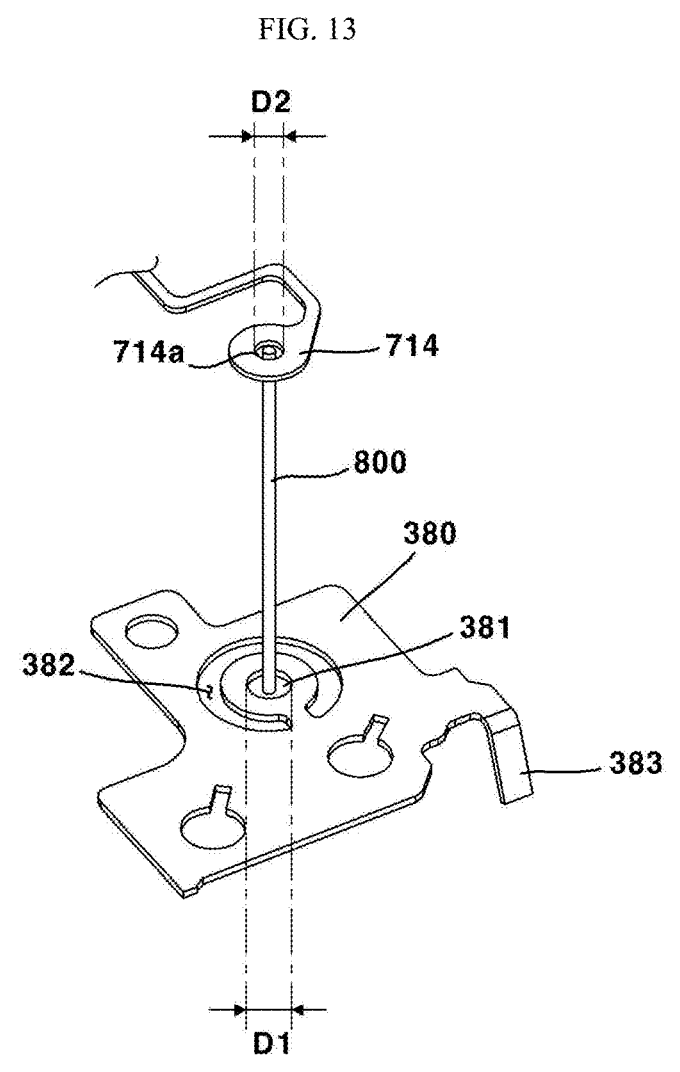

FIG. 13 is an enlarged view illustrating a part of FIG. 12.

FIG. 27 is an exploded perspective view for explaining the coupling structure of a lens of a camera device according to the present embodiment.

Figure 30:
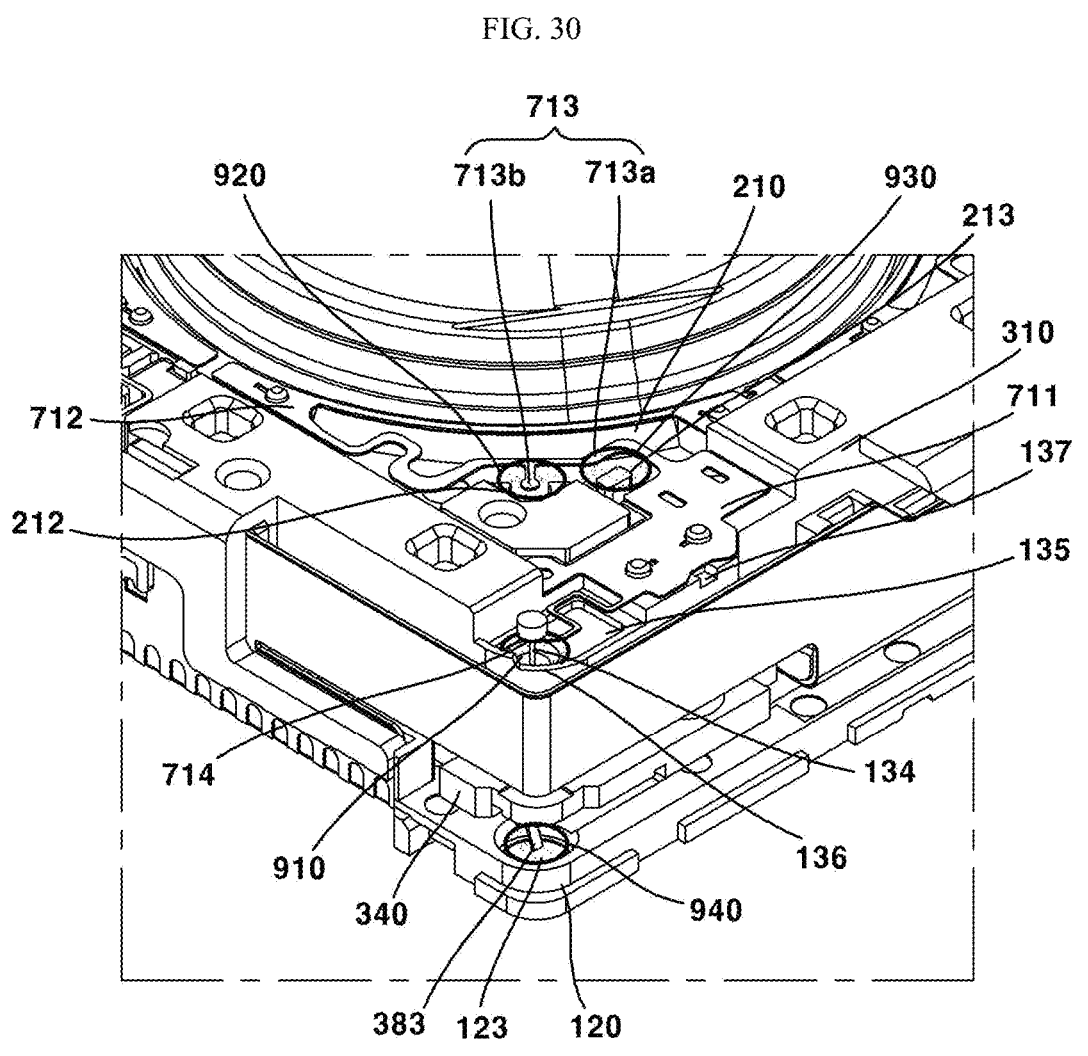

FIG. 30 is an enlarged view illustrating the application structure of first to fourth dampers of a camera device according to the present embodiment.

Figure 38:
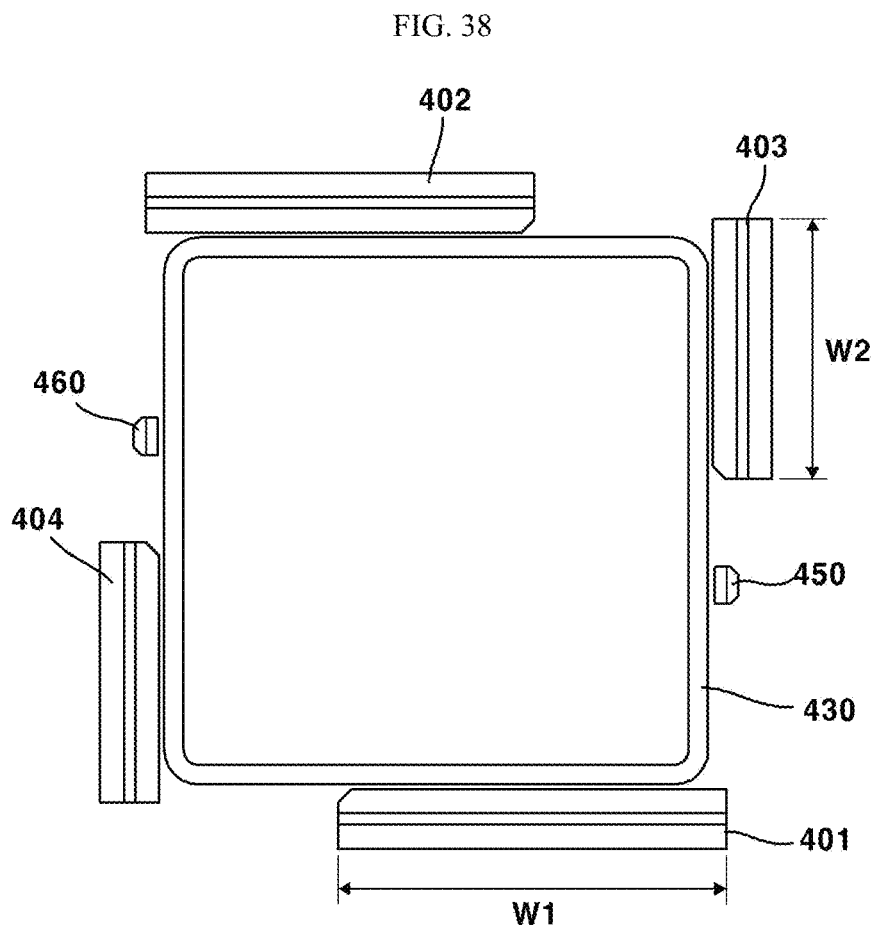

FIG. 38 is a plan view illustrating a coil and a magnet of a camera device according to the present embodiment.

FIG. 48(*a*) is a perspective view illustrating an arrangement structure of a coupling member and a base of a camera device according to the present embodiment, FIG. 48(*b*) is a bottom perspective view.

FIG. 49 is a perspective view illustrating a coupled state of a base and a connection substrate according to the present embodiment.

FIGS. 56 to 58 are diagrams for explaining an operation of the handshake correction function of a camera device according to the present embodiment. In more detail, FIG. 56 is a diagram for explaining the x-axis shift handshake correction of a camera device according to the present embodiment. FIG. 57 is a view for explaining y-axis shift handshake correction of a camera device according to the present embodiment. FIG. 58 is a view for explaining the z-axis rolling handshake correction of a camera device according to the present embodiment.

BEST MODE

Figure 1:
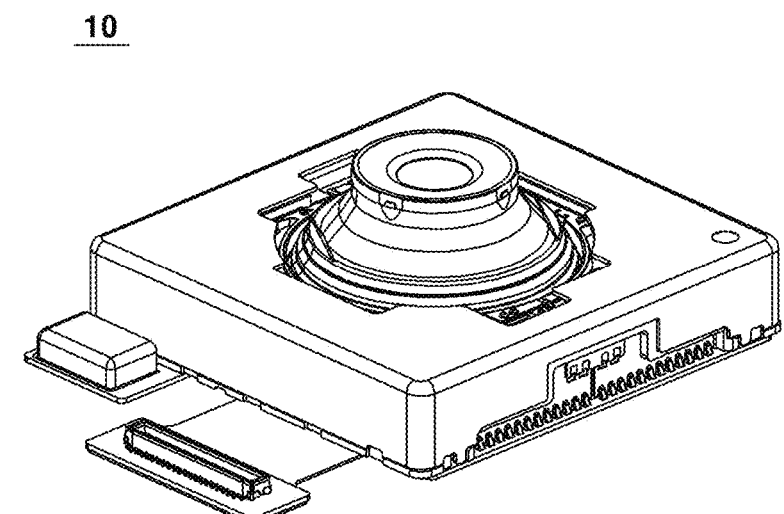
FIG. 1 is a perspective view of a camera device according to the present embodiment.

Hereinafter, preferred embodiments of the present invention will be described in detail with reference to the accompanying drawings.

However, the technical idea of the present invention is not limited to some embodiments to be described, but may be implemented in various forms, and within the scope of the technical idea of the present invention, one or more of the constituent elements may be selectively combined or substituted between embodiments.

In addition, the terms (comprising technical and scientific terms) used in the embodiments of the present invention, unless explicitly defined and described, can be interpreted as a meaning that can be generally understood by a person skilled in the art, and commonly used terms such as terms defined in the dictionary may be interpreted in consideration of the meaning of the context of the related technology.

In addition, terms used in the present specification are for describing embodiments and are not intended to limit the present invention.

In the present specification, the singular form may comprise the plural form unless specifically stated in the phrase, and when described as "at least one (or more than one) of A and B and C", it may comprise one or more of all combinations that can be combined with A, B, and C.

In addition, in describing the components of the embodiment of the present invention, terms such as first, second, A, B, (a), and (b) may be used. These terms are merely intended to distinguish the components from other components, and the terms do not limit the nature, order or sequence of the components.

And, when a component is described as being 'connected', 'coupled' or 'interconnected' to another component, the component is not only directly connected, coupled or interconnected to the other component, but may also comprise cases of being 'connected', 'coupled', or 'interconnected' due that another component between that other components.

In addition, when described as being formed or arranged in "on (above)" or "below (under)" of each component, "on (above)" or "below (under)" means that it comprises not only the case where the two components are directly in contact with, but also the case where one or more other components are formed or arranged between the two components. In addition, when expressed as "on (above)" or "below (under)", the meaning of not only an upward direction but also a downward direction based on one component may be comprised.

Hereinafter, any one of an 'AF driving unit' and an 'OIS driving unit' may be referred to as a 'first driving unit' and the other may be referred to as a 'second driving unit'. Hereinafter, any one of an 'AF coil 430' and an 'OIS coil 440' may be referred to as a 'first coil' and the other may be referred to as a 'second coil'. Hereinafter, any one among an 'AF magnet 410', an 'OIS magnet 420', a 'sensing magnet 450', and a 'correction magnet 460' is referred to as a 'first magnet', the other one is referred to as a 'second magnet', the other one is referred to as a 'third magnet', and the other one may be referred to as a 'fourth magnet'. Hereinafter, any one among a 'first substrate 110', a 'second substrate 310', a 'sensor substrate 320', a 'third substrate 470' and a 'connection substrate 600' is referred to as a 'first substrate', the other one is referred to as a 'second substrate', the other one is referred to as a 'third substrate', the other one is referred to as a 'fourth substrate', and the other one may be referred to as a 'fifth substrate'.

Hereinafter, a camera device according to the present embodiment will be described with reference to the drawings.

Figure 2:
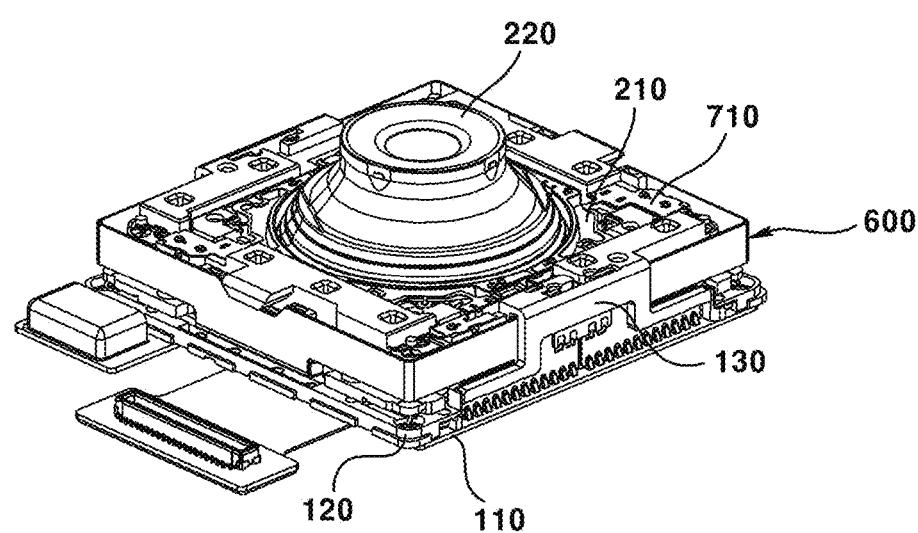
FIG. 2 is a perspective view of a state in which a cover member is omitted from a camera device according to the present embodiment.
Figure 3:
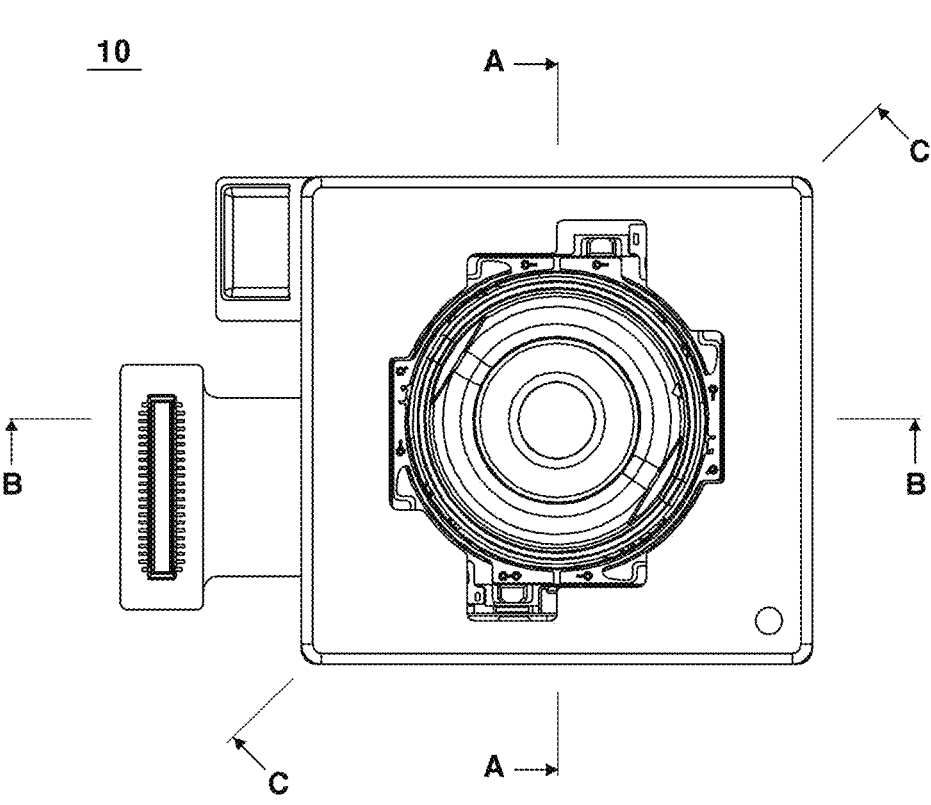
FIG. 3 is a plan view of a camera device according to the present embodiment.
Figure 4:
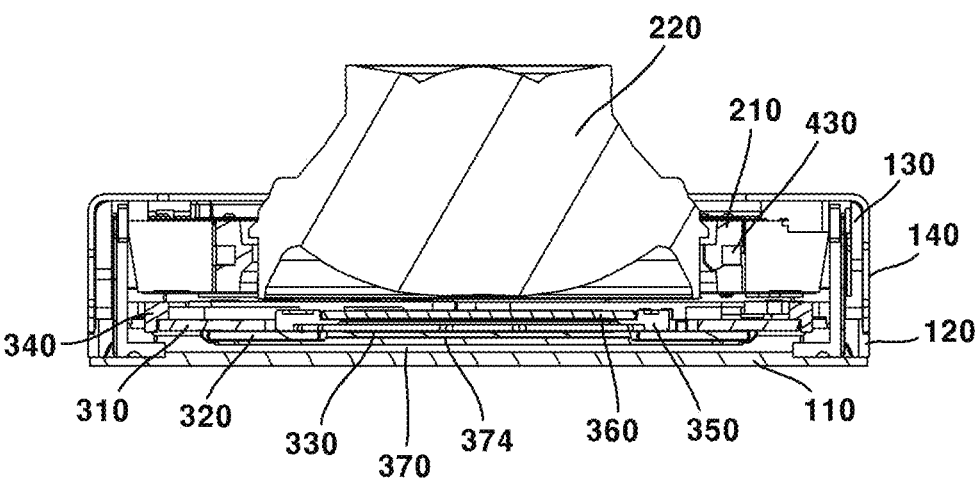
FIG. 4 is a cross-sectional view taken along line A-A in FIG. 3.
Figure 5:
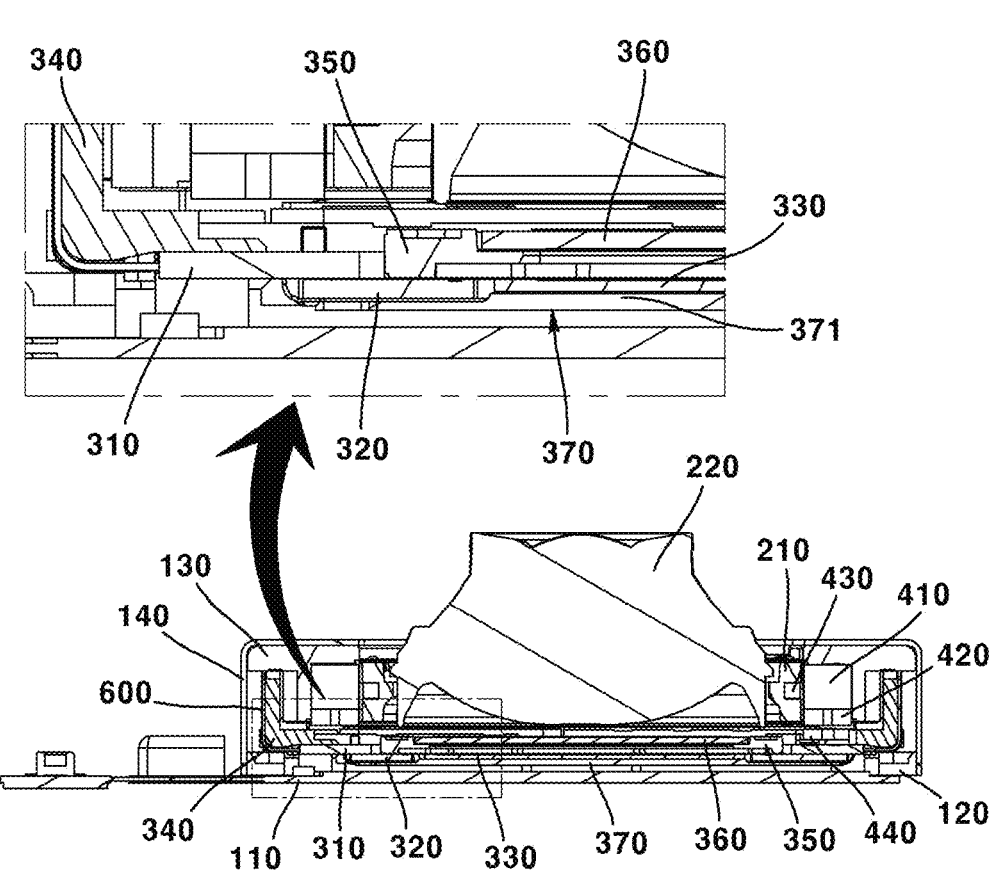
FIG. 5 is a cross-sectional view taken along line B-B in FIG. 3.
Figure 6:
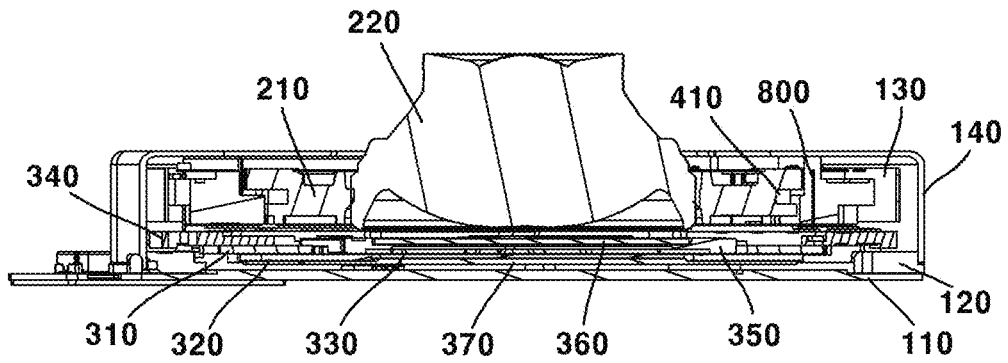
FIG. 6 is a cross-sectional view taken along line C-C in FIG. 3.
Figure 7:
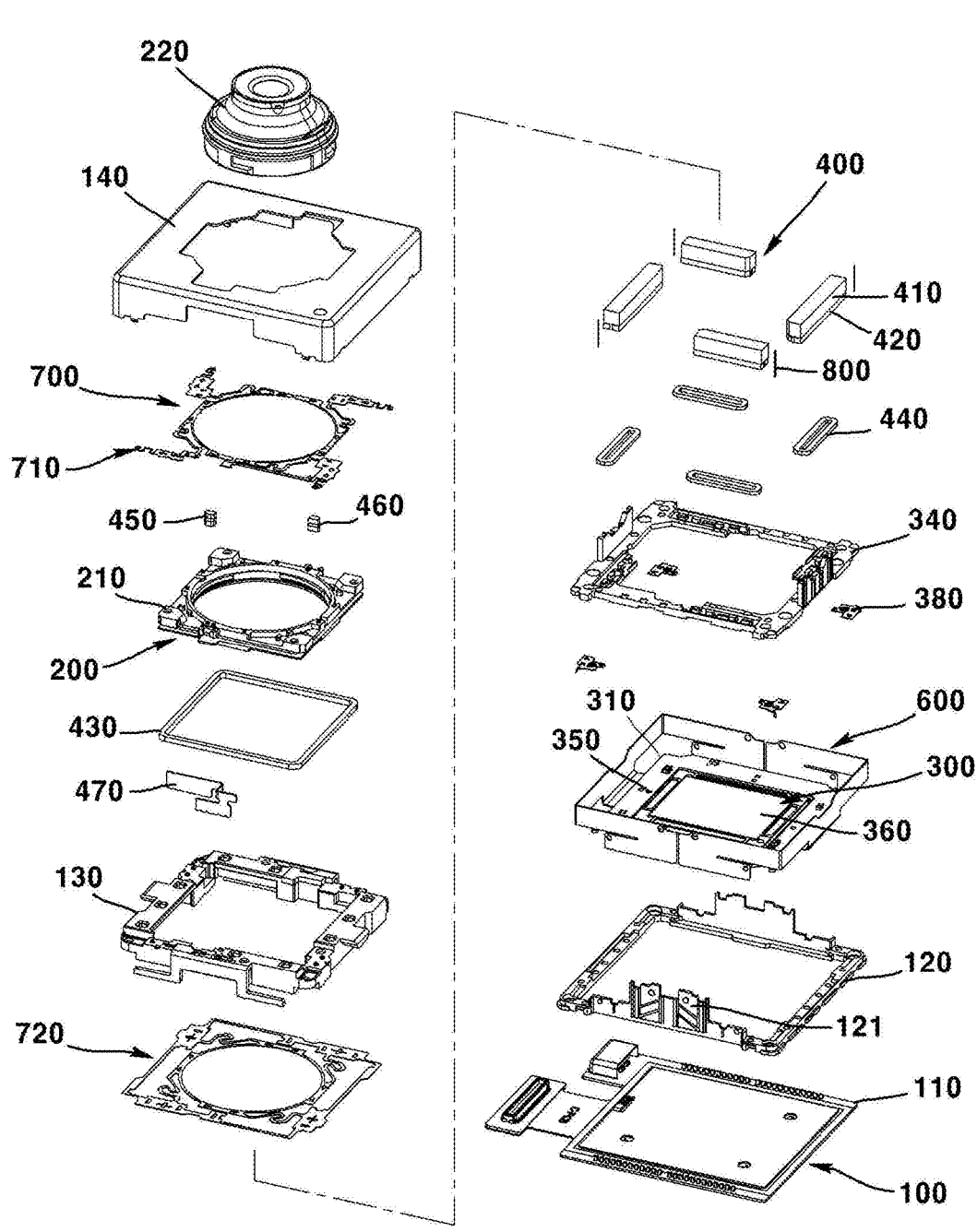
FIG. 7 is an exploded perspective view of a camera device according to the present embodiment.
Figure 9:
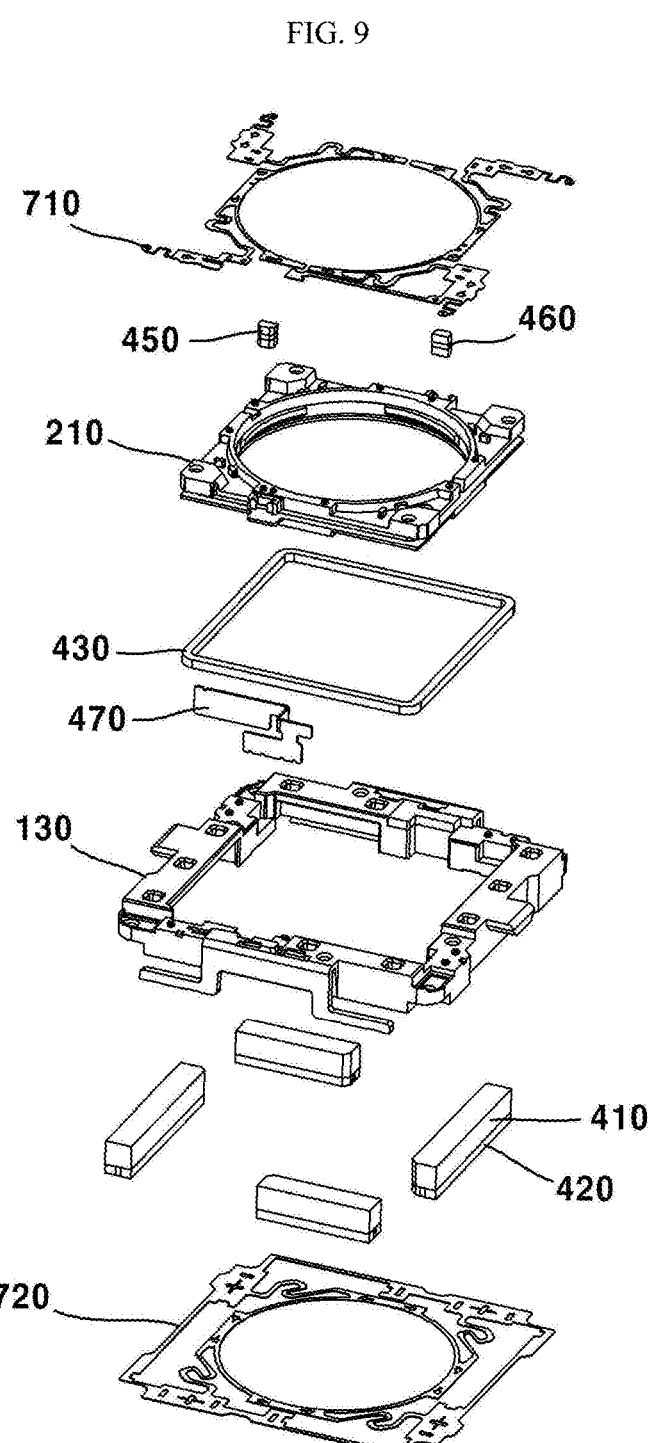
FIG. 9 is an exploded perspective view of a first moving part and related components of the camera device according to the present embodiment.
Figure 10:
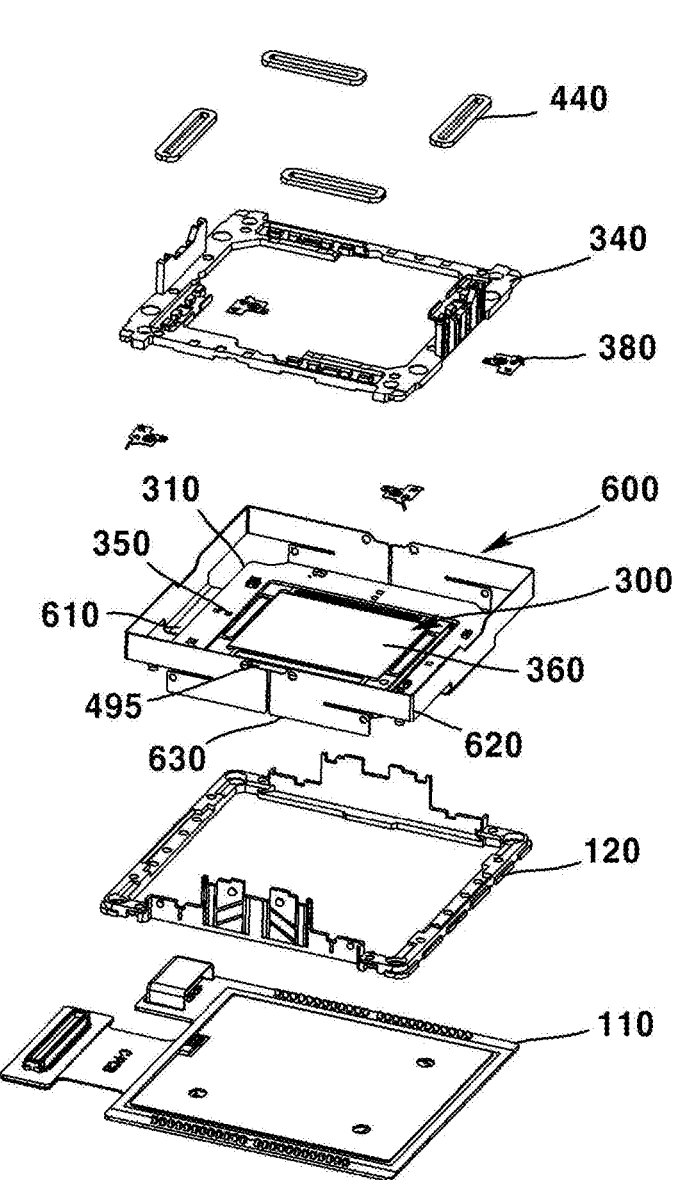
FIG. 10 is an exploded perspective view of a second moving part and related components of the camera device according to the present embodiment.
Figure 11:
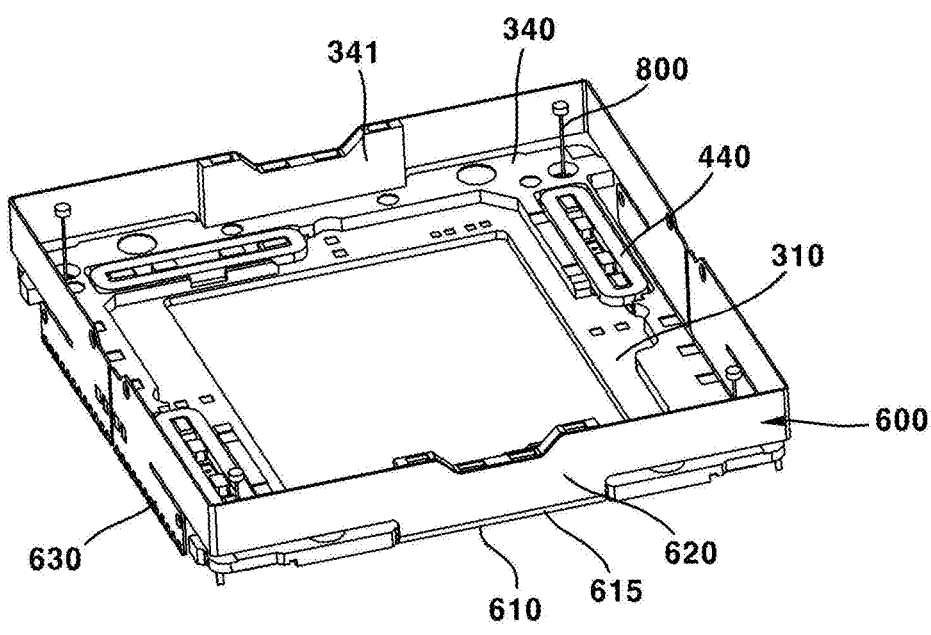
FIG. 11 is a perspective view of a partial configuration of a connection substrate, a wire, and a second moving part of the camera device according to the present embodiment.
Figure 12:
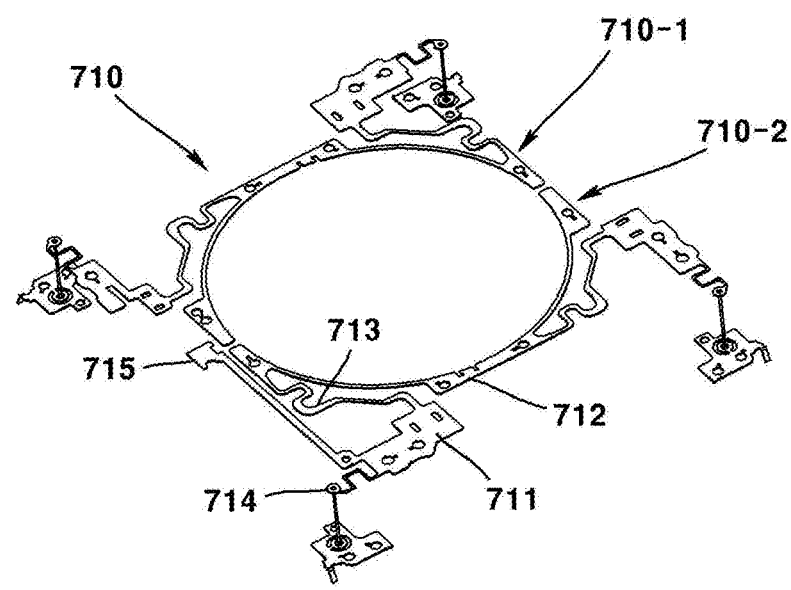
FIG. 12 is a perspective view illustrating a coupling structure of a wire of a camera device according to the present embodiment.
Figure 14:
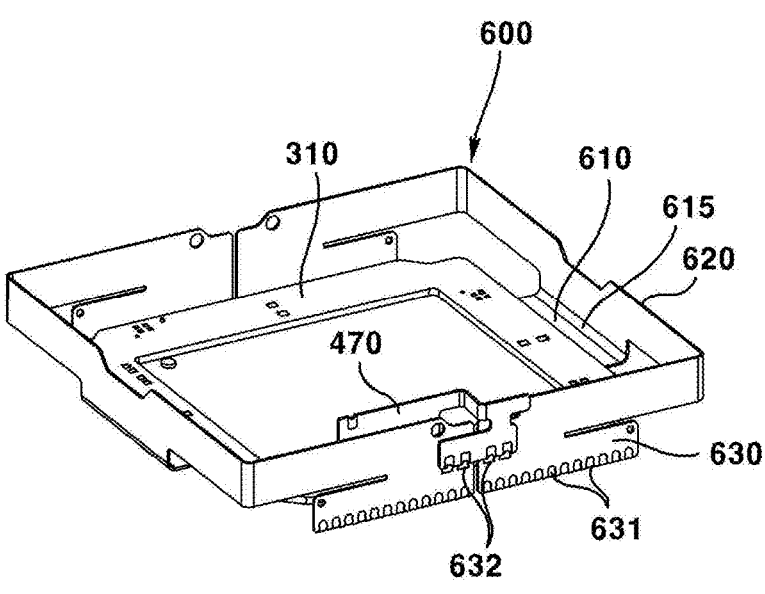
FIG. 14 is a perspective view illustrating a coupling structure of a connection substrate and a third substrate of a camera device according to the present embodiment.
Figure 15:
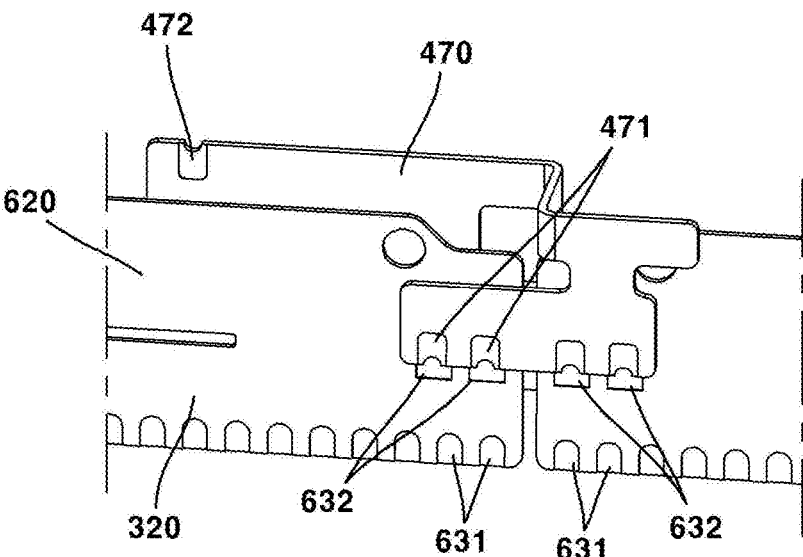
FIG. 15 is an enlarged view illustrating a part of FIG. 14.
Figure 16:
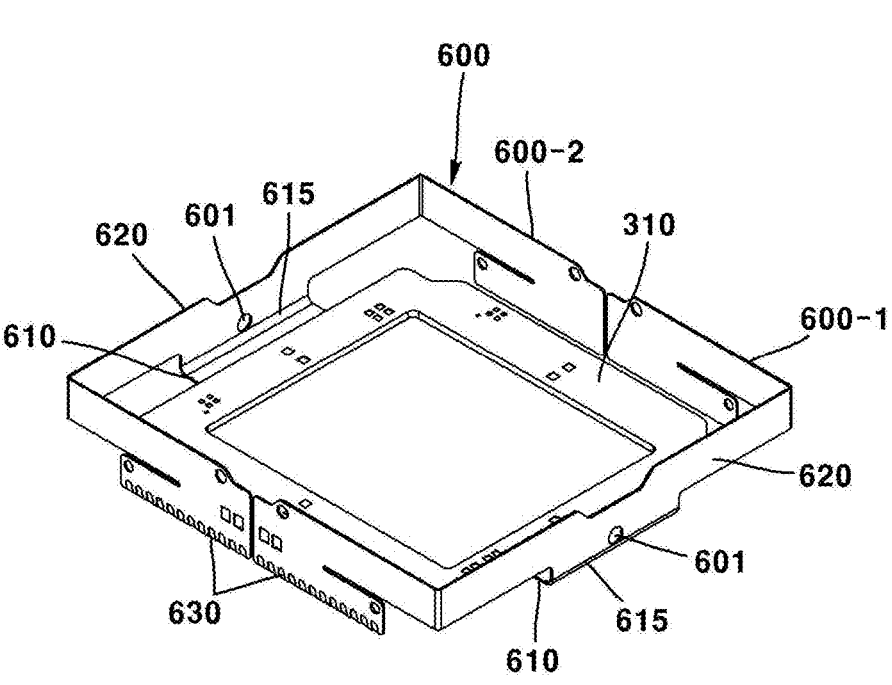
FIG. 16 is a perspective view of a second substrate and a connection substrate of a camera device according to a modified embodiment.
Figure 17:
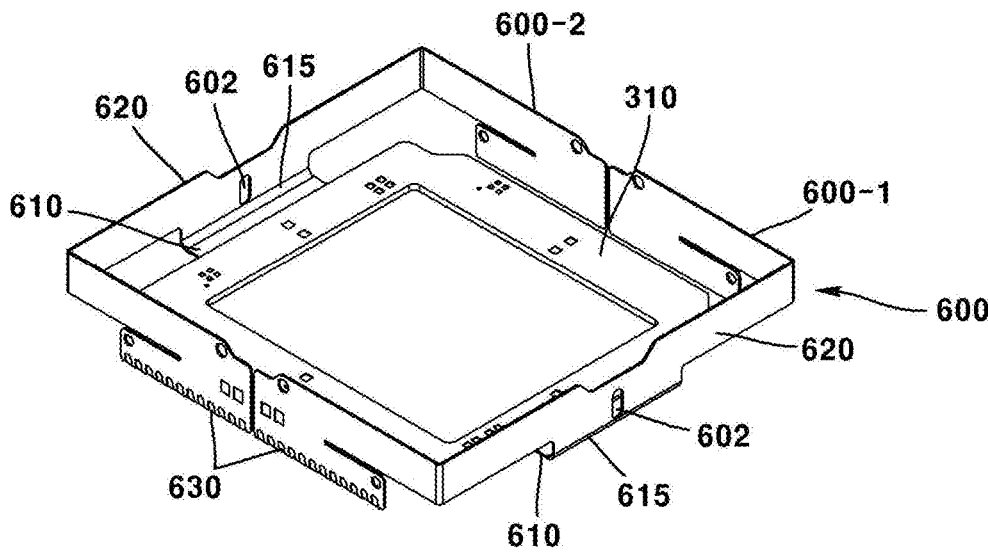
FIG. 17 is a perspective view of a second substrate and a connection substrate of a camera device according to another modified embodiment.
Figure 18:
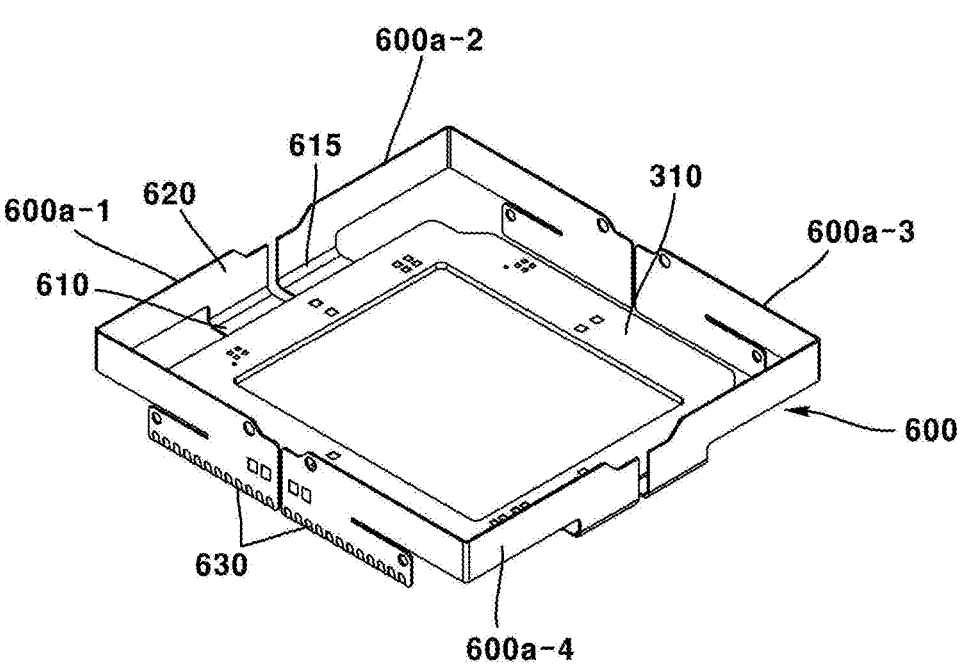
FIG. 18 is a perspective view of a second substrate and a connection substrate of a camera device according to another modified embodiment.
Figure 19:
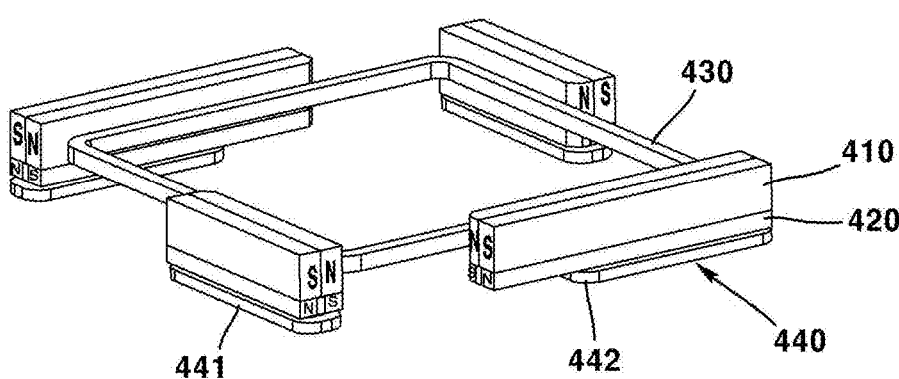
FIG. 19 is a perspective view illustrating a magnet and a coil of a camera device according to the present embodiment.
Figure 20:
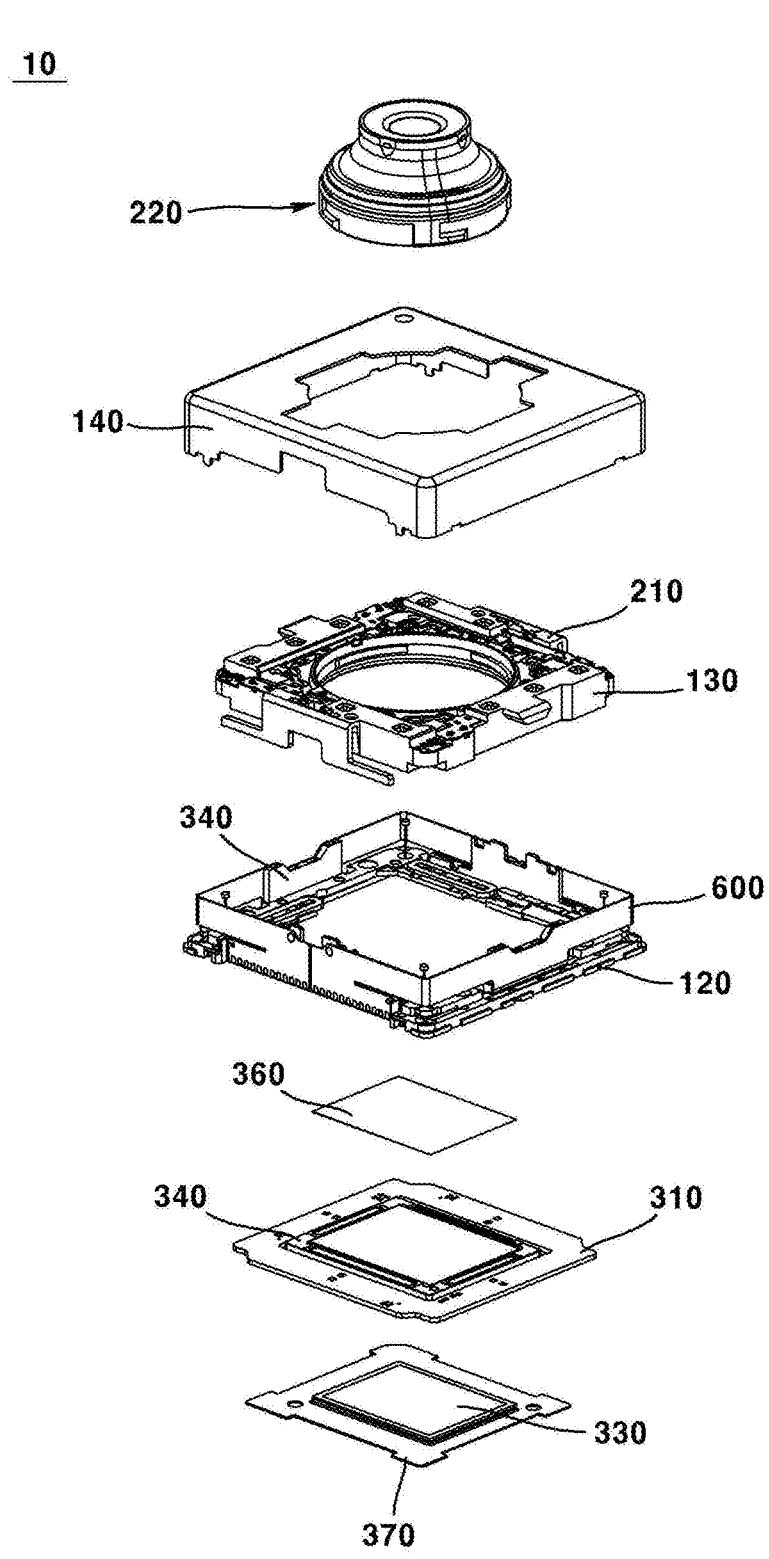
FIG. 20 is an exploded perspective view of a camera device according to the present embodiment.
Figure 21:
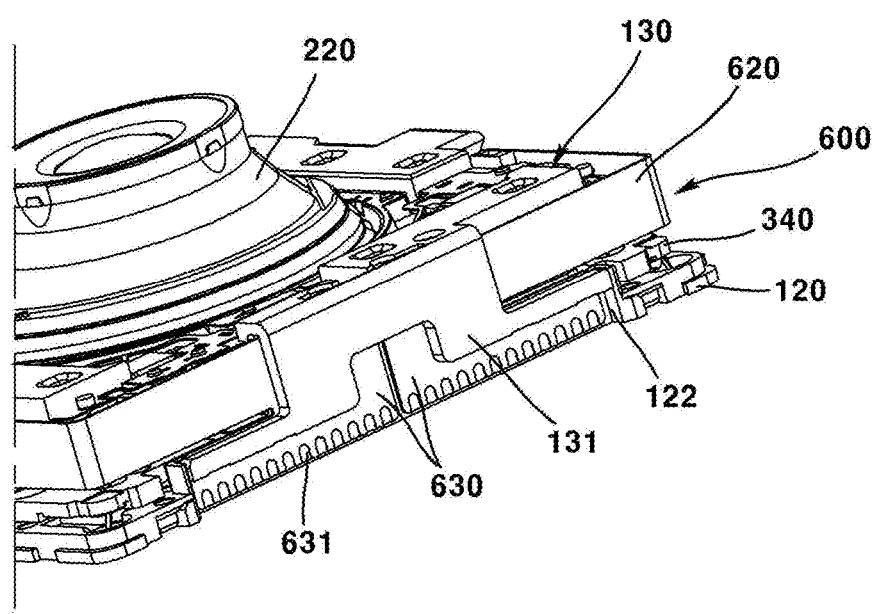
FIG. 21 is a perspective view illustrating a wing portion and related configuration of a housing according to the present embodiment.
Figure 22:
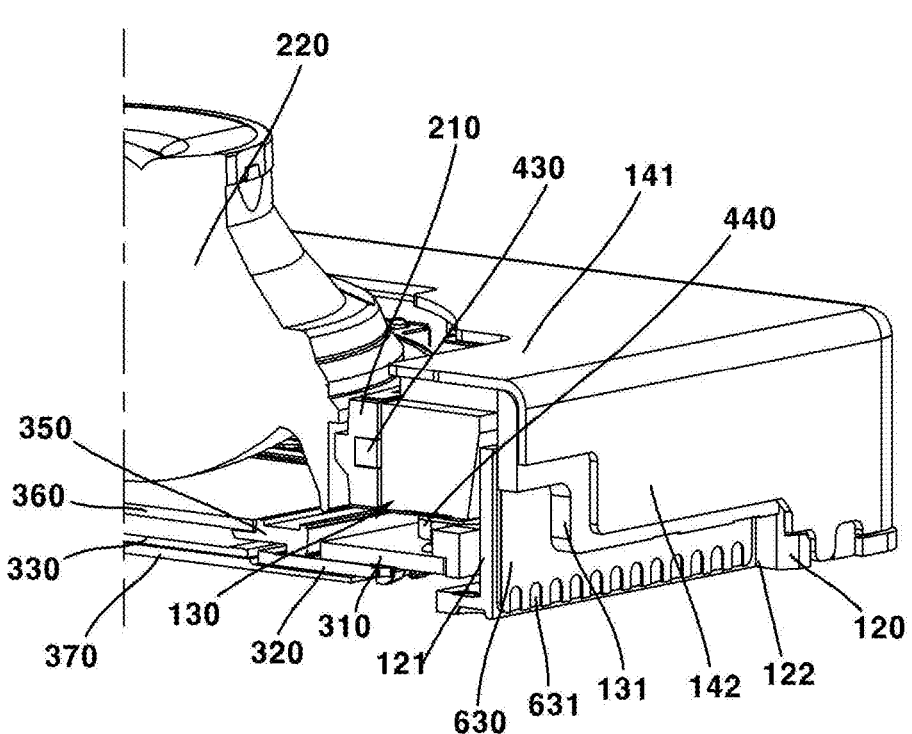
FIG. 22 is a cross-sectional perspective view illustrating a wing portion and related configuration of a housing according to the present embodiment.
Figure 23:
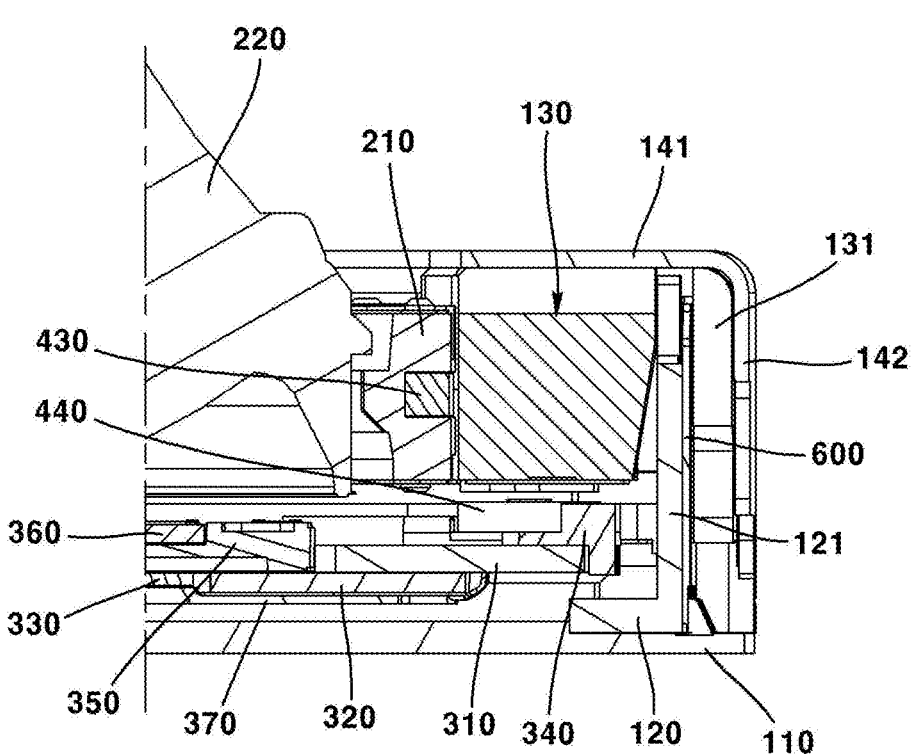
FIG. 23 is a cross-sectional view illustrating a part of a camera device according to the present embodiment.
Figure 24:
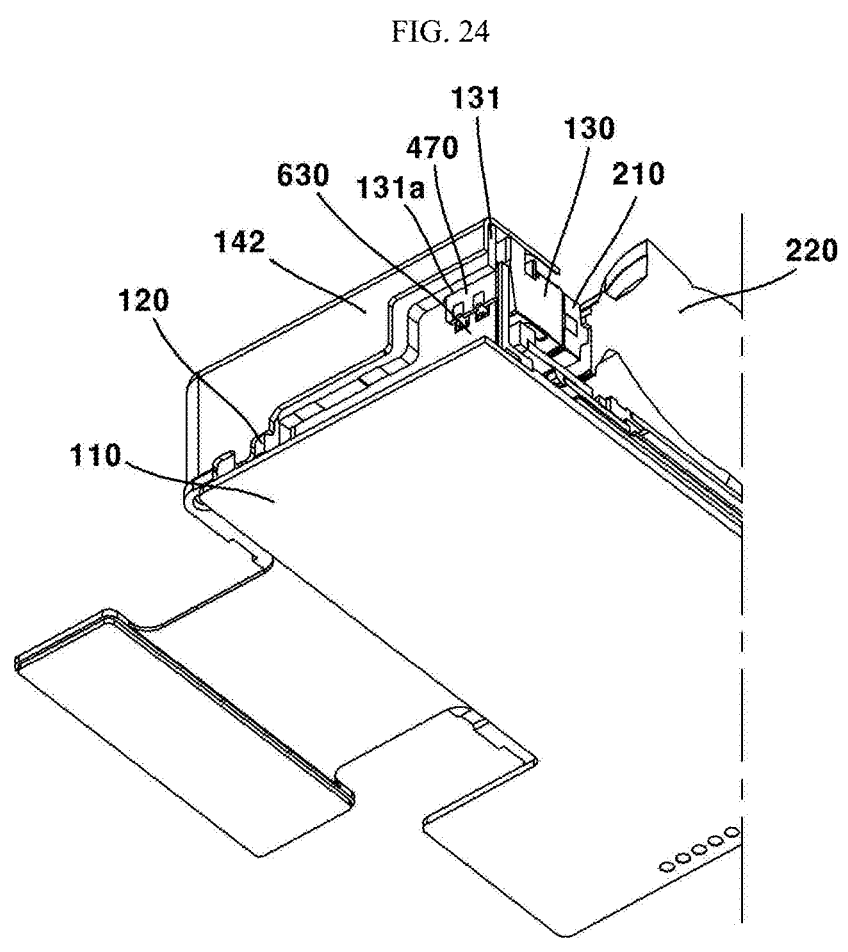
FIG. 24 is a cross-sectional perspective view illustrating a wing portion of a housing opposite to that of FIG. 22 and its associated configuration.
Figure 25:
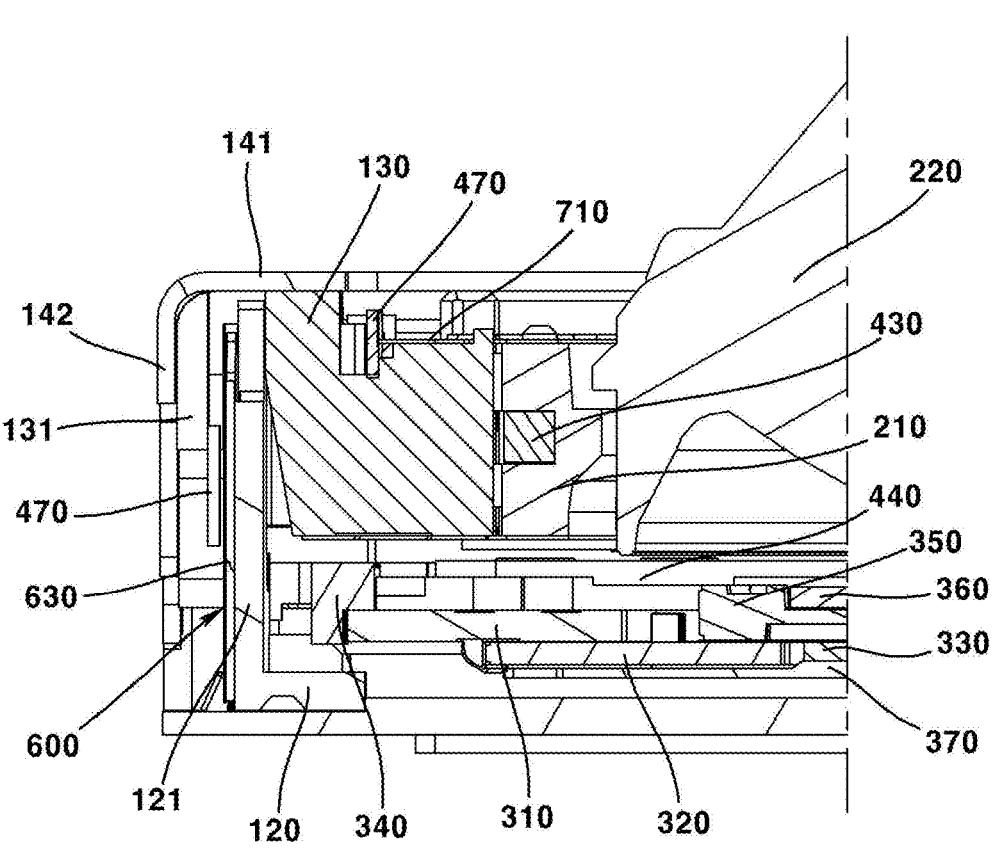
FIG. 25 is a cross-sectional view illustrating a part of the camera device opposite to that of FIG. 23.
Figure 26:
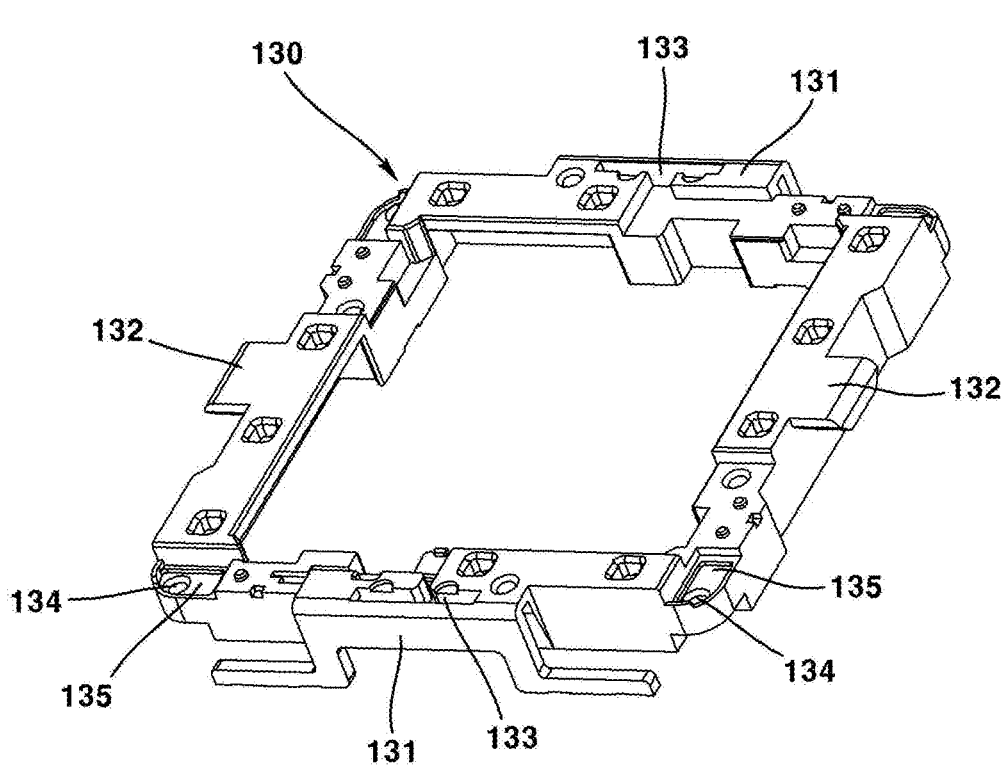
FIG. 26 is a perspective view of a housing of a camera device according to the present embodiment.
Figure 28:
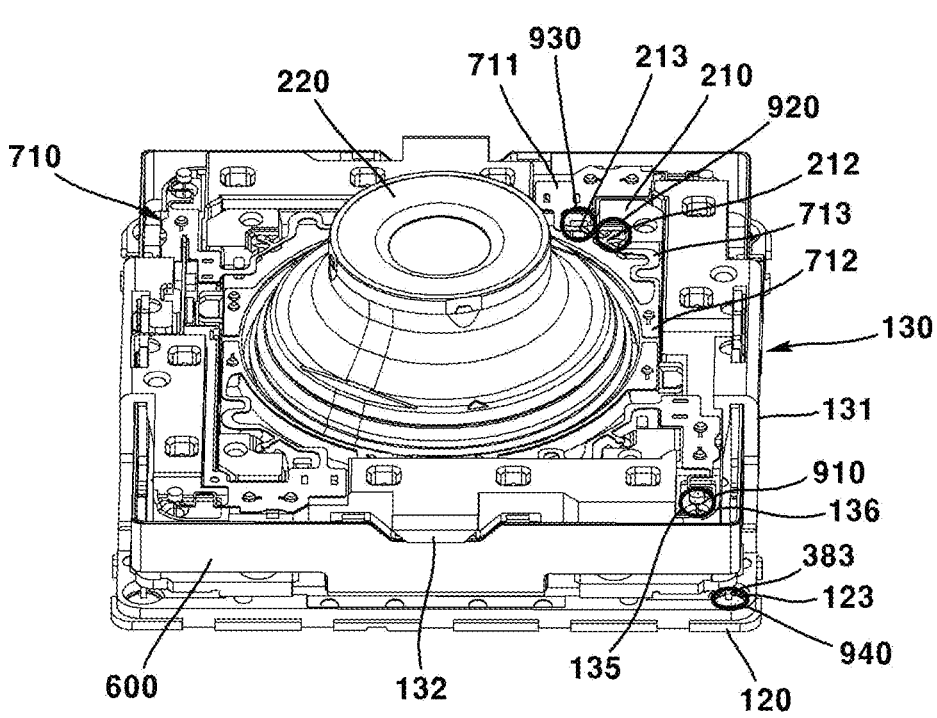
FIG. 28 is a perspective view of a state in which the cover member and the first substrate of a camera device according to the present embodiment are removed.
Figure 29:
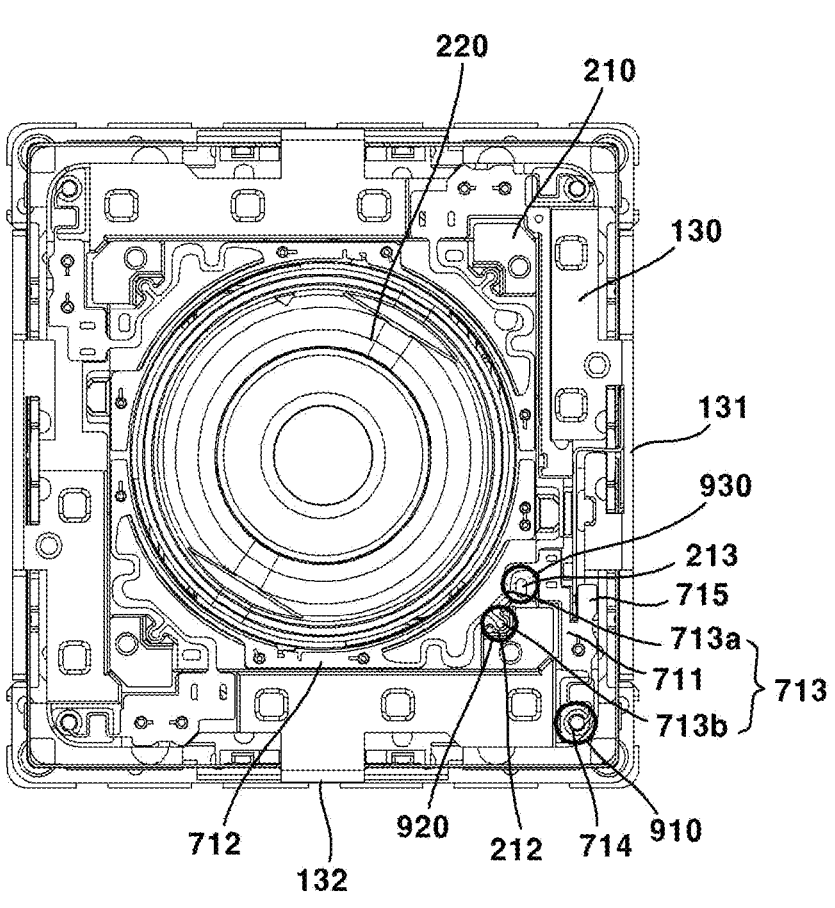
FIG. 29 is a plan view of a state in which a cover member and a first substrate of a camera device according to the present embodiment are removed.
Figure 31:
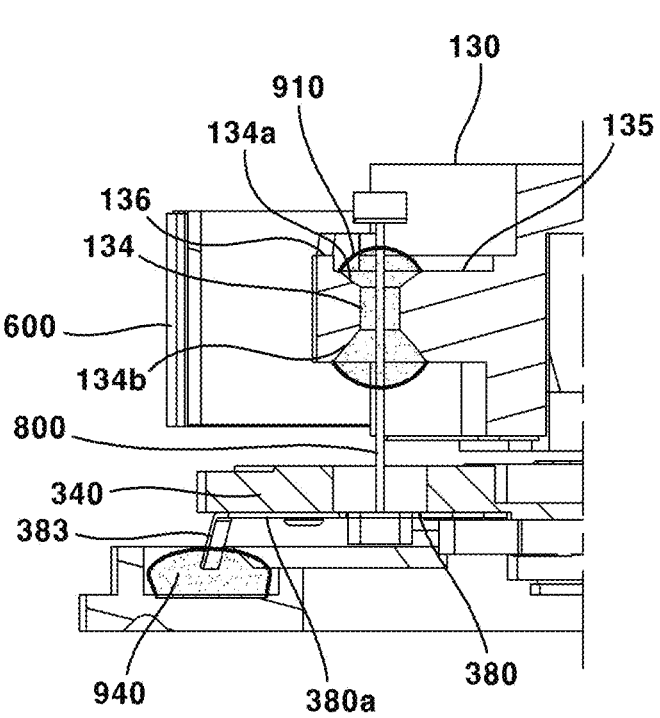
FIG. 31 is a cross-sectional view illustrating the coating structure of a first damper and a fourth damper of a camera device according to the present embodiment.
Figures 32A, 32B, 32C:
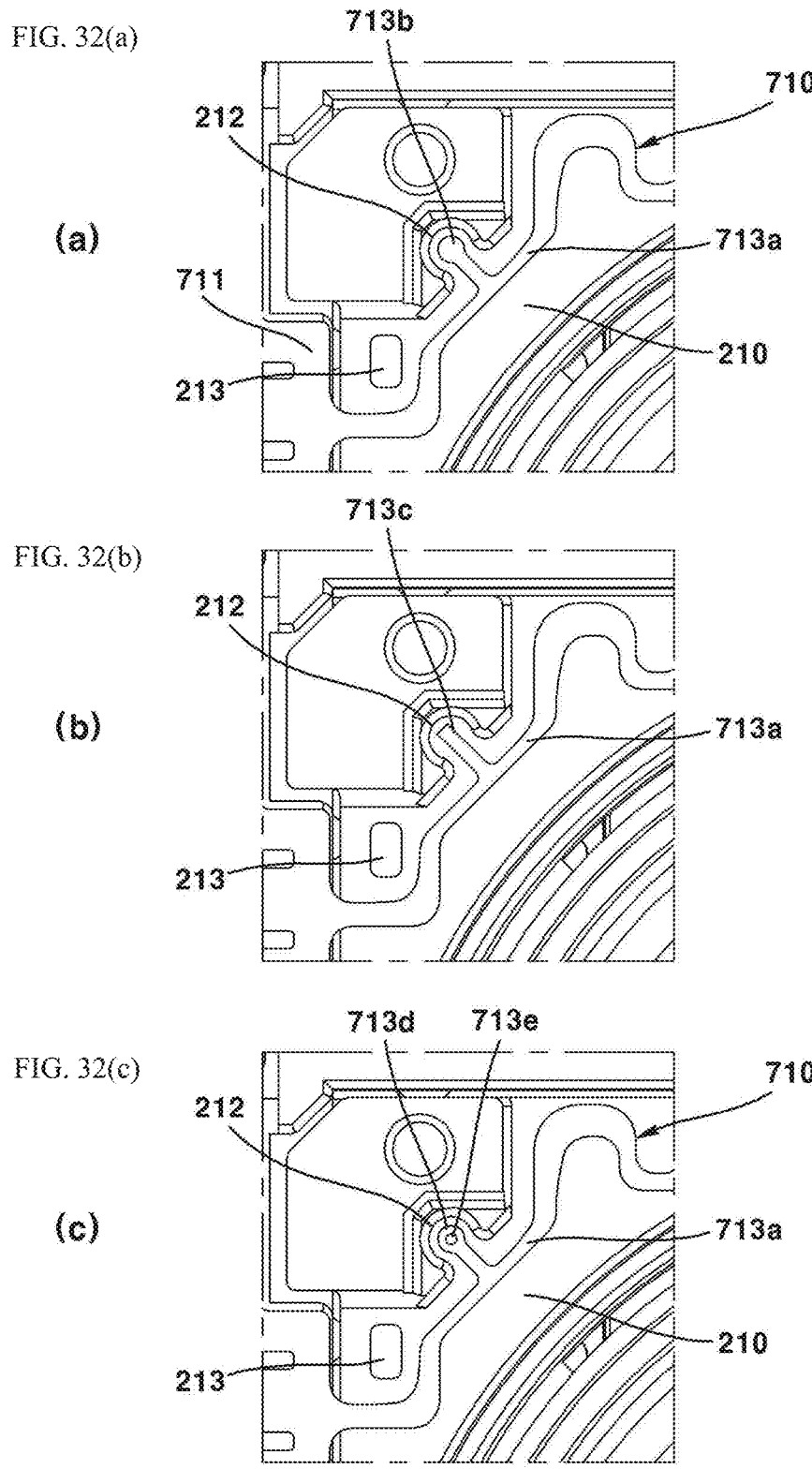
FIG. 32(a) is a plan view illustrating a structure for applying a damper to a bobbin and an upper elastic member according to the present embodiment.
FIG. 32(b) is a plan view illustrating a structure for applying a damper to a bobbin and an upper elastic member according to a modified embodiment.
FIG. 32(c) is a plan view illustrating a structure for damper application of a bobbin and an upper elastic member according to another modified embodiment.
Figures 33, 34:
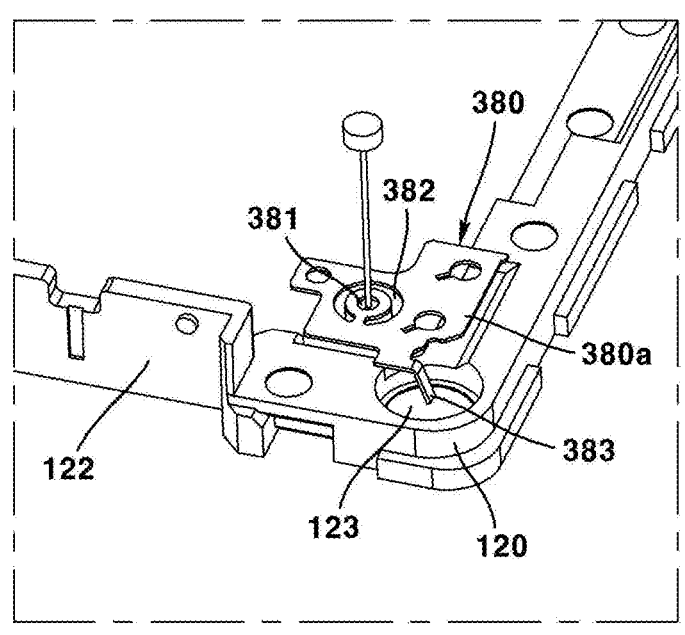
FIG. 33 is a cross-sectional view illustrating an application structure of a fourth damper of a camera device according to the present embodiment.
FIG. 34 is a perspective view illustrating a structure for applying a coupling member of a camera device and a fourth damper of a base according to the present embodiment.
Figure 35:
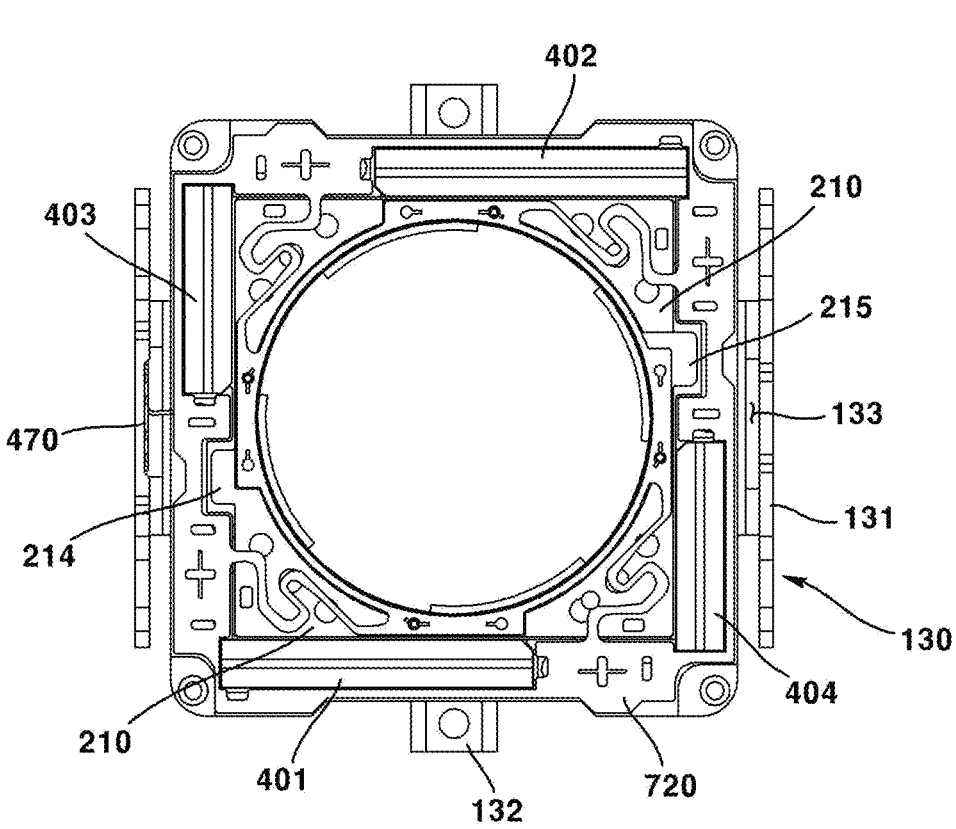
FIG. 35 is a bottom view of a partial configuration of a camera device according to the present embodiment.
Figure 36:
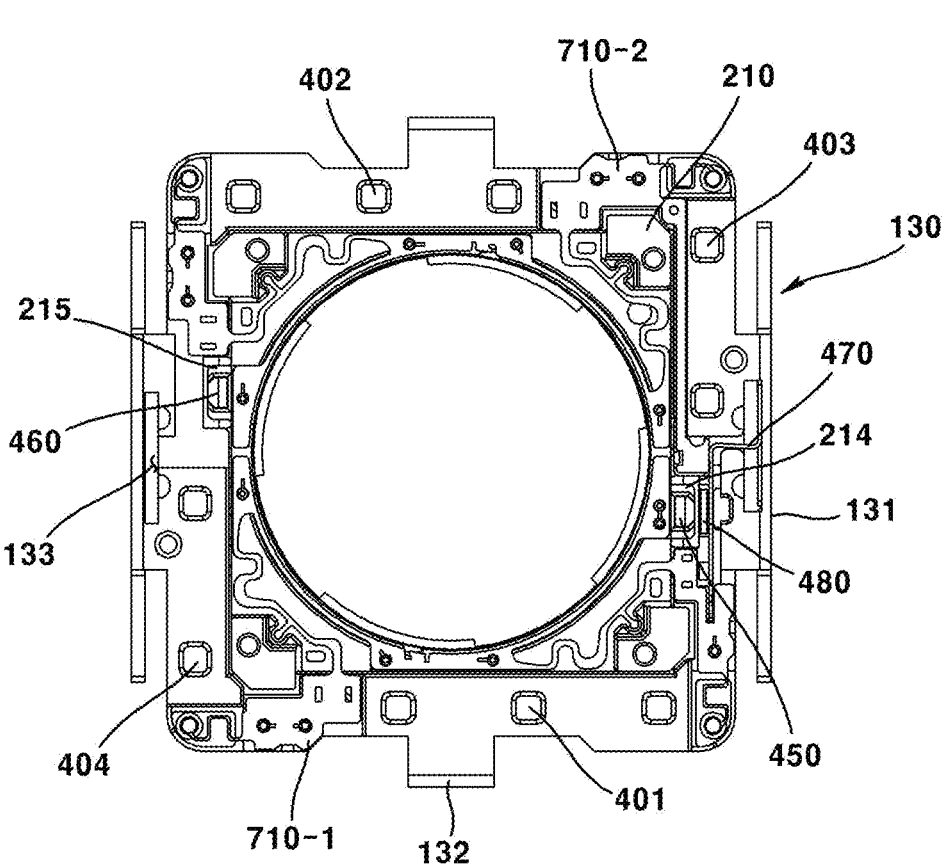
FIG. 36 is a plan view of a partial configuration of a camera device in the state of FIG. 35.
Figure 37:
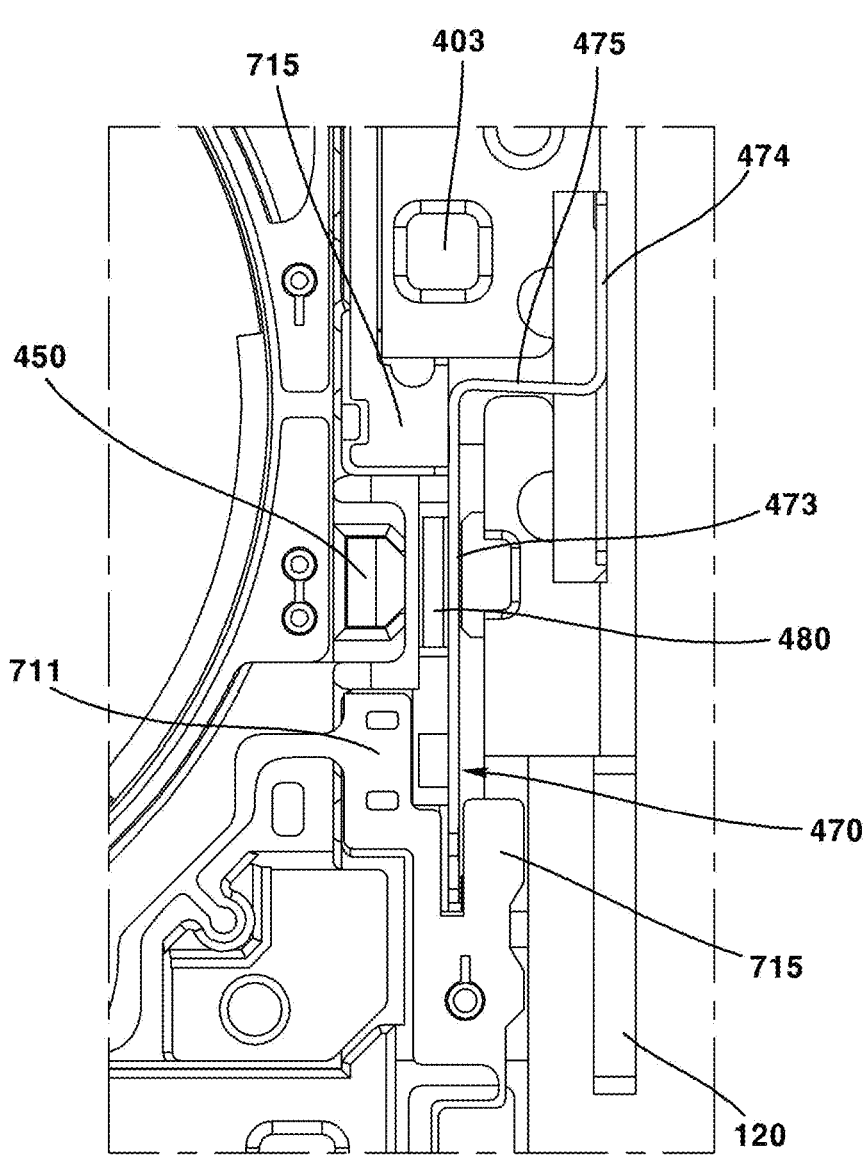
FIG. 37 is an enlarged view of a part of FIG. 36.
Figure 39:
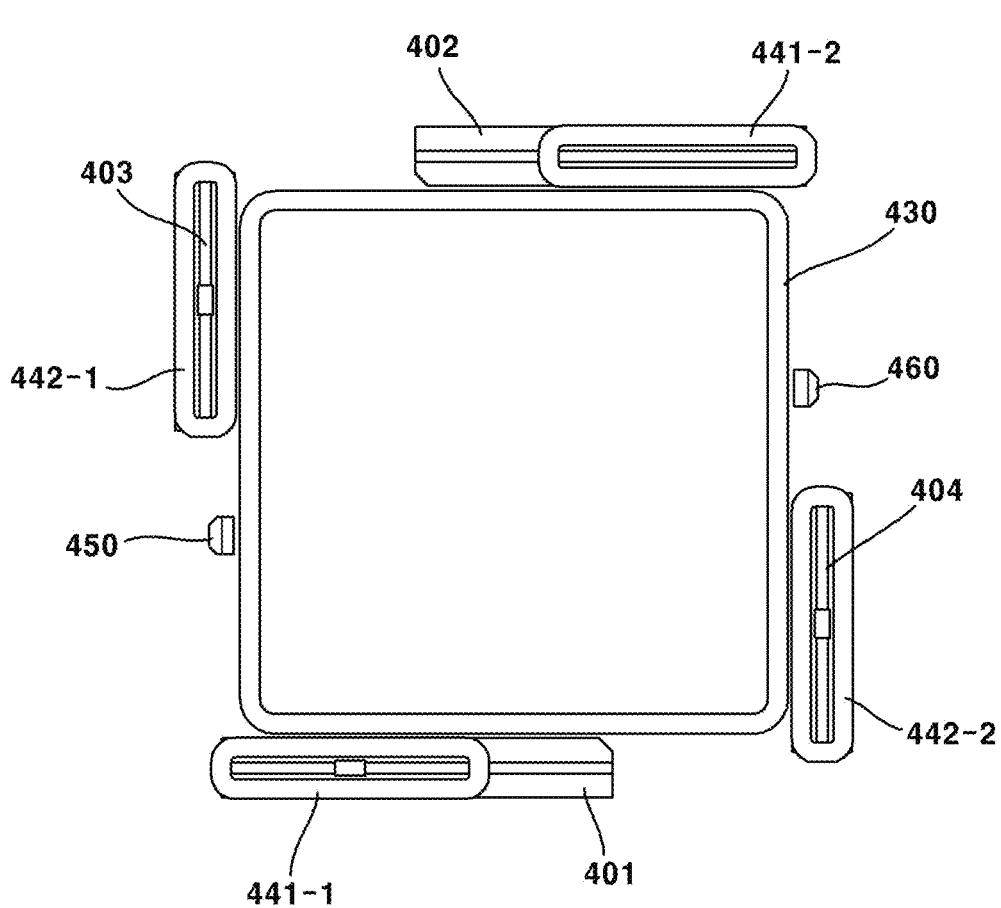
FIG. 39 is a bottom view illustrating a coil and a magnet of a camera device according to the present embodiment.
Figure 40:
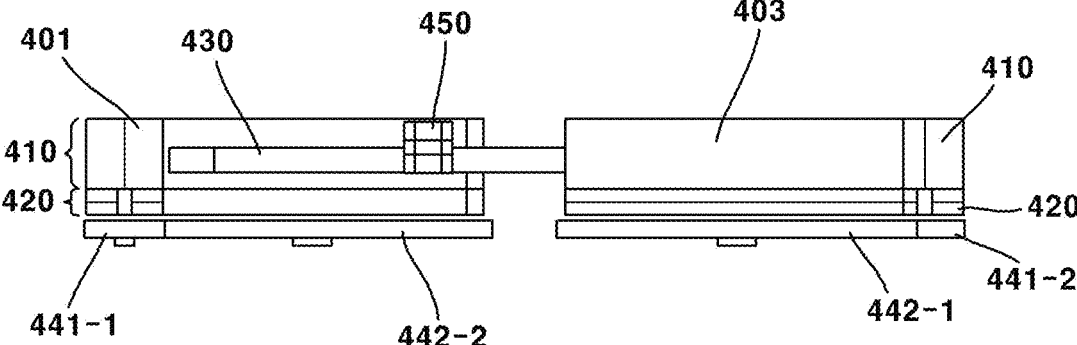
FIG. 40 is a side view illustrating a coil and a magnet of a camera device according to the present embodiment.
Figure 41:
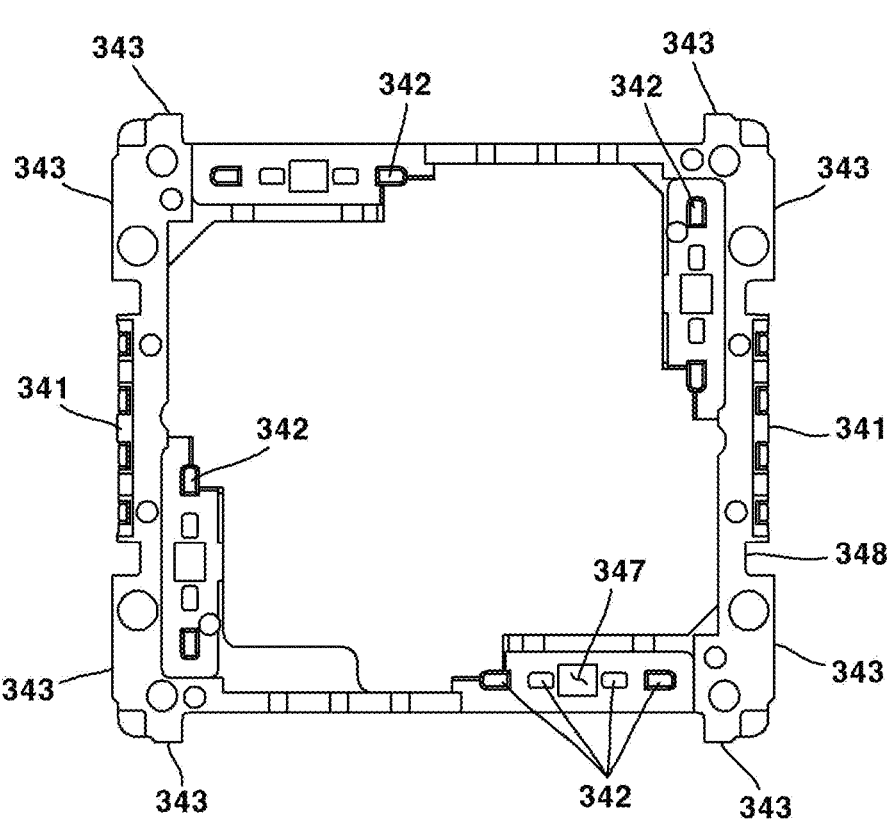
FIG. 41 is a plan view of a holder of a camera device according to the present embodiment.
Figure 42:
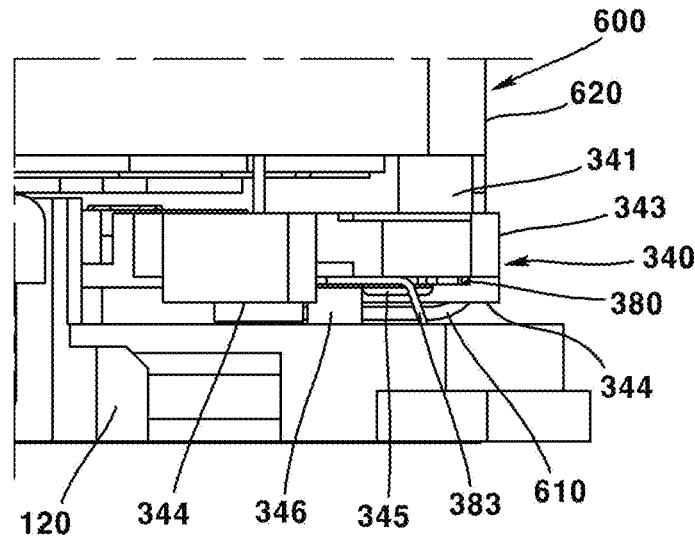
FIG. 42 is an enlarged side view illustrating a holder and related configuration of a camera device according to the present embodiment.
Figure 43:
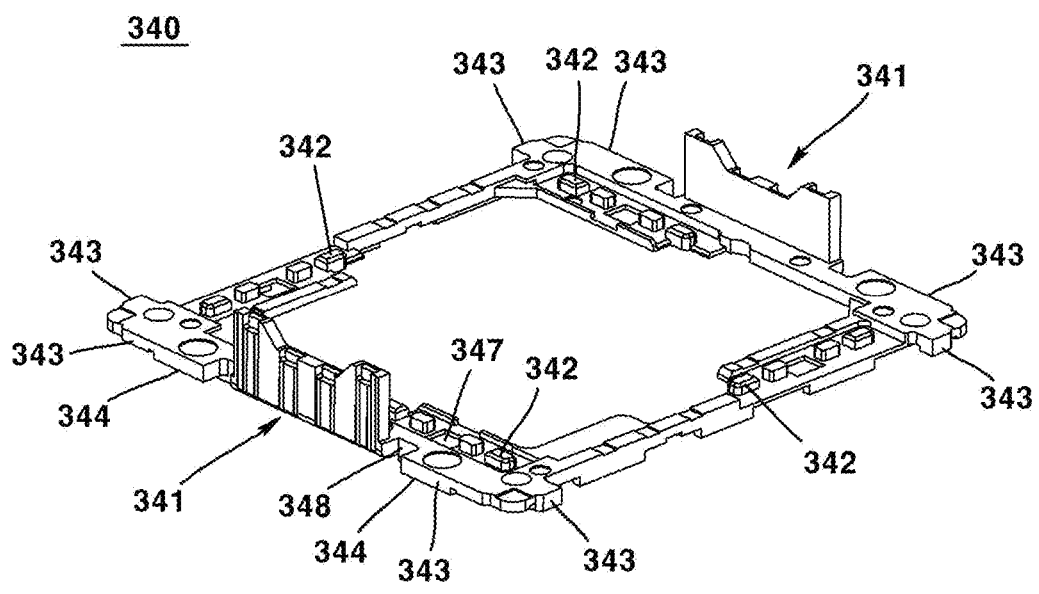
FIG. 43 is a perspective view of a holder of a camera device according to the present embodiment.
Figure 44:
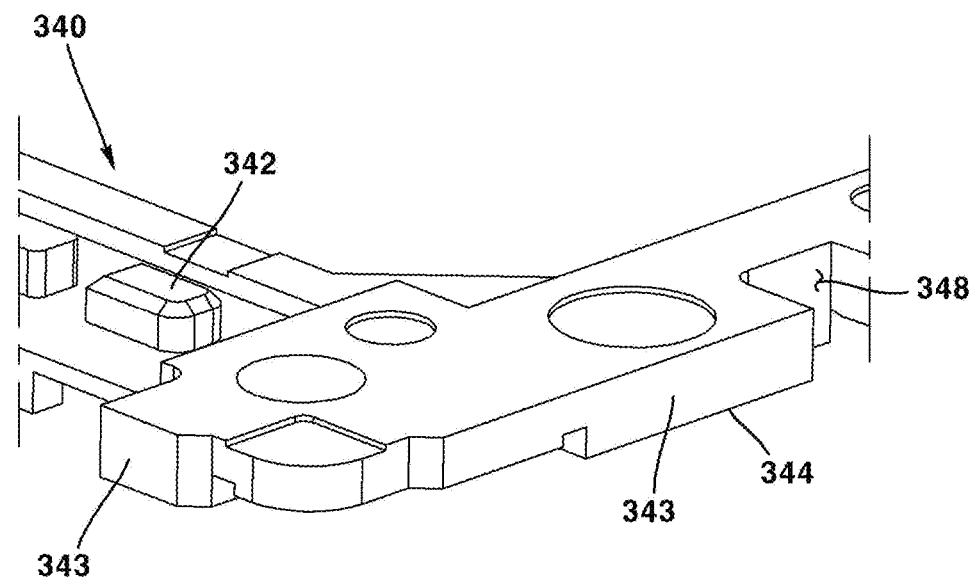
FIGS. 44 and 45 are enlarged perspective views of a part of a holder of a camera device according to the present embodiment.
Figures 45, 46:
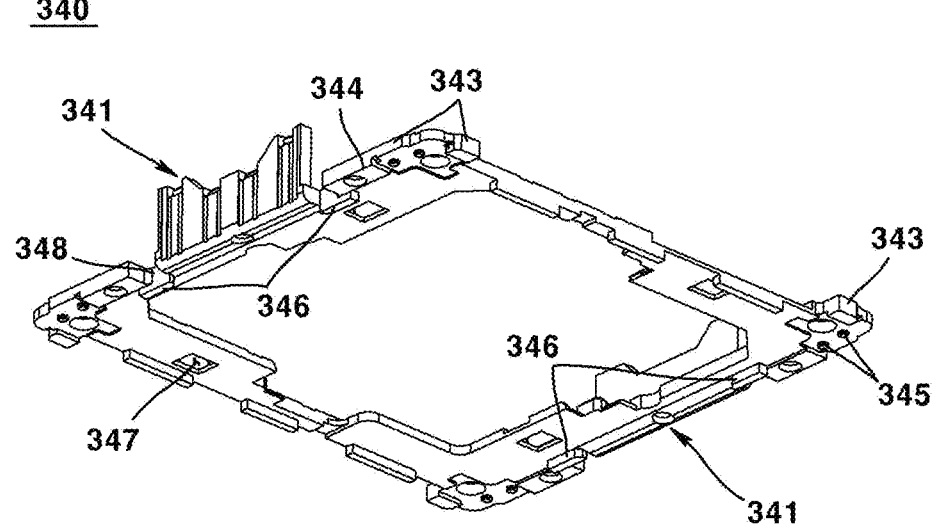
FIG. 46 is a bottom perspective view of a holder of a camera device according to the present embodiment.
Figure 47:
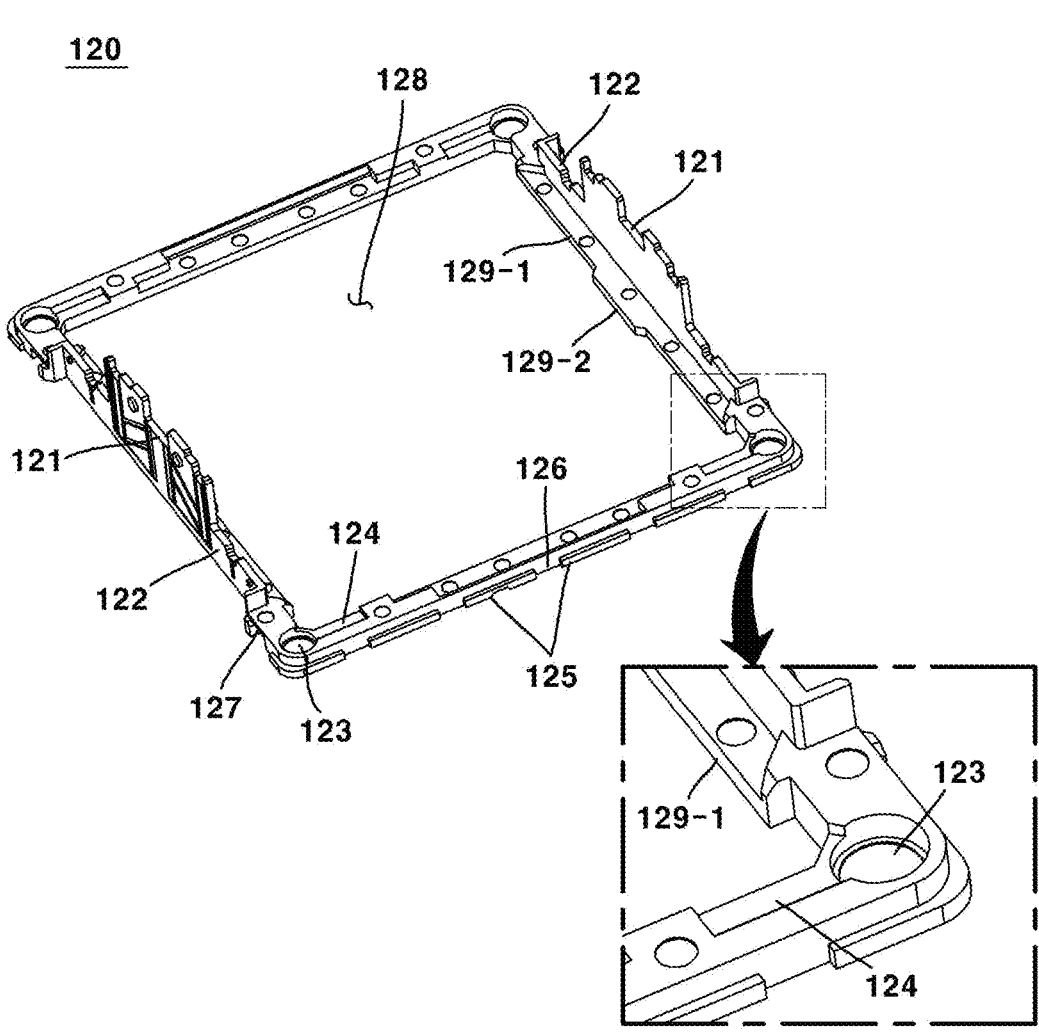
FIG. 47 is a perspective view of a base of a camera device according to the present embodiment.
Figure 50:
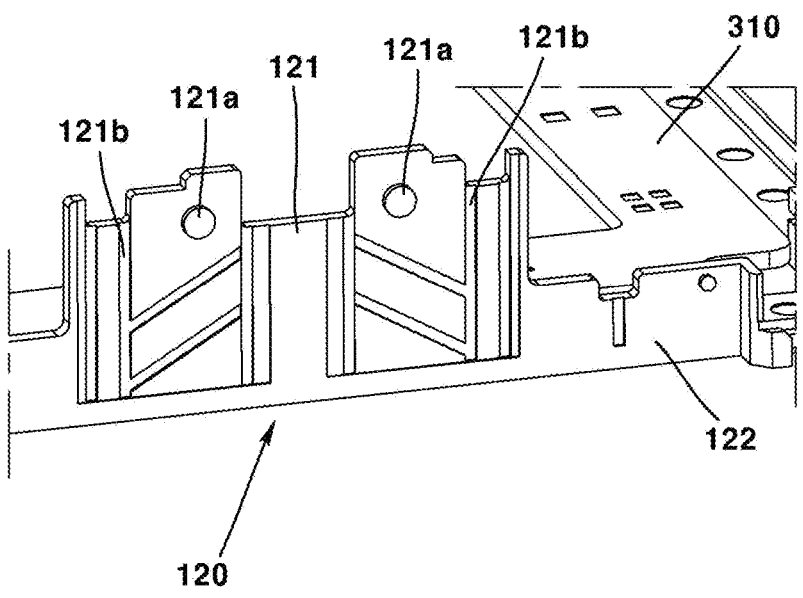
FIG. 50 is a perspective view illustrating a state in which a connection substrate is removed from a base according to the present embodiment.
Figure 51:
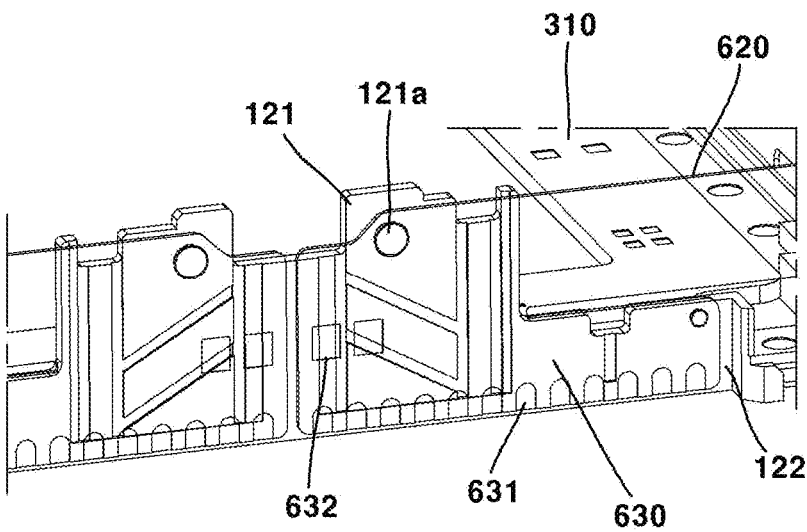
FIG. 51 is a see-through view illustrating a connection substrate being coupled to a base according to the present embodiment.
Figure 52:
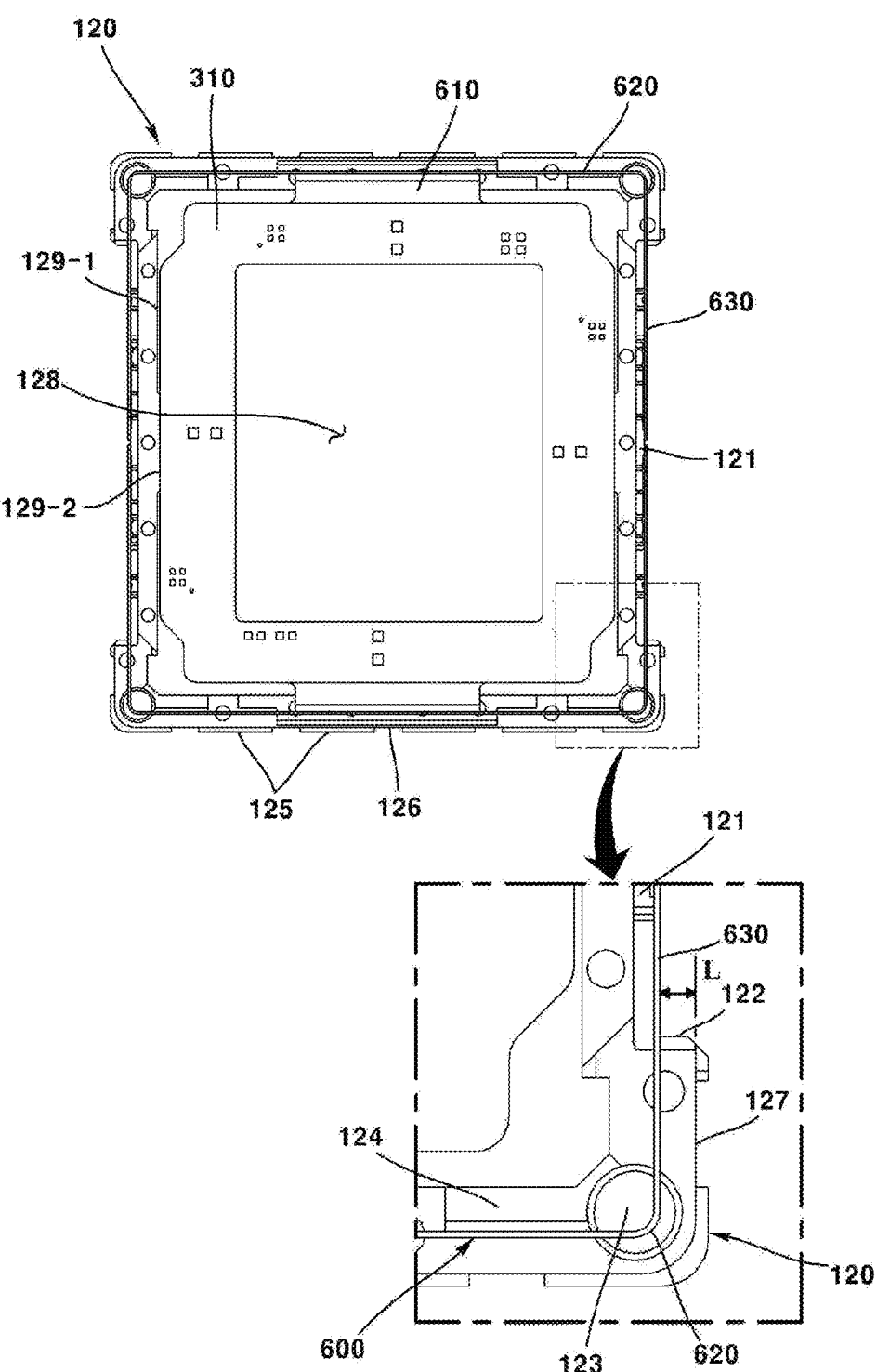
FIG. 52 is a plan view and a partially enlarged view of a partial configuration of a camera device in the state of FIG. 49 as viewed from above.
Figure 53:
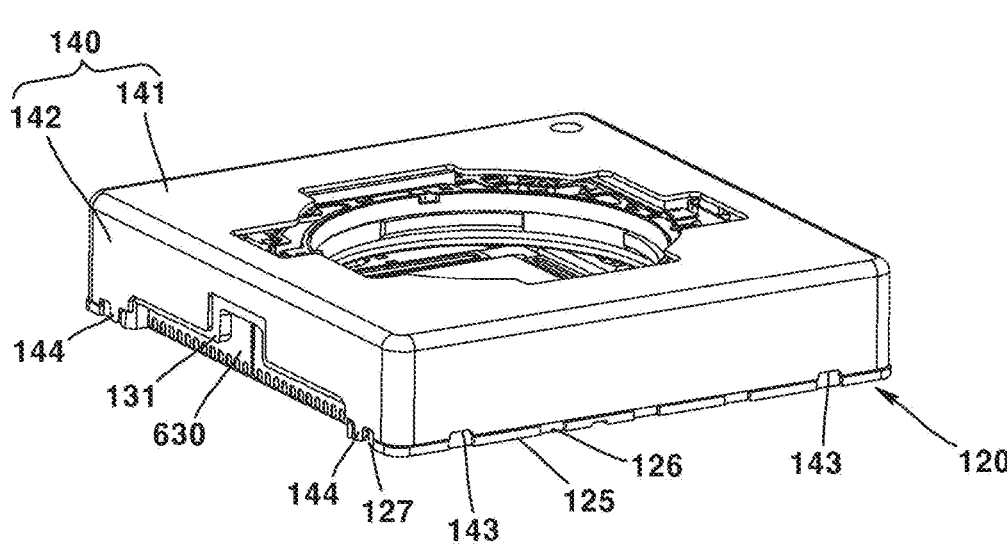
FIG. 53 is a perspective view of a camera device according to the present embodiment.
Figures 54A, 54B:
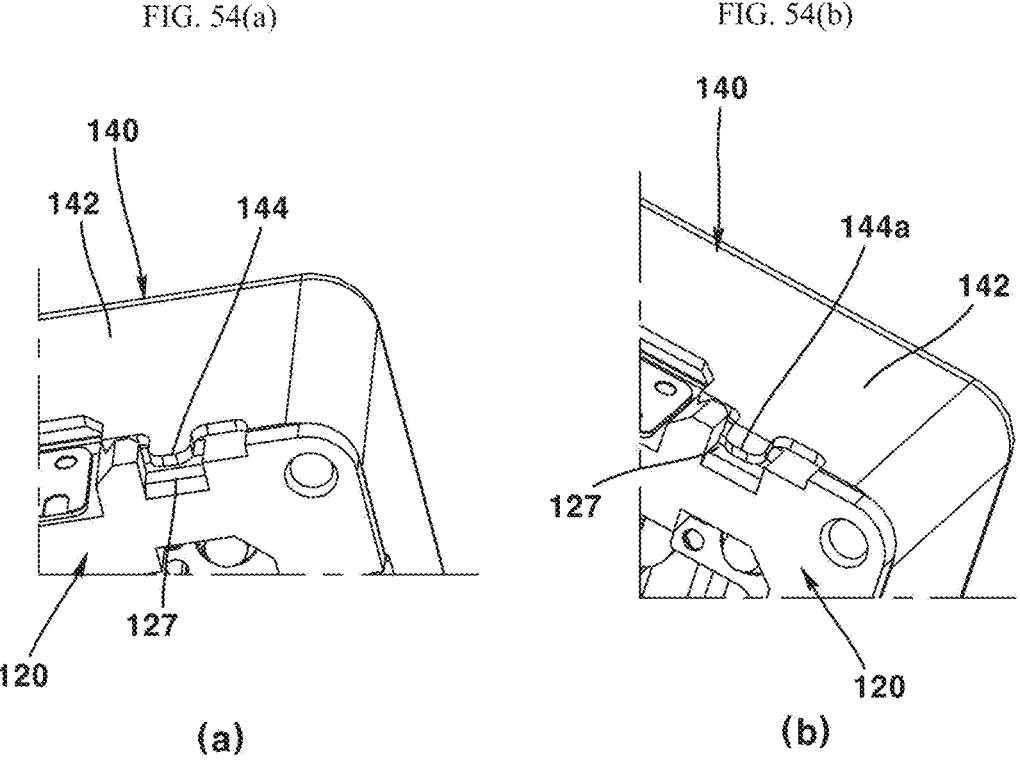
FIG. 54(*a*) is a bottom perspective view illustrating a groove of a base and a ground terminal of a camera device according to the present embodiment, FIG. 54(*b*) is a bottom perspective view of a modified embodiment in which a ground terminal is bent.

FIG. 1 is a perspective view of a camera device according to the present embodiment; FIG. 2 is a perspective view of a state in which a cover member is omitted from a camera device according to the present embodiment; FIG. 3 is a plan view of a camera device according to the present embodiment; FIG. 4 is a cross-sectional view taken along line A-A in FIG. 3; FIG. 5 is a cross-sectional view taken along line B-B in FIG. 3; FIG. 6 is a cross-sectional view taken along line C-C in FIG. 3; FIG. 7 is an exploded perspective view of a camera device according to the present embodiment; FIG. 8 is an exploded perspective view of a camera device according to the present embodiment viewed from a different direction from that of FIG. 7; FIG. 9 is an exploded perspective view of a first moving part and related components of the camera device according to the present embodiment; FIG. 10 is an exploded perspective view of a second moving part and related components of the camera device according to the present embodiment; FIG. 11 is a perspective view of a partial configuration of a connection substrate, a wire, and a second moving part of the camera device according to the present embodiment; FIG. 12 is a perspective view illustrating a coupling structure of a wire of a camera device according to the present embodiment; FIG. 13 is an enlarged view illustrating a part of FIG. 12; FIG. 14 is a perspective view illustrating a coupling structure of a connection substrate and a third substrate of a camera device according to the present embodiment; FIG. 15 is an enlarged view illustrating a part of FIG. 14; FIG. 16 is a perspective view of a second substrate and a connection substrate of a camera device according to a modified embodiment; FIG. 17 is a perspective view of a second substrate and a connection substrate of a camera device according to another modified embodiment; FIG. 18 is a perspective view of a second substrate and a connection substrate of a camera device according to another modified embodiment; FIG. 19 is a perspective view illustrating a magnet and a coil of a camera device according to the present embodiment; FIG. 20 is an exploded perspective view of a camera device according to the present embodiment; FIG. 21 is a perspective view illustrating a wing portion and related configuration of a housing according to the present embodiment; FIG. 22 is a cross-sectional perspective view illustrating a wing portion and related configuration of a housing according to the present embodiment; FIG. 23 is a cross-sectional view illustrating a part of a camera device according to the present embodiment; FIG. 24 is a cross-sectional perspective view illustrating a wing portion of a housing opposite to that of FIG. 22 and its associated configuration; FIG. 25 is a cross-sectional view illustrating a part of the camera device opposite to that of FIG. 23; FIG. 26 is a perspective view of a housing of a camera device according to the present embodiment; FIG. 27 is an exploded perspective view for explaining the coupling structure of a lens of a camera device according to the present embodiment; FIG. 28 is a perspective view of a state in which the cover member and the first substrate of a camera device according to the present embodiment are removed; FIG. 29 is a plan view of a state in which a cover member and a first substrate of a camera device according to the present embodiment are removed; FIG. 30 is an enlarged view illustrating the application structure of first to fourth dampers of a camera device according to the present embodiment; FIG. 31 is a cross-sectional view illustrating the coating structure of a first damper and a fourth damper of a camera device according to the present embodiment; FIG. 32(a) is a plan view illustrating a structure for applying a damper to a bobbin and an upper elastic member according to the present embodiment, FIG. 32(b) is a plan view illustrating a structure for applying a damper to a bobbin and an upper elastic member according to a modified embodiment, and (c) is a plan view illustrating a structure for damper application of a bobbin and an upper elastic member according to another modified embodiment; FIG. 33 is a cross-sectional view illustrating an application structure of a fourth damper of a camera device according to the present embodiment; FIG. 34 is a perspective view illustrating a structure for applying a coupling member of a camera device and a fourth damper of a base according to the present embodiment; FIG. 35 is a bottom view of a partial configuration of a camera device according to the present embodiment; FIG. 36 is a plan view of a partial configuration of a camera device in the state of FIG. 35; FIG. 37 is an enlarged view of a part of FIG. 36; FIG. 38 is a plan view illustrating a coil and a magnet of a camera device according to the present embodiment; FIG. 39 is a bottom view illustrating a coil and a magnet of a camera device according to the present embodiment; FIG. 40 is a side view illustrating a coil and a magnet of a camera device according to the present embodiment; FIG. 41 is a plan view of a holder of a camera device according to the present embodiment; FIG. 42 is an enlarged side view illustrating a holder and related configuration of a camera device according to the present embodiment; FIG. 43 is a perspective view of a holder of a camera device according to the present embodiment; FIGS. 44 and 45 are enlarged perspective views of a part of a holder of a camera device according to the present embodiment; FIG. 46 is a bottom perspective view of a holder of a camera device according to the present embodiment; FIG. 47 is a perspective view of a base of a camera device according to the present embodiment; FIG. 48(a) is a perspective view illustrating an arrangement structure of a coupling member and a base of a camera device according to the present embodiment, FIG. 48(b) is a bottom perspective view; FIG. 49 is a perspective view illustrating a coupled state of a base and a connection substrate according to the present embodiment; FIG. 50 is a perspective view illustrating a state in which a connection substrate is removed from a base according to the present embodiment; FIG. 51 is a see-through view illustrating a connection substrate being coupled to a base according to the present embodiment; FIG. 52 is a plan view and a partially enlarged view of a partial configuration of a camera device in the state of FIG. 49 as viewed from above; FIG. 53 is a perspective view of a camera device according to the present embodiment; and FIG. 54(a) is a bottom perspective view illustrating a groove of a base and a ground terminal of a camera device according to the present embodiment, FIG. 54(b) is a bottom perspective view of a modified embodiment in which a ground terminal is bent.

The camera device 10 may photograph any one or more of a video and an image. The camera device 10 may be a camera. The camera device 10 may be a camera module. The camera device 10 may be a camera assembly. The camera device 10 may be a camera unit. The camera device 10 may comprise a lens driving device. The camera device 10 may comprise a sensor driving device. The camera device 10 may comprise a voice coil motor (VCM). The camera device 10 may comprise an auto focus assembly. The camera device 10 may comprise a handshake correction assembly. The camera device 10 may comprise an autofocus device. The camera device 10 may comprise a handshake correction device. The camera device 10 may comprise an actuator. The camera device 10 may comprise a lens driving actuator. The camera device 10 may comprise a sensor driving actuator. The camera device 10 may comprise an auto focus actuator. The camera device 10 may comprise a handshake correction actuator.

The camera device 10 may comprise a fixed part 100. The fixed part 100 may be a part relatively fixed when the moving parts 200 and 300 are being moved. The fixed part 100 may be a part relatively fixed when at least one of the first moving part 200 and the second moving part 300 is being moved. The fixed part 100 may accommodate the first moving part 200 and the second moving part 300. The fixed part 100 may be disposed at an outer side of the first moving part 200 and the second moving part 300.

Although the first substrate 110 has been described as one configuration of the fixed part 100 throughout the specification, the first substrate 110 may be understood as a separate configuration from the fixed part 100. The fixed part 100 may be disposed in the first substrate 110. The fixed part 100 may be disposed on the first substrate 110. The fixed part 100 may be disposed above the first substrate 110.

The camera device 10 may comprise a first substrate 110. The fixed part 100 may comprise a first substrate 110. The first substrate 110 may be a main substrate. The first substrate 110 may be a substrate. The first substrate 110 may be a printed circuit board (PCB). The first substrate 110 may be connected to a power source of the optical apparatus 1. The first substrate 110 may comprise a connector being connected to the power source of the optical apparatus 1. The first substrate 110 may be spaced apart from the second substrate 310.

The camera device 10 may comprise a base 120. The fixed part 100 may comprise a base 120. The base 120 may be disposed in the first substrate 110. The base 120 may be disposed on the first substrate 110. The base 120 may be disposed above the first substrate 110. The base 120 may be fixed to the first substrate 110. The base 120 may be coupled to the first substrate 110. The base 120 may be attached to the first substrate 110 by an adhesive. The base 120 may be disposed between the first substrate 110 and the housing 130. The base 120 may be disposed in contact with an upper surface of the first substrate 110. The base 120 may be disposed to be spaced apart from the first substrate 110.

The connection substrate 600 may be disposed in the base 120. The connection substrate 600 may be connected to the base 120. The connection substrate 600 may be fixed to the base 120. The connection substrate 600 may be coupled to the base 120. The connection substrate 600 may be attached to the base 120. The connection substrate 600 may be fixed to the base 120 by an adhesive. The connection substrate 600 may be in contact with the base 120.

The base 120 may comprise a protruded part 121. The protruded part 121 may be protruded from the upper surface of the base 120. The protruded part 121 may be protruded upward from the outer side surface of the base 120. The connection substrate 600 may be disposed in the protruded part 121 of the base 120. The connection substrate 600 may be connected to the protruded part 121 of the base 120. The connection substrate 600 may be fixed to the protruded part

121 of the base 120. The connection substrate 600 may be coupled to the protruded part 121 of the base 120. The connection substrate 600 may be attached to the protruded part 121 of the base 120. The connection substrate 600 may be fixed to the protruded part 121 of the base 120 by an adhesive. The connection substrate 600 may be in contact with the protruded part 121 of the base 120. A protrusion structure of the base 120 for assembling the connection substrate 600 may be formed in the base 120.

The terminal unit 630 of the connection substrate 600 may be disposed in the protruded part 121 of the base 120. The terminal unit 630 of the connection substrate 600 may be connected to the protruded part 121 of the base 120. The terminal unit 630 of the connection substrate 600 may be fixed to the protruded part 121 of the base 120. The terminal unit 630 of the connection substrate 600 may be coupled to the protruded part 121 of the base 120. The terminal unit 630 of the connection substrate 600 may be attached to the protruded part 121 of the base 120. The terminal unit 630 of the connection substrate 600 may be fixed to the protruded part 121 of the base 120 by an adhesive. The terminal unit 630 of the connection substrate 600 may be in contact with the protruded part 121 of the base 120.

The base 120 may comprise a coupling protrusion 121a. The coupling protrusion 121a may be a boss. The coupling protrusion 121a may be coupled to the terminal unit 630 of the connection substrate 600. The coupling protrusion 121a may be coupled to the hole of the terminal unit 630 of the connection substrate 600. The coupling protrusion 121a may be inserted into the hole of the terminal unit 630 of the connection substrate 600. The coupling protrusion 121a may be formed in the protruded part 121 of the base 120. The coupling protrusion 121a may be formed in an upper region of the outer surface of the protruded part 121 of the base 120. An assembly guide boss for increasing the assembly position accuracy of the connection substrate 600 may be formed in the base 120. A hole being coupled to the boss may be formed in the connection substrate 600.

The base 120 may comprise a groove 121b. The groove 121b may be an adhesive accommodating groove. The groove 121b may be a bond deposition groove. An adhesive may be disposed in the groove 121b. The adhesive disposed in the groove 121b may fix the terminal unit 630 of the connection substrate 600 to the base 120. The groove 121b may be formed in the protruded part 121 of the base 120. The groove 121b may be formed on an outer surface of the protruded part 121 of the base 120. The groove 121b may comprise a plurality of grooves. A bond deposition groove may be formed in the base 120 to increase adhesion of the connection substrate 600.

At least a portion of an adhesive attaching the connection substrate 600 and the base 120 may be disposed in the groove 121b. The groove 121b may be formed on an outer side surface of the base 120. The groove 121b may be formed on an outer side surface of the protruded part 121. The groove 121b may be formed by being recessed in an outer surface of the protruded part 121. The groove 121b may open upward. Through this structure, the adhesive may be injected into the groove 121b from the upper side. The groove 121b may comprise a first portion being extended in an optical axis direction and a second portion being inclinedly connected to the first portion.

The plurality of grooves 122, 123, 124, 126, and 127 of the base 120 may be referred to as 'first to seventh grooves' to distinguish them from one another.

The base 120 may comprise a groove 122. The groove 122 may be a terminal accommodating groove. The groove 122 may be formed on a side surface of the base 120. A terminal unit 630 of the connection substrate 600 may be disposed in the groove 122. The stroke space of the extension portion 620 of the connection substrate 600 may be determined by the recessed depth of the groove 122. The groove 122 may be formed on an outer side surface of the base 120 facing the side plate 142 of the cover member 140. The groove 122 may be formed by the protruded part 121. In other words, the groove 122 may be formed by a step difference between the recessed outer side surface of the protruded part 121 and the outer side surface of the base 120. In the present embodiment, the assembly surface of the terminal unit 630 of the connection substrate 600 may be formed in the groove 122 being recessed from the outer edge of the base 120 in order to secure the stroke space of the connection substrate 600.

The base 120 may comprise a groove 123. The groove 123 may be a damper accommodating groove. The groove 123 may be formed on an upper surface of the base 120. The groove 123 may accommodate at least a portion of a fourth damper 940. The fourth damper 940 may be disposed in the groove 123. A dam structure is formed in the base 120 by the groove 123, and the fourth damper 940 may be disposed inside the dam. Through this, a phenomenon in which the fourth damper 940 is lost can be inhibited. A damper may be disposed in the groove 123 to be connected to the extension portion 383 of the coupling member 380. The base 120 may be provided with a groove structure so that the OIS damper is applicable.

The base 120 may comprise a groove 124. The groove 124 may be a groove for inhibiting the coupling member from being interfered. The groove 124 may be formed on an upper surface of the base 120. The groove 124 may be extended from the groove 123. The groove 124 may be extended from the groove 123 in a direction perpendicular to the optical axis direction. The groove 124 may inhibit the solder portion that couples the coupling member 380 and the wire 800 from interfering with the base 120 when the second moving part 300 is moved. The groove 124 may inhibit the extension portion 383 of the coupling member 380 from interfering with the base 120 when the second moving part 300 is moved. The groove 123 may be formed deeper from the upper surface of the base 120 than the groove 124. That is, the groove 123 that is the damper accommodating groove may be recessed deeper than the groove 124 that is a groove for inhibiting the coupling member from being interfered. The base 120 may comprise an avoidance structure for inhibiting interference with the solder portion of the coupling member 380 having a damper spring during OIS driving.

The base 120 may comprise a step portion 125. The step portion 125 may be protruded from an outer side surface of the base 120. A cover member 140 may be disposed in the step portion 125. A side plate 142 of the cover member 140 may be disposed in the step portion 125. The step portion 125 may be overlapped with the side plate 142 of the cover member 140 in an optical axis direction.

The camera device 10 may comprise a sealing member. The sealing member can inhibit foreign substances from entering the inside of the camera device 10. The sealing member may be disposed between the cover member 140 and the base 120. The sealing member may seal the gap between the cover member 140 and the base 120. A sealing member may be disposed between the step portion 125 of the base 120 and the side plate 142 of the cover member 140. At least a portion of the sealing member may be disposed in the plurality of fourth grooves 126 of the base 120 and the grooves 143 of the cover member 140.

The base 120 may comprise a groove 126. The groove 126 may be a sealing groove. The groove 126 may be formed in a side surface of the step portion 125. The groove 126 may be formed on an upper surface of the step portion 125. The groove 126 may comprise a plurality of grooves. The groove 126 may be formed as five grooves on one side surface of the base 120. The base 120 may have a sealing groove structure for inhibiting inflow of foreign substances into the actuator. Five grooves may be formed on one side surface of the lower end of the base 120.

The plurality of grooves 126 of the base 120 may comprise a plurality of grooves being disposed on any one of the four side surfaces of the base 120. The plurality of grooves 126 of the base 120 may comprise a plurality of grooves disposed on the first side surface of the base 120. At this time, in a direction perpendicular to the optical axis direction, the sum of the widths of the plurality of grooves 126 may be 17% to 37% of the width of the first side surface of the base 120. In a direction perpendicular to the optical axis direction, the sum of the widths of the plurality of grooves 126 may be 22% to 32% of the width of the first side surface of the base 120. In a direction perpendicular to the optical axis direction, the sum of the widths of the plurality of grooves 126 may be 25% to 29% of the width of the first side surface of the base 120.

The base 120 may comprise a groove 127. The groove 127 may be a groove for inhibiting the ground terminal from being interfered. The groove 127 may be recessed deeper than the thickness of the side plate 142 of the cover member 140 in a side surface of the step portion 125. The groove 127 may be formed at a position corresponding to the ground terminal 144 of the cover member 140.

In a modified embodiment, the groove 127 may accommodate at least a portion of the ground terminal 144a of the cover member 140. The groove 127 may accommodate at least a portion of the ground terminal 144a being bent inward from the side plate 142 of the cover member 140. A ground terminal 144 may be applied to the cover member 140 to be grounded to the first substrate 110. In a modified embodiment, when the ground terminal 144 is bent, an accommodating groove capable of avoiding this may be formed in the base 120.

The base 120 may comprise a hole 128. The hole 128 may be formed at a position corresponding to the image sensor 330. The hole 128 may be formed to be larger than the image sensor 330. The image sensor 330 may be assembled through the hole 128 of the base 120. The image sensor assembly in which the image sensor 330, the sensor substrate 320, the sensor base 350, the filter 360, and the plate member 370 are coupled is inserted through the hole 128 of the base 120, and thereby possibly being coupled to the second substrate 310.

The base 120 may comprise a first protruded part 129-1. The first protruded part 129-1 may be formed at an opposite side of the first groove 122 of the base 120. The first protruded part 129-1 may be protruded from an inner side surface of the base 120. The second substrate 310 may not be overlapped with the first protruded part 129-1 in an optical axis direction.

In the present embodiment, a hole for insertion of the image sensor assembly is formed in the central portion of the base 120 and a groove 122 for placement of the terminal unit 630 of the connection substrate 600 may be applied in an outer side portion of the base 120. The groove 122 of the base 120 may be recessed inward to secure a stroke space of the extension portion 620, but there is a problem in that the thickness of the base 120 in a direction from the groove 122 portion of the base 120 toward the direction perpendicular to the optical axis direction becomes thin due to the hole 128 of the base 120. In the present embodiment, the strength of the base 120 may be maintained by securing the thickness of the base 120 through the first protruded part 129-1. The second protruded part 129-2 may additionally be protruded inward from a partial region of the first protruded part 129-1.

The base 120 may comprise a second protruded part 129-2. The second protruded part 129-2 may be protruded from the first protruded part 129-1. The second protruded part 129-2 may additionally be protruded from the first protruded part 129-1. The second protruded part 129-2 may be protruded more inward than the first protruded part 129-1. The second substrate 310 may be overlapped with the second protruded part 129-2 in an optical axis direction.

The camera device 10 may comprise a housing 130. The fixed part 100 may comprise a housing 130. The housing 130 may be disposed in the base 120. The housing 130 may be disposed on the base 120. The housing 130 may be disposed above the base 120. The housing 130 may be fixed to the base 120. The housing 130 may be fixed to the cover member 140. The housing 130 may be coupled to the base 120. The housing 130 may be attached to the base 120 by an adhesive. The housing 130 may be disposed on the first substrate 110. The housing 130 may be disposed above the first substrate 110. The housing 130 may be formed of a member separate from the base 120. The housing 130 may be disposed on the holder 340. The housing 130 may be disposed between the base 120 and the cover member 140. The housing 130 may maintain a fixed state without moving during AF driving. The housing 130 may maintain a fixed state without moving during OIS driving.

The housing 130 may comprise a first side surface and a second side surface being disposed opposite to each other, and a third side surface and a fourth side surface being disposed opposite to each other. A wing portion 131 may be formed on each of the first side surface and the second side surface of the housing 130. A protruded part 132 may be formed on each of the third and fourth side surfaces of the housing 130.

The housing 130 may comprise a wing portion 131. The wing portion 131 may be disposed between the connection substrate 600 and the side plate 142 of the cover member 140. At least a portion of the terminal unit 630 of the connection substrate 600 may be disposed between the protruded part 121 of the base 120 and the wing portion 131 of the housing 130. The wing portion 131 may have a wing structure. The wing portion 131 may block the introduction of foreign substances between the connection substrate 600 and the side plate 142 of the cover member 140. The wing portion 131 may mitigate an external shock applied to the side plate 142 of the cover member 140. The housing 130 may be formed of an insulating member. The wing portion 131 may be a spacer portion. The wing portion 131 may be a sealing portion. The wing portion 131 may be a compensating portion. The wing portion 131 may be an extension portion. The wing portion 131 may comprise a horizontal extension portion and a vertical extension portion being extended downward from the horizontal extension portion. The wing portion 131 may comprise a first portion being extended in a first direction and a second portion being extended from the first portion in a second direction different from the first direction. The wing portion 131 may be spaced apart from the protruded part 121 of the base 120. The wing portion 131 may be spaced apart from the protruded part 121 of the base 120 within a tolerance range. Or, the wing portion 131 may be in contact with the protruded part 121 of the base 120. The wing portion 131 may be coupled to the protruded part 121 of the base 120. The width in the horizontal direction of the upper portion of the wing portion 131 may correspond to the width of the shortest part of the width in the horizontal direction of the terminal unit 630 of the connection substrate 600. Or, the width in the horizontal direction of the upper portion of the wing portion 131 may be longer than the width in the horizontal direction of the terminal unit 630 of the connection substrate 600. The width in the horizontal direction of the upper portion of the wing portion 131 may be shorter than the width of the shortest part of the width in the horizontal direction of the terminal unit 630 of the connection substrate 600. The wing portion 131 may be disposed for sealing only on the side where the terminal unit 630 is exposed.

In the sensor shift OIS actuator using the FPCB of the connection substrate 600, the essential separation distance that the FPCB can drive may be required. At this time, the required separation distance may be the separation distance between the FPCB and the stop part. That is, a separation distance that is vulnerable to foreign substances may occur. However, due to the difficulty in applying the separation distance to sealing structure, vulnerability to defects due to foreign substances may occur.

In the present embodiment, the wing portion 131, which is a wing structure coming down from the housing 130, may be inserted between the cover member 140 and the connection substrate 600 serving as a side surface stopper. As a modified embodiment, a separate spacer member may be disposed instead of the wing portion 131 coming down from the housing 130.

The sealing structure can be completed by inserting the wing structure being spread from the housing 130, which is an essential fixing structure, into the space between the connection substrate 600 and the side plate 142 of the cover member 140. Through this, it is possible to protect the product from external impact and foreign matter intrusion.

The base 120, the connection substrate 600, the wing portion 131 of the housing 130, and the side plate 142 of the cover member 140 may be sequentially disposed in a direction perpendicular to the optical axis direction. The distance between the connection substrate 600 and the side plate 142 of the cover member 140 in a direction perpendicular to the optical axis direction may be equal to the thickness of the wing portion 131 of the housing 130. The distance between the connection substrate 600 and the side plate 142 of the cover member 140 in a direction perpendicular to the optical axis direction may correspond to the thickness of the wing portion 131 of the housing 130. However, in consideration of manufacturing errors and assembly tolerances, if the thickness of the wing portion 131 of the housing 130 is 90% or more of the distance between the connection substrate 600 and the side plate 142 of the cover member 140, it may be considered to be the same. Or, if the inflow of foreign substances can be blocked, the thickness of the wing portion 131 of the housing 130 may be considered to be the same as the distance between the connection substrate 600 and the side plate 142 of the cover member 140.

The wing portion 131 of the housing 130 may comprise a groove 131a. A third substrate 470 may be disposed in the groove 131a. The groove 131a may be formed in a shape corresponding to the third substrate 470.

In a modified embodiment, the wing portion 131 of the housing 130 may be omitted. In this case, a separation member replacing the role of the wing portion 131 of the housing 130 may be provided. The separation member may be a space. The separation member may be a space member. The spacer member may be a sealing member. The separation member may be a compensating member. The separation member may be disposed between the connection substrate 600 and the side plate 142 of the cover member 140. Between the base 120 and the cover member 140 may be sealed through the wing portion 131 or the separation member.

The housing 130 may comprise a protruded part 132. The protruded part 132 may be protruded outward from the housing 130. The protruded part 132 may be protruded outward from each of the third and fourth side surfaces of the housing 130. The protruded part 132 may be in contact with the cover member 140. The protruded part 132 may be fixed to the cover member 140. The protruded part 132 may provide an assembly guide to the cover member 140. A stroke space for movement of the extension portion 620 of the connection member 600 may be secured by the protruded part 132.

The housing 130 may comprise a hole 133. The protruded part 121 of the base 120 may be inserted into the hole 133. The hole 133 may be formed adjacent to the wing portion 131. The hole 133 may be formed to penetrate through the housing 130 in an optical axis direction.

The housing 130 may comprise a hole 134. The hole 134 may be hole through which a wire passes. A wire 800 may be disposed in the hole 134. The wire 800 may pass through the hole 134. The wire 800 may penetrate through the hole 134. The hole 134 may be formed to have a larger diameter than the wire 800 so as not to be interfered with the wire 800.

The housing 130 may comprise a groove 135. The groove 135 may be formed on an upper surface of the housing 130. The groove 135 may be formed in a corner region of the upper surface of the housing 130. The groove 135 may be formed to be spaced apart from the outer side surface of the housing 130. The groove 135 may be disposed adjacent to the hole 134. A damper may be disposed in the groove 135.

The housing 130 may comprise a dam 136. The dam 136 may be formed between the outer side surface of the housing 130 and the groove 135 of the housing 130 by the groove 135 of the housing 130. A phenomenon in which the first damper 910 disposed inside the dam 136 is leaked to the outside may be inhibited by the dam 136.

The hole 134 of the housing 130 may comprise a chamfer. The hole 134 may avoid the wire 800 through the chamfer. The hole 134 of the housing 130 may comprise a first chamfer 134a whose width in a direction perpendicular to the optical axis direction increases as it travels toward the upper side. The hole 134 of the housing 130 may comprise a second chamfer 134b being disposed below the first chamfer 134a and has a width in a direction perpendicular to the optical axis direction increases as it travels toward the lower side. The length of the second chamfer 134b in an optical axis direction may be longer than the length of the first chamfer 134a in an optical axis direction. The length of the second chamfer 134b in an optical axis direction may be different from the length of the first chamfer 134a in an optical axis direction. The first damper 910 may be disposed from the first chamfer 134a to the second chamfer 134b. The shape of the chamfer of the hole 134 may be formed in the shape of a step. The hole 134 may comprise a shape of a step.

The camera device 10 may comprise a cover member 140. The fixed part 100 may comprise a cover member 140. The cover member 140 may be disposed in the base 140. The cover member 140 may be disposed on the base 140. The cover member 140 may be fixed to the base 120. The cover member 140 may be coupled to the base 120. The cover member 140 may be coupled to the housing 130. The cover member 140 may be coupled to the first substrate 110. The cover member 140 may be fixed to the base 120. The cover member 140 may be fixed to the housing 130. The cover member 140 may be fixed to the first substrate 110. The cover member 140 may cover at least a portion of the base 120. The cover member 140 may cover at least a portion of the housing 130. The cover member 140 may accommodate the housing 130 therein.

The cover member 140 may be a 'cover can' or a 'shield can'. The cover member 140 may be formed of a metal material. The cover member 140 may block electromagnetic interference (EMI). The cover member 140 may be electrically connected to the first substrate 110. The cover member 140 may be grounded to the first substrate 110.

The cover member 140 may comprise an upper plate 141. The cover member 140 may comprise a hole formed in the upper plate 141. The hole may be formed at a position corresponding to the lens 220. The cover member 140 may comprise a side plate 142. The side plate 142 may comprise a plurality of side plates. The side plate 142 may comprise four side plates. The side plate 142 may comprise first to fourth side plates. The side plate 142 may comprise first and second side plates being disposed opposite to each other, and third and fourth side plates being disposed opposite to each other. The cover member 140 may comprise a plurality of corners between the plurality of side plates.

The cover member 140 may comprise a groove 143. The groove 143 may be a groove in which sealing member is disposed. A sealing member may be disposed in the groove 143. The groove 143 may be formed in the side plate 142 of the cover member 140. The groove 143 may be connected to the groove 126 of the base 120. The groove 143 may be connected to any one or more among the plurality of grooves 126 of the base 120. The groove 143 may be disposed at a position corresponding to the groove 126 of the base 120. The groove 143 may be formed at a lower end of the side plate 142 of the cover member 140. The groove 143 may comprise a plurality of grooves. The number of grooves 143 may be smaller than that of the grooves 126 of the base 120. As a modified embodiment, the grooves 143 may be formed in the same number as the grooves 126 of the base 120.

The cover member 140 may comprise a ground terminal 144. The ground terminal 144 may be extended downward from the side plate 142. The ground terminal 144 may be coupled to the first substrate 110. The ground terminal 144 may be connected to the first substrate 110. The ground terminal 144 may be electrically connected to the first substrate 110. The ground terminal 144 may be coupled to the first substrate 110 through a conductive member. The ground terminal 144 may be soldered to the terminal of the first substrate 110. The cover member 140 may be electrically connected to the first substrate 110. The cover member 140 may be grounded to the first substrate 110.

The ground terminal 144 of the cover member 140 may be disposed at a position corresponding to the groove 127 of the base 120. Or, in a modified embodiment, the ground terminal 144a may be bent. The ground terminal 144a may be bent inward. At least a portion of the ground terminal 144a may be bent inwardly, and thereby possibly being disposed inside the groove 127 of the base 120.

Although the cover member 140 has been described as one configuration of the fixed part 100 throughout the specification, the cover member 140 may be understood as a configuration separate from the fixed part 100. The cover member 140 may be coupled to the fixed part 100. The cover member 140 may cover the first moving part 200.

The camera device 10 may comprise a control unit. The control unit may be disposed in the first substrate 110. The control unit may be disposed next to the cover member 140. The control unit may comprise an individual shield can smaller than the cover member 140. The control unit may comprise a driver IC. The control unit may control the operation of the camera device 10.

The camera device 10 may comprise a first moving part 200. The first moving part 200 may move against the fixed part 100. The first moving part 200 may move in the optical axis direction against the fixed part 100. The first moving part 200 may be disposed in the fixed part 100. The first moving part 200 may be movably disposed in the fixed part 100. The first moving part 200 may be movably disposed in an optical axis direction in the fixed part 100. An auto focus (AF) function may be performed by moving the first moving part 200 in an optical axis direction against the fixed part 100. The first moving part 200 may be disposed on the second moving part 300.

The camera device 10 may comprise a bobbin 210. The first moving part 200 may comprise a bobbin 210. The bobbin 210 may be disposed on the first substrate 110. The bobbin 210 may be disposed above the first substrate 110. The bobbin 210 may be disposed to be spaced apart from the first substrate 110. The bobbin 210 may be disposed inside the housing 130. The bobbin 210 may be disposed at an inner side of the housing 130. At least a portion of the bobbin 210 may be accommodated in the housing 130. The bobbin 210 may be movably disposed in the housing 130. The bobbin 210 may be movably disposed in the housing 130 in an optical axis direction. The bobbin 210 may be coupled to the lens 220. The bobbin 210 may comprise a hollow or a hole. The lens 220 may be disposed in a hollow or hole of the bobbin 210. The outer circumferential surface of the lens 220 may be coupled to the inner circumferential surface of the bobbin 210.

The camera device 10 may comprise a lens 220. The first moving part 200 may comprise a lens 220. The lens 220 may be coupled to the bobbin 210. The lens 220 may be fixed to the bobbin 210. The lens 220 may move integrally with the bobbin 210. The lens 220 may be screw-coupled to the bobbin 210. The lens 220 may be attached to the bobbin 210 by an adhesive. The lens 220 may be disposed at a position corresponding to the image sensor 330. The optical axis of the lens 220 may coincide with the optical axis of the image sensor 330. The optical axis may be the z-axis. The lens 220 may comprise a plurality of lenses. The lens 220 may comprise a 5-element or 6-element lens.

The camera device 10 may comprise a lens module. The lens module may be coupled to the bobbin 210. The lens module may comprise a barrel and one or more lenses 220 being disposed inside the barrel.

The bobbin 210 may comprise a protrusion 211 protruding from an inner circumferential surface of the bobbin 210. The lens 220 may comprise a groove 221 formed in an outer circumferential surface of the lens 220. The groove 221 of the lens 220 may comprise a first groove 221a being extended from a lower surface of the lens 220 in an optical axis direction. The groove 221 of the lens 220 may comprise a second groove 221b being extended from the first groove 221a in a direction perpendicular to the optical axis direction and spaced apart from a lower end of the first groove 221a. At least a portion of the protrusion 211 of the bobbin 210 may be disposed in the second groove 221b of the lens 220.

The bobbin 210 may comprise a groove 212. The groove 212 may be formed on an upper surface of the bobbin 210. The groove 212 may be a damper tank. The groove 212 may be described as being formed by recessing a portion of the upper surface of the bobbin 210. Or, the groove 212 may be described as the remaining portion from which a portion of the upper surface of the bobbin 210 is protruded. A damper may be disposed in the groove 212. The groove 212 may comprise a curved side surface surrounding the damper.

The bobbin 210 may comprise a protrusion 213. The protrusion 213 may be formed on an upper surface of the bobbin 210. The protrusion 213 may be protruded from an upper surface of the bobbin 210. The protrusion 213 may be protruded from one surface of the bobbin 210. The protrusion 213 may be protruded upward from the bobbin 210. A third damper 930 may be applied to the protrusion 213.

The bobbin 210 may comprise a sensing magnet mounting portion 214. The sensing magnet mounting portion 214 may be protruded from an outer circumferential surface of the bobbin 210. The sensing magnet mounting portion 214 may be protruded from an outer side surface of the bobbin 210. The sensing magnet mounting portion 214 may be protruded more than the AF coil 430 from an outer circumferential surface of the bobbin 210. A sensing magnet 450 may be disposed in the sensing magnet mounting portion 214. The sensing magnet mounting portion 214 may comprise a groove. At least a portion of the sensing magnet 450 may be disposed in a groove of the sensing magnet mounting portion 214. The sensing magnet 450 may be fixed to the sensing magnet mounting portion 214 by an adhesive.

The bobbin 210 may comprise a balancing magnet mounting portion 215. The balancing magnet mounting portion 215 may be protruded from the outer circumferential surface of the bobbin 210. The balancing magnet mounting portion 215 may be protruded from an outer side surface of the bobbin 210. The balancing magnet mounting portion 215 may be protruded more than the AF coil 430 from an outer circumferential surface of the bobbin 210. A balancing magnet 460 may be disposed in the balancing magnet mounting portion 215. The balancing magnet mounting portion 215 may comprise a groove. At least a portion of the balancing magnet 460 may be disposed in a groove of the balancing magnet mounting portion 215. The balancing magnet 460 may be fixed to the balancing magnet mounting portion 215 by an adhesive.

The lens 220 may be inserted from the upper side of the bobbin 210. At this time, the protrusion 211 of the bobbin 210 may pass through the first groove 221a of the lens 220. When the protrusion 211 of the bobbin 210 is caught on the upper end of the first groove 221a of the lens 220, the lens 220 may be rotated against the bobbin 210. At this time, the protrusion 211 of the bobbin 210 may be inserted into the second groove 221b of the lens 220. When the protrusion 211 of the bobbin 210 is inserted into the second groove 221b of the lens 220, the movement of the lens 220 in an optical axis direction against the bobbin 210 may be arrested. The lens 220 may be fixed to the bobbin 210 by an adhesive.

In the present embodiment, the protrusion 211 is formed in the bobbin 210 and the groove 221 is formed in the lens 220, but in a modified embodiment, the bobbin 210 comprises the groove and the lens 220 may comprise a protrusion coupled to the groove of the bobbin 210.

The camera device 10 may comprise a second moving part 300. The second moving part 300 may move against the fixed part 100. The second moving part 300 may move in a direction perpendicular to the optical axis direction against the fixed part 100. The second moving part 300 may be disposed inside the fixed part 100. The second moving part 300 may be movably disposed inside the fixed part 100. The second moving part 300 may be movably disposed in the fixed part 100 in a direction perpendicular to the optical axis direction. A handshake correction (OIS) function may be performed by moving the second moving part 300 in a direction perpendicular to the optical axis direction against the fixed part 100. The second moving part 300 may be disposed between the first moving part 200 and the first substrate 110.

The camera device 10 may comprise a second substrate 310. The second moving part 300 may comprise a second substrate 310. The second substrate 310 may be a substrate. The second substrate 310 may be a printed circuit board (PCB). The second substrate 310 may be disposed between the first moving part 200 and the first substrate 110. The second substrate 310 may be disposed between the bobbin 210 and the first substrate 110. The second substrate 310 may be disposed between the lens 220 and the first substrate 110. The second substrate 310 may be spaced apart from the fixed part 100. The second substrate 310 may be spaced apart from the fixed part 100 in an optical axis direction and a direction perpendicular to the optical axis direction. The second substrate 310 may move in a direction perpendicular to the optical axis direction. The second substrate 310 may be electrically connected to the image sensor 330. The second substrate 310 may move integrally with the image sensor 330. The second substrate 310 may comprise a hole. An image sensor 330 may be disposed in a hole of the second substrate 310. The second substrate 310 may be coupled to an upper surface of the sensor substrate 320. The second substrate 310 may be disposed on an upper surface of the sensor substrate 320. The second substrate 310 may be fixed to an upper surface of the sensor substrate 320. The second substrate 310 may be spaced apart from the housing 130. The second substrate 310 may be disposed in the holder 340.

The second substrate 310 may comprise a terminal 311. The terminal 311 may be disposed on a lower surface of the second substrate 310. The terminal 311 may be coupled to the terminal 321 of the sensor substrate 320. The second substrate 310 may be formed separately from the sensor substrate 320. The second substrate 310 may be formed separately from the sensor substrate 320 to be coupled thereto. The terminal 321 of the sensor substrate 320 may be soldered to the terminal 311 of the second substrate 310.

The camera device 10 may comprise a sensor substrate 320. The second moving part 300 may comprise a sensor substrate 320. The sensor substrate 320 may be a substrate. The sensor substrate 320 may be a printed circuit board (PCB). The sensor substrate 320 may be coupled to the image sensor 330. The sensor substrate 320 may be coupled to the second substrate 310.

The sensor substrate 320 may comprise a hole. The hole may be hollow. An image sensor 330 may be disposed in the hole of the sensor substrate 320. A portion of the plate member 370 may be disposed in the hole of the sensor substrate 320. The protruded part 374 of the plate member 370 may be disposed in the hole of the sensor substrate 320. The hole of the sensitive substrate 320 may be formed in a size and shape corresponding to the protruded part 374 of the plate member 370.

The sensor substrate 320 may comprise a terminal 321. The terminal 321 of the sensor substrate 320 may be coupled to the terminal 311 of the second substrate 310. The sensor substrate 320 may be coupled to a lower surface of the second substrate 310. The sensor substrate 320 may be disposed below the second substrate 310. The sensor substrate 320 may be coupled below the second substrate 310 in a state being coupled with the image sensor 330.

The camera device 10 may comprise an image sensor 330. The second moving part 300 may comprise an image sensor 330. The image sensor 330 may be disposed in the sensor substrate 320. The image sensor 330 may be disposed between the sensor substrate 320 and the sensor holder 350. The image sensor 330 may be electrically connected to the second substrate 310. The image sensor 330 may move integrally with the second substrate 310. The image sensor 330 may be disposed below the lens 220. The image sensor 330 may be disposed in the plate member 370 and may be electrically connected to the sensor substrate 320 through wire bonding. The image sensor 330 may be movably disposed. The image sensor 330 may move in a direction perpendicular to the optical axis direction. The image sensor 330 may rotate about an optical axis.

An image may be formed when light passing through the lens 220 and the filter 360 is incident on the image sensor 330. The image sensor 330 may be electrically connected to the sensor substrate 320, the second substrate 310, and the first substrate 110. The image sensor 330 may comprise an effective image area. The image sensor 330 may convert light irradiated to the effective image area into an electrical signal. The image sensor 330 may comprise any one or more among a charge coupled device (CCD), a metal oxide semiconductor (MOS), a CPD, and a CID.

The camera device 10 may comprise a holder 340. The second moving part 300 may comprise a holder 340. The holder 340 may be formed of an insulating material. The holder 340 may be disposed in the second substrate 310. The holder 340 may be disposed on the second substrate 310. The holder 340 may be disposed above the second substrate 310. The holder 340 may be fixed to the second substrate 310. The holder 340 may be coupled to the second substrate 310. The holder 340 may comprise a hollow or a hole in which the image sensor 330 is disposed. An OIS coil 440 may be disposed on the holder 340. The holder 340 may comprise a protrusion on which the OIS coil 440 is wound. The holder 340 may comprise a hole in which the sensor 445 is disposed. The holder 340 may be spaced apart from the housing 130. The holder 340 may move in a direction perpendicular to the optical axis direction or rotate about the optical axis by the interaction between the driving magnet and the OIS coil 440 together with the image sensor 330. The holder 340 is a member on which the OIS coil 440 is disposed and may be a coil holder.

A connection substrate 600 may be disposed in the holder 340. The connection substrate 600 may be connected to the holder 340. The connection substrate 600 may be fixed to the holder 340. The connection substrate 600 may be coupled to the holder 340. The connection substrate 600 may be attached to the holder 340. The connection substrate 600 may be fixed to the holder 340 by an adhesive. The connection substrate 600 may be in contact with the holder 340.

The holder 340 may comprise a protruded part 341. The protruded part 341 may be protruded from an upper surface of the holder 340. The protruded part 341 may be protruded upward from the outer side surface of the holder 340. The connection substrate 600 may be disposed in the protruded part 341 of the holder 340. The connection substrate 600 may be connected to the protruded part 341 of the holder 340. The connection substrate 600 may be fixed to the protruded part 341 of the holder 340. The connection substrate 600 may be coupled to the protruded part 341 of the holder 340. The connection substrate 600 may be attached to the protruded part 341 of the holder 340. The connection substrate 600 may be fixed to the protruded part 341 of the holder 340 by an adhesive. The connection substrate 600 may be in contact with the protruded part 341 of the holder 340.

The holder 340 may comprise a protrusion 342. The protrusion 342 may be protruded from an upper surface of the holder 340. The protrusion 342 may be disposed inside the OIS coil 440. The protrusion 342 may be protruded above the OIS coil 440. The OIS coil 440 may be wound around the protrusion 342 of the holder 340.

The protrusion 342 of the holder 340 may be overlapped with the driving magnet in an optical axis direction. The OIS coil 440 may be overlapped with the driving magnet in an optical axis direction. The distance in the optical axis direction between the OIS coil 440 and the driving magnet may be longer than the distance in the optical axis direction between the protrusion 342 of the holder 340 and the driving magnet. The protrusion 342 of the holder 340 may be in contact with the driving magnet when the holder 340 moves upward. At this time, the OIS coil 440 may be spaced apart from the driving magnet. That is, since the holder 340 and the protrusion 342 come into contact with the driving magnet before the OIS coil 440, the phenomenon that the OIS coil 440 comes into contact with the driving magnet can be inhibited.

The protrusion 342 may comprise a plurality of protrusions. The protrusion 342 may be formed in a number corresponding to the number of the OIS coils 440. The protrusion 342 may comprise first to fourth protrusions corresponds to a first-first coil 441-1, a first-second coil 441-2, a second-first coil 442-1, and a second-second coil 442-2. At this time, each of the first to fourth protrusions of the holder 340 may comprise four protrusions spaced apart from each other. That is, inside each of the first-first coil 441-1, the first-second coil 441-2, the second-first coil 442-1, and the second-second coil 442-2, four protrusions may be disposed. The four protrusions may be disposed in a row.

The holder 340 may comprise a first stopper portion 343. The first stopper portion 343 may be a lateral stopper. The first stopper portion 343 may be protruded more outward than the extension portion 620 of the connection substrate 600. In a direction perpendicular to the optical axis direction, the distance between the extension portion 620 of the connection substrate 600 and the cover member 140 may be longer than the distance between the first stopper portion 343 of the holder 340 and the cover member 140. The first stopper portion 343 may be disposed in a side surface of the holder 340 closer to a corner of the holder 340 than the center of the side of the holder 340.

The holder 340 may comprise a second stopper portion 344. The second stopper portion 344 may be a lower stopper. The second stopper portion 344 may be in contact with the base 120 when the holder 340 moves downward. The second stopper portion 344 may be protruded below the coupling protrusion 345.

The holder 340 may comprise a coupling protrusion 345. The coupling protrusion 345 may protrude from a lower surface of the holder 340. The coupling protrusion 345 may be coupled to the coupling member 380. The coupling protrusion 345 may be coupled to a hole of the coupling member 380. The coupling protrusion 345 may be inserted into the hole of the coupling member 380. As a modified embodiment, the coupling protrusion 345 may be replaced with a groove. That is, a groove may be formed at a corresponding position instead of the coupling protrusion 345. In this case, an adhesive may be disposed in the groove of the holder 340 to fix the coupling protrusion 345.

The holder 340 may comprise a protruded part 346. The protruded part 346 may comprise two protruded parts 346 being protruded below the second substrate 310. The connection part 610 of the connection substrate 600 may be disposed between the two protruded parts 346. The protruded part 346 of the holder 340 may be protruded below the second stopper portion 344.

The holder 340 may comprise a hole 347. The hole 347 may be a sensor avoidance hole. A sensor 445 may be disposed in the hole 347. At least a portion of the sensor 445 may be disposed in the hole 347 of the holder 340.

The holder 340 may comprise a groove 348. The groove 348 may be formed in an outer circumferential surface of the holder 340. The groove 348 may be formed by being depressed from the outer side surface of the holder 340. The groove 348 may be formed between the protruded part 341 and the first stopper portion 343. The groove 348 may be formed between the connection substrate 600 and the first stopper portion 343. Through the groove 348, the phenomenon that the bent portion of the connection substrate 600 is interfered with the holder 340 can be inhibited.

At least a portion of the connection part 610 and the extension portion 620 of the connection substrate 600 may be disposed in the protruded part 341 of the holder 340. At least a portion of the connection part 610 and the extension portion 620 of the connection substrate 600 may be connected to the protruded part 341 of the holder 340. At least a portion of the connection part 610 and the extension portion 620 of the connection substrate 600 may be fixed to the protruded part 341 of the holder 340. At least a portion of the connection part 610 and the extension portion 620 of the connection substrate 600 may be coupled to the protruded part 341 of the holder 340. At least a portion of the connection part 610 and the extension portion 620 of the connection substrate 600 may be attached to the protruded part 341 of the holder 340. At least a portion of the connection part 610 and the extension portion 620 of the connection substrate 600 may be fixed to the protruded part 341 of the holder 340 by an adhesive. At least a portion of the connection part 610 and the extension portion 620 of the connection substrate 600 may be in contact with the protruded part 341 of the holder 340.

The holder 340 may comprise a hole. The wire 800 may pass through the hole 342 of the holder 340. The hole of the holder 340 may be formed to have a larger diameter than the wire 800 so that the holder 340 and the wire 800 do not interfere when the holder 340 is moved. A damper may be disposed in the hole of the holder 340.

The holder 340 may comprise a groove. The groove may be an adhesive accommodating groove. At least a portion of an adhesive attaching the connection substrate 600 and the holder 340 may be disposed in the groove. The groove may be formed in an outer side surface of the holder 340. The groove may be formed in an outer side surface of the protruded part 341. The groove may be formed by being recessed in an outer surface of the protruded part 341. The groove may open upward. Through this structure, the adhesive can be injected into the groove from the upper side. The groove may comprise a plurality of grooves. The groove may comprise a step 342a. From the connection substrate 600 to the portion fixed to the holder 340 may be referred to as a connection part 610.

The holder 340 may comprise a groove. The groove may be formed on a lower surface of the holder 340. The groove may be recessed from a lower surface of the holder 340. The groove may be disposed at a position corresponding to the bent portion of the connection part 610 of the connection substrate 600. The groove may be disposed adjacent to the bent portion of the connection part 610 of the connection substrate 600. An adhesive may be disposed in the groove.

The holder 340 may comprise a groove. The groove may be formed by being recessed from an outer circumferential surface of the holder 340. The groove may be disposed next to the protruded part 341. The groove may be formed to inhibit interference with the connection substrate 600.

The camera device 10 may comprise a sensor base 350. The second moving part 300 may comprise a sensor base 350. The sensor base 350 may be disposed in the sensor substrate 320. The sensor base 350 may comprise a hole formed at a position corresponding to the image sensor 330. The sensor base 350 may comprise a groove in which the filter 360 is disposed.

The camera device 10 may comprise a filter 360. The second moving part 300 may comprise a filter 360. The filter 360 may be disposed between the lens 220 and the image sensor 330. The filter 360 may be disposed in the sensor base 350. The filter 360 may block light having a specific frequency band from being incident on the image sensor 330 from the light passing through the lens 220. The filter 360 may comprise an infrared cut filter. The filter 360 may block infrared rays from being incident on the image sensor 330.

The camera device 10 may comprise a plate member 370. The second moving part 300 may comprise a plate member 370. The plate member 370 may be a SUS. The plate member 370 may be formed of a SUS. The plate member 370 may be formed of a copper alloy. The plate member 370 may comprise copper. The plate member 370 may be a reinforcing plate. The plate member 370 may be a stiffener. The plate member 370 may be coupled to a lower surface of the sensor substrate 320. The plate member 370 may be disposed in a lower surface of the sensor substrate 320. The plate member 370 may be in contact with a lower surface of the sensor substrate 320. The plate member 370 may be fixed to a lower surface of the sensor substrate 320. The plate member 370 may be attached to a lower surface of the sensor substrate 320 by an adhesive.

In the present embodiment, the image sensor 330 may be directly disposed in the plate member 370. Meanwhile, the plate member 370 may be easier to manage flatness than the sensor substrate 320. Through this, it is possible to easily manage the flatness of the mounting surface of the image sensor 330. The image sensor 330 may be electrically connected to the sensor substrate 320 through wire bonding. The image sensor 330 may be electrically connected to the sensor substrate 320.

The plate member 370 may comprise a protruded part 374. The protruded part 374 may be protruded from an upper surface of the plate member 370. At least a portion of the protruded part 374 may be disposed in the hole of the sensor substrate 320. The protruded part 374 of the plate member 370 may be overlapped with the sensor substrate 320 in a direction perpendicular to the optical axis direction. The image sensor 330 may be disposed on the protruded part 374 of the plate member 370. The image sensor 330 may be disposed on the protruded part 374 of the plate member 370. The image sensor 330 may be in contact with the protruded part 374 of the plate member 370. The image sensor 330 may be fixed to the protruded part 374 of the plate member 370. The image sensor 330 may be attached to the protruded part 374 of the plate member 370 by an adhesive.

The plate member 370 may comprise a support region. The support region may be coupled to the sensor substrate 320. The support region may be a support portion. The support region may be disposed at an outer side of the protruded part 374. A support region may form an edge. The protruded part 374 may be protruded from the support region. The thickness of the protruded part 374 may be smaller than the thickness of the sensor substrate 320. At this time, the thickness of the protruded part 374 may be the thickness from the upper surface of the support region to the upper surface of the protruded part 374. That is, the thickness from the upper surface of the support region to the upper surface of the protruded part 374 may be smaller than the thickness of the sensor substrate 320.

The upper surface of the image sensor 330 being disposed in the plate member 370 may be disposed at the same height as the upper surface of the sensor substrate 320. The thickness of the image sensor 330 may be thinner than the thickness of the sensor substrate 320. The height of the seating surface of the image sensor 330 of the plate member 370 may be lower than the height of the upper surface of the sensor substrate 320.

The camera device 10 may comprise a coupling member 380. The second moving part 300 may comprise a coupling member 380. The coupling member 380 may be disposed in the holder 340. The coupling member 380 may be coupled to the wire 800. The coupling member 380 may be connected to the wire 800 through solder. The coupling member 380 may be formed of a metal. The coupling member 380 may comprise a hole through which the wire 800 passes. The coupling member 380 may comprise a buffer for shock mitigation. The coupling member 380 may comprise a shape bent a plurality of times. The coupling member 380 may comprise a plurality of terminals. The coupling member 380 may comprise four terminals being disposed in the four corner regions of the holder 340. The coupling member 380 may be a metal plate. The coupling member 380 may be formed of a metal. The coupling member 380 may be a plate. The coupling member 380 may be a terminal member. The coupling member 380 may be a terminal.

The coupling member 380 may comprise a hole 381. The coupling member 380 may comprise a hole 381 in which the wire 800 is disposed. The coupling member 380 may comprise a hole 381 through which the wire 800 passes. The diameter of the hole 381 of the coupling member 380 may be different from the diameter of the hole 714*a* of the upper elastic member 710. The diameter of the hole 381 of the coupling member 380 (refer to D1 in FIG. 13) may be larger than the diameter of the hole 714*a* of the upper elastic member 710 (refer to D2 in FIG. 13). Through this, the assembly concentricity of the wire 800 may be improved. In addition, workability in the process of coupling the wire 800 to the upper elastic member 710 and the coupling member 380 may be improved. As a modified embodiment, the diameter of the hole 381 of the coupling member 380 may be smaller than the diameter of the hole 714*a* of the upper elastic member 710.

The coupling member 380 may comprise a hole 382. The hole 382 may be formed in a portion of the circumference of the portion being coupled to the wire 800. The hole 382 may be configured to inhibit disconnection of the wire 800.

The coupling member 380 may comprise a coupling portion 380*a*. The coupling portion 380*a* may be coupled to the wire 800. The coupling portion 380*a* may be coupled to the holder 340.

The coupling member 380 may comprise an extension portion 383. The extension portion 383 may be extended from the coupling portion 380a toward the groove 123 of the base 120. The extension portion 383 may form an obtuse angle with the coupling portion 380a. Or, the extension portion 383 may form a right angle with the coupling portion 380a. Or, the extension portion 383 may form an acute angle with the coupling portion 380a. The extension portion 383 may be extended from the coupling portion 380a. The extension portion 383 may be extended in a direction different from the arrangement direction of the coupling portion 380a. The extension portion 383 may be bent and extended. A fourth damper 940 being disposed in the base 120 may be connected to the extension portion 383.

In a modified embodiment, the coupling member 380 may be omitted. For an example, the lower end of the wire 800 may be coupled to the base 120. The base 120 may comprise a surface electrode for coupling with the wire 800. The lower end of the wire 800 may be soldered to the surface electrode of the base 120.

The camera device 10 may comprise a driving unit. The driving unit may move the moving parts 200 and 300 against the fixed part 100. The driving unit may perform an auto-focus (AF) function. The driving unit may perform a hand-shake correction (OIS) function. The driving unit may move the lens 220. The driving unit may move the image sensor 330. The driving unit may comprise a magnet and a coil. The driving unit may comprise a shape memory alloy (SMA).

The driving unit may comprise a driving magnet. The driving magnet may be disposed in the housing. The driving magnet may comprise a plurality of magnets. The driving magnet may comprise first to fourth magnets 401, 402, 403, and 404. The driving magnet may comprise first and second magnets 401 and 402 being disposed opposite to each other. The driving magnet may comprise third and fourth magnets 403 and 404 being disposed opposite to each other.

The distance between the first magnet 401 and the third magnet 403 may be different from the distance between the first magnet 401 and the fourth magnet 404. The distance between the first magnet 401 and the third magnet 403 may be greater than the distance between the first magnet 401 and the fourth magnet 404. The distance between the second magnet 402 and the fourth magnet 404 may be different from the distance between the second magnet 401 and the third magnet 403. The distance between the second magnet 402 and the fourth magnet 404 may be greater than the distance between the second magnet 401 and the third magnet 403. In a modified embodiment, the distance between the first magnet 401 and the third magnet 403 may be shorter than the distance between the first magnet 401 and the fourth magnet 404. The distance between the second magnet 402 and the fourth magnet 404 may be shorter than the distance between the second magnet 401 and the third magnet 403.

The sensing magnet 450 may be disposed between the first magnet 401 and the third magnet 403. The sensing magnet 450 may be overlapped with the first magnet 401 and the third magnet 403 in a direction perpendicular to the optical axis direction. The sensing magnet 450 may be overlapped with the first magnet 401 in a direction perpendicular to the optical axis direction. The sensing magnet 450 may be overlapped with the third magnet 403 in a direction perpendicular to the optical axis direction. The sensing magnet 450 may be overlapped with the first magnet 401 and the third magnet 403 in a first direction perpendicular to the optical axis direction. The sensing magnet 450 may be disposed on a virtual straight line connecting the first magnet 401 and the third magnet 403.

The sensing magnet 450 may be overlapped with the third magnet 403 in a direction perpendicular to the inner surface of the first magnet 401. The sensing magnet 450 may be overlapped with the first magnet 401 in a direction perpendicular to the inner surface of the first magnet 401.

The balancing magnet 460 may be disposed between the second magnet 402 and the fourth magnet 404. The balancing magnet 460 may be overlapped with the second magnet 402 and the fourth magnet 404 in a direction perpendicular to the optical axis direction. The balancing magnet 460 may be overlapped with the second magnet 402 in a direction perpendicular to the optical axis direction. The balancing magnet 460 may be overlapped with the fourth magnet 404 in a direction perpendicular to the optical axis direction. The balancing magnet 460 may be overlapped with the second magnet 402 and the fourth magnet 404 in a first direction perpendicular to the optical axis direction. The balancing magnet 460 may be disposed on an imaginary straight line connecting the second magnet 402 and the fourth magnet 404.

The balancing magnet 460 may be overlapped with the fourth magnet 404 in a direction perpendicular to the inner surface of the second magnet 402. The balancing magnet 460 may be overlapped with the second magnet 402 in a direction perpendicular to the inner surface of the second magnet 402.

Each of the first to fourth magnets 401, 402, 403, and 404 may comprise an AF magnet 410 being disposed at a position corresponding to the AF coil 430. Each of the first to fourth magnets 401, 402, 403, and 404 may comprise an OIS magnet 420 being disposed at a position corresponding to the OIS coil 440.

Each of the first to fourth magnets 401, 402, 403, and 404 may comprise a first width that is a length between inner and outer surfaces and a second width that is a length between both side surfaces. The first width of the first magnet 401 and the first width of the third magnet 403 may be the same. The first width of the second magnet 402 and the first width of the fourth magnet 404 may be the same. The first width of the first magnet 401 and the first width of the second magnet 403 may be the same. All of the first to fourth magnets 401, 402, 403, and 404 may have the same first width, which is a length between the inner surface and the outer surface.

The second width of the first magnet 401 may be different from the second width of the third magnet 403. The second width of the first magnet 401 (refer to W1 in FIG. 38) may be longer than the second width (refer to W2 in FIG. 38) of the third magnet 403. The second width of the second magnet 402 may be longer than the second width of the fourth magnet 404. As a modified embodiment, the second width of the first magnet 401 may be shorter than the second width of the third magnet 403. The second width of the second magnet 402 may be shorter than the second width of the fourth magnet 404.

The second width of the first magnet 401 may be greater than the width in the corresponding direction of the first-first coil 441-1. The second width of the third magnet 403 may be equal to or smaller than the width in the corresponding direction of the second-first coil 442-1. As another example, the second width of the first magnet 401 is greater than the width in the corresponding direction of the first coil 441 by the first length, and when the second width of the third magnet 403 is greater than the width in the corresponding direction of the second-first coil 442-1 by the second length, the first length may be greater than the second length. That is, when compared with the corresponding coil, the first magnet 401 may be larger than the third magnet 403 by a larger difference.

The housing 130 may comprise first and second corners disposed opposite to each other, and third and fourth corners disposed opposite to each other. The first magnet 401 may be disposed between the first corner and the fourth corner of the housing 130. The first magnet 401 may be disposed closer to the first corner than the fourth corner of the housing 130. The second magnet 402 may be disposed between the second corner and the third corner of the housing 130. The second magnet 402 may be disposed closer to the second corner than the third corner of the housing 130. The third magnet 403 may be disposed between the third corner and the first corner of the housing 130. The third magnet 403 may be disposed closer to the third corner than the first corner of the housing 130. The fourth magnet 404 may be disposed between the second and fourth corners of the housing 130. The fourth magnet 404 may be disposed closer to the fourth corner than the second corner of the housing 130.

The distance between the first magnet 401 and the fourth corner may be different from the distance between the third magnet 403 and the first corner. The distance between the first magnet 401 and the fourth corner may be shorter than the distance between the third magnet 403 and the first corner. The distance between the first magnet 401 and the first corner may be the same as the distance between the third magnet 403 and the third corner. As a modified embodiment, the distance between the first magnet 401 and the fourth corner may be longer than the distance between the third magnet 403 and the first corner.

The distance between the second magnet 402 and the third corner may be different from the distance between the fourth magnet 404 and the second corner. The distance between the second magnet 402 and the third corner may be shorter than the distance between the fourth magnet 404 and the second corner. The distance between the second magnet 402 and the second corner may be the same as the distance between the fourth magnet 404 and the third corner. As a modified embodiment, the distance between the first magnet 401 and the fourth corner may be longer than the distance between the third magnet 403 and the first corner.

The OIS coil 440 comprises a first-first coil 441-1 corresponding to the first magnet 401; a first-second coil 441-2 corresponding to the second magnet 402, a second-first coil 442-1 corresponding to the third magnet 403, and a second-second coil 442-2 corresponding to the fourth magnet 404. All of the first-first coil 441-1, the first-second coil 441-2, the second-first coil 442-1, and the second-second coil 442-2 may be formed to have the same size. All of the first-first coil 441-1, the first-second coil 441-2, the second-first coil 442-1, and the second-second coil 442-2 may be wound with the same number of turns.

The camera device 10 may comprise an AF driving unit. The AF driving unit may be an autofocus driving unit. The AF driving unit may be a driving unit for autofocus driving. The AF driving unit may move the first moving part 200 in an optical axis direction. The AF driving unit may move the bobbin 210 in an optical axis direction. The lens 220 may be moved in the optical axis direction. The lens 220 may be moved in an optical axis direction against the image sensor 330. The AF driving unit may perform an auto focus (AF) function. The AF driving unit may move the first moving part 200 in an upper direction of the optical axis direction. The AF driving unit may move the first moving part 200 in a lower direction of the optical axis direction.

The camera device 10 may comprise an OIS driving unit. The OIS driving unit may be a handshake correction (OIS) driving unit. The OIS driving unit may be a driving unit for driving handshake correction. The OIS driving unit may move the second moving part 300 in a direction perpendicular to the optical axis direction. The OIS driving unit may move the second substrate 310 in a direction perpendicular to the optical axis direction. The OIS driving unit may move the sensor substrate 320 in a direction perpendicular to the optical axis direction. The OIS driving unit may move the image sensor 330 in a direction perpendicular to the optical axis direction. The OIS driving unit may move the image sensor 330 in a direction perpendicular to the optical axis direction against the first substrate 110. The OIS driving unit may move the holder 340 in a direction perpendicular to the optical axis direction. The OIS driving unit may move the sensor base 350 in a direction perpendicular to the optical axis direction. The OIS driving unit may move the filter 360 in a direction perpendicular to the optical axis direction. The OIS driving unit may perform a handshake correction (OIS) function.

The OIS driving unit may move the second moving part 300 in a first direction perpendicular to the optical axis direction. The OIS driving unit may move the second moving part 300 in a second direction perpendicular to the optical axis direction and the first direction. The OIS driving unit may rotate the second moving part 300 about the optical axis.

In the present embodiment, the AF driving unit may comprise an AF coil 430. The OIS driving unit may comprise an OIS coil 440. The AF driving unit may comprise an AF magnet 410. The OIS driving unit may comprise an OIS magnet 420. As a modified embodiment, the AF driving unit and the OIS driving unit may comprise a driving magnet commonly used for interaction between the AF coil 430 and the OIS coil 440. That is, the AF driving unit and the OIS driving unit may comprise individually controlled coils and a common magnet.

The camera device 10 may comprise an AF magnet 410. The driving unit may comprise an AF magnet 410. The AF magnet 410 may be a magnet. The AF magnet 410 may be a permanent magnet. The AF magnet 410 may be a common magnet. The AF magnet 410 may be used for auto focus (AF).

The AF magnet 410 may be disposed on the fixed part 100. AF magnet 410 may be fixed to the fixed part 100. AF magnet 410 may be coupled to the fixed part 100. The AF magnet 410 may be attached to the fixed part 100 by an adhesive. The AF magnet 410 may be disposed on the housing 130. The AF magnet 410 may be fixed to the housing 130. The AF magnet 410 may be coupled to the housing 130. The AF magnet 410 may be attached to the housing 130 by an adhesive. The AF magnet 410 may be disposed at a corner of the housing 130. The AF magnet 410 may be disposed to be biased toward a corner of the housing 130.

The AF magnet 410 may be a two-pole magnetized magnet comprising one N-pole region and one S-pole region. As a modified embodiment, the AF magnet 410 may be a four-pole magnetized magnet comprising two N-pole regions and two S-pole regions.

The AF magnet 410 may comprise a plurality of magnets. The AF magnet 410 may comprise four magnets. The AF magnet 410 may comprise first to fourth magnets. The first to fourth magnets may be disposed symmetrically to the optical axis. The first to fourth magnets may be formed to have the same size and shape.

The camera device 10 may comprise an OIS magnet 420. The driving unit may comprise an OIS magnet 420. The OIS magnet 420 may be a magnet. The OIS magnet 420 may be a permanent magnet. The OIS magnet 420 may be a common magnet. The OIS magnet 420 may be used for hand-shake correction (OIS).

The OIS magnet 420 may be disposed in the fixed part 100. The OIS magnet 420 may be fixed to the fixed part 100. The OIS magnet 420 may be coupled to the fixed part 100. The OIS magnet 420 may be attached to the fixed part 100 by an adhesive. The OIS magnet 420 may be disposed in the housing 130. The OIS magnet 420 may be fixed to the housing 130. The OIS magnet 420 may be coupled to the housing 130. The OIS magnet 420 may be attached to the housing 130 by an adhesive. The OIS magnet 420 may be disposed at a corner of the housing 130. The OIS magnet 420 may be disposed to be biased toward a corner of the housing 130.

The OIS magnet 420 may be a two-pole magnetized magnet comprising one N-pole region and one S-pole region. As a modified embodiment, the OIS magnet 420 may be a four-pole magnetized magnet comprising two N-pole regions and two S-pole regions.

The OIS magnet 420 may comprise a plurality of magnets. The OIS magnet 420 may comprise four magnets. The OIS magnet 420 may comprise first to fourth magnets. The first to fourth magnets may be disposed symmetrically to the optical axis. The first to fourth magnets may be formed to have the same size and shape.

The OIS magnet 420 may be disposed below the AF magnet 410. The OIS magnet 420 may be disposed on a lower surface of the AF magnet 410. The OIS magnet 420 may be in contact with a lower surface of the AF magnet 410. The OIS magnet 420 may be fixed to a lower surface of the AF magnet 410. The OIS magnet 420 may be coupled to a lower surface of the AF magnet 410 by an adhesive. In the optical axis direction, the length of the OIS magnet 420 may be shorter than the length of the AF magnet 410. The size of the OIS magnet 420 may be smaller than the length of the AF magnet 410.

The camera device 10 may comprise an AF coil 430. The driving unit may comprise an AF coil 430. The AF coil 430 may be disposed in the first moving part 200. The AF coil 430 may be fixed to the first moving part 200. The AF coil 430 may be coupled to the first moving part 200. The AF coil 430 may be attached to the first moving part 200 by an adhesive. The AF coil 430 may be disposed on the bobbin 210. The AF coil 430 may be fixed to the bobbin 210. The AF coil 430 may be coupled to the bobbin 210. The AF coil 430 may be attached to the bobbin 210 by an adhesive. The AF coil 430 may be electrically connected to the driver IC 480. The AF coil 430 may be electrically connected to a lower elastic member 720, a third substrate 470, and a driver IC 480. The AF coil 430 may receive current from the driver IC 480.

The AF coil 430 may be disposed at a position corresponding to the AF magnet 410. The AF coil 430 may be disposed in the bobbin 210 at a position corresponding to the AF magnet 410. The AF coil 430 may face the AF magnet 410. The AF coil 430 may comprise a surface facing the AF magnet 410. The AF coil 430 may be disposed adjacent to the AF magnet 410. The AF coil 430 may interact with the AF magnet 410. The AF coil 430 may electromagnetically interact with the AF magnet 410.

The AF coil 430 may move the first moving part 200 in an optical axis direction. The AF coil 430 may move the bobbin 210 in an optical axis direction. The AF coil 430 may move the lens 220 in an optical axis direction. The AF coil 430 may move the first moving part 200 in an upper direction of the optical axis direction. The AF coil 430 may move the bobbin 210 in an upper direction of the optical axis direction. The AF coil 430 may move the lens 220 in an upper direction of the optical axis direction. The AF coil 430 may move the first moving part 200 in a lower direction of the optical axis direction. The AF coil 430 may move the bobbin 210 in a lower direction of the optical axis direction. The AF coil 430 may move the lens 220 in a lower direction of the optical axis direction. The AF magnet 410 and the AF coil 430 may move the lens 220 in an optical axis direction.

The camera device 10 may comprise an OIS coil 440. The driving unit may comprise an OIS coil 440. The OIS coil 440 may be disposed in the second moving part 300. The OIS coil 440 may be fixed to the second moving part 300. The OIS coil 440 may be coupled to the second moving part 300. The OIS coil 440 may be attached to the second moving part 300 by an adhesive. The OIS coil 440 may be disposed in the holder 340. The OIS coil 440 may be fixed to the holder 340. The OIS coil 440 may be coupled to the holder 340. The OIS coil 440 may be attached to the holder 340 by an adhesive. The OIS coil 440 may be wound around the protrusion of the holder 340 to be disposed. The OIS coil 440 may be disposed on the holder 340. The OIS coil 440 may be disposed on an upper surface of the holder 340. The OIS coil 440 may be disposed in the second substrate 310. The OIS coil 440 may be electrically connected to the second substrate 310. Both ends of the OIS coil 440 may be soldered to the second substrate 310. The OIS coil 440 may be electrically connected with the driver IC 495. The OIS coil 440 may be electrically connected with the second substrate 310 and the driver IC 495. The OIS coil 440 may receive current from the driver IC 495.

The OIS coil 440 may be disposed at a position corresponding to the OIS magnet 420. The OIS coil 440 may be disposed at a position corresponding to the driving magnet. The OIS coil 440 may be disposed at a position corresponding to the OIS magnet 420 in the holder 340. The OIS coil 440 may face the OIS magnet 420. The OIS coil 440 may comprise a surface facing the OIS magnet 420. The OIS coil 440 may be disposed adjacent to the OIS magnet 420. The OIS coil 440 may interact with the OIS magnet 420. The OIS coil 440 may electromagnetically interact with the OIS magnet 420.

The OIS coil 440 may move the second moving part 300 in a direction perpendicular to the optical axis direction. The OIS coil 440 may move the second substrate 310 in a direction perpendicular to the optical axis direction. The OIS coil 440 may move the sensor substrate 320 in a direction perpendicular to the optical axis direction. The OIS coil 440 may move the image sensor 330 in a direction perpendicular to the optical axis direction. The OIS coil 440 may move the holder 340 in a direction perpendicular to the optical axis direction. The OIS coil 440 may rotate the second moving part 300 about the optical axis. The OIS coil 440 may rotate the second substrate 310 about the optical axis. The OIS coil 440 may rotate the sensor substrate 320 about the optical axis. The OIS coil 440 may rotate the image sensor 330 about the optical axis. The OIS coil 440 may rotate the holder 340 about the optical axis. The OIS magnet 420 and the OIS coil 440 may move the image sensor 330 in a direction perpendicular to the optical axis direction against the base 120.

The OIS coil 440 may comprise a plurality of coils. The OIS coil 440 may comprise four coils. The OIS coil 440 may comprise a coil for x-axis shift. The OIS coil 440 may comprise a coil for y-axis shift.

The OIS coil 440 may comprise a first coil 441. The first coil 441 may be a first sub-coil. The first coil 441 may be a coil for x-axis shift. The first coil 441 may move the second moving part 300 in the x-axis direction. The first coil 441 may be disposed long in length along the y-axis. The first coil 441 may comprise a plurality of coils. The first coil 441 may comprise two coils. The two coils of the first coil 441 may be electrically connected to each other. The first coil 441 may comprise a connection coil connecting the two coils. In this case, the two coils of the first coil 441 may receive current together. Or, the two coils of the first coil 441 may be electrically separated from each other to receive current individually.

The OIS coil 440 may comprise a second coil 442. The second coil 442 may be a second sub-coil. The second coil 442 may be a coil for y-axis shift. The second coil 442 may move the second moving part 300 in the y-axis direction. The second coil 442 may be disposed long in length along the x-axis. The first coil 441 may comprise a plurality of coils. The second coil 442 may comprise two coils. The two coils of the second coil 442 may be electrically connected to each other. The second coil 442 may comprise a connection coil connecting the two coils. In this case, the two coils of the second coil 442 may receive current together. Or, the two coils of the second coil 442 may be electrically separated from each other to receive current individually.

The camera device 10 may comprise a sensor 445. The sensor 445 may be disposed in the second substrate 310. The sensor 445 may be disposed in a hole of the holder 340. The sensor 445 may comprise a Hall sensor. The sensor 445 may comprise a Hall IC. The sensor 445 may detect the OIS magnet 420. The sensor 445 may detect the magnetic force of the OIS magnet 420. The sensor 445 may face the OIS magnet 420. The sensor 445 may be disposed at a position corresponding to the OIS magnet 420. The sensor 445 may be disposed adjacent to the OIS magnet 420. The sensor 445 may detect the position of the second moving part 300. The sensor 445 may detect the movement of the second moving part 300. The sensor 445 may be disposed in a hollow of the OIS coil 440. The detected value detected by the sensor 445 may be used to feedback the handshake correction operation. The sensor 445 may be electrically connected to the driver IC 495.

The sensor 445 may comprise a plurality of sensors. The sensor 445 may comprise three sensors. The sensor 445 may comprise first to third sensors. The first sensor may detect the displacement of the second moving part 300 in the x-axis direction. The second sensor may detect the displacement of the second moving part 300 in the y-axis direction. The third sensor may detect the rotation of the second moving part 300 about the z-axis alone or together with any one or more of the first Hall sensor and the second Hall sensor. Each of the first to third sensors may comprise a Hall sensor.

The camera device 10 may comprise a sensing magnet 450. The sensing magnet 450 may be disposed in the first moving part 200. The sensing magnet 450 may be fixed to the first moving part 200. The sensing magnet 450 may be coupled to the first moving part 200. The sensing magnet 450 may be attached to the first moving part 200 by an adhesive. The sensing magnet 450 may be disposed in the bobbin 210. The sensing magnet 450 may be fixed to the bobbin 210. The sensing magnet 450 may be coupled to the bobbin 210. The sensing magnet 450 may be attached to the bobbin 210 by an adhesive. The sensing magnet 450 may be formed to have a smaller size than the AF magnet 410. The sensing magnet 450 may be formed to have a smaller size than the OIS magnet 420. Through this, the influence of the sensing magnet 450 on driving may be minimized.

The sensing magnet 450 may be disposed at an opposite side of the balancing magnet 460. The sensing magnet 450 and the balancing magnet 460 may be disposed opposite to each other in the first moving part 200. The sensing magnet 450 and the balancing magnet 460 may be disposed opposite to each other in the bobbin 210.

The camera device 10 may comprise a balancing magnet 460. The balancing magnet 460 may be a compensation magnet. The balancing magnet 460 may be disposed in the first moving part 200. The balancing magnet 460 may be fixed to the first moving part 200. The balancing magnet 460 may be coupled to the first moving part 200. The balancing magnet 460 may be attached to the first moving part 200 by an adhesive. The balancing magnet 460 may be disposed in the bobbin 210. The balancing magnet 460 may be fixed to the bobbin 210. The balancing magnet 460 may be coupled to the bobbin 210. The balancing magnet 460 may be attached to the bobbin 210 by an adhesive. The balancing magnet 460 may be formed to have a smaller size than the AF magnet 410. The balancing magnet 460 may be formed to have a smaller size than the OIS magnet 420. Through this, the influence of the balancing magnet 460 on driving can be minimized. In addition, the balancing magnet 460 may be disposed at an opposite side of the sensing magnet 450 to form a magnetic force balance with the sensing magnet 450. Through this, a tilt that may be occurred by the sensing magnet 450 may be inhibited.

The camera device 10 may comprise a third substrate 470. The third substrate 470 may be a substrate. The third substrate 470 may be a printed circuit board (PCB). The third substrate 470 may be a flexible substrate. The third substrate 470 may be an FPCB. The third substrate 470 may be coupled to the first substrate 110. The third substrate 470 may be connected to the first substrate 110. The third substrate 470 may be electrically connected to the first substrate 110. The third substrate 470 may be soldered to the first substrate 110. The third substrate 470 may be disposed in the housing 130. The third substrate 470 may be fixed to the housing 130. The third substrate 470 may be coupled to the housing 130. The housing 130 may comprise a groove or hole having a shape corresponding to that of the third substrate 470. The third substrate 470 may be disposed in a groove or hole of the housing 130. The third substrate 470 may be connected to a terminal of the connection substrate 600 after bending.

In a direction perpendicular to the optical axis direction, a portion of the third substrate 470 may be disposed between the connection substrate 600 and the wing portion 131 of the housing 130. The third substrate 470 may be disposed in the groove 131a of the wing portion 131 of the housing 130.

The third substrate 470 may comprise a first terminal 471 being connected to the connection substrate 600. The first terminal 471 may be coupled to the connection substrate 600 through solder. The third substrate 470 may comprise a second terminal 472 being connected to the upper elastic member 710. The second terminal 472 may be coupled to the upper elastic member 710 through solder.

The third substrate 370 may comprise a first portion 473 on which the driver IC 480 is disposed. The third substrate 370 may comprise a second portion 474 being coupled to the terminal unit 630 of the connection substrate 600. The third substrate 370 may comprise a third portion 475 connecting the first portion 473 and the second portion 474. The first portion 473 of the third substrate 370 may be disposed further inside than the second portion 474.

The camera device 10 may comprise a driver IC 480. The driver IC 480 may be an AF driver IC. The driver IC 480 may be electrically connected to the AF coil 430. The driver IC 480 may apply a current to the AF coil 430 to perform AF driving. The driver IC 480 may apply power to the AF coil 430. The driver IC 480 may apply a current to the AF coil 430. The driver IC 480 may apply a voltage to the AF coil 430. The driver IC 480 may be disposed in the third substrate 470. The driver IC 480 may be disposed at a position corresponding to the sensing magnet 450. The driver IC 480 may be disposed to face the sensing magnet 450. The driver IC 480 may be disposed adjacent to the sensing magnet 450.

The driver IC 480 may comprise a sensor. The sensor may comprise a Hall IC. The sensor may be disposed at a position corresponding to the sensing magnet 450. The sensor may be disposed to face the sensing magnet 450. The sensor may be disposed adjacent to the sensing magnet 450. The sensor may detect the sensing magnet 450. The sensor may detect the magnetic force of the sensing magnet 450. The sensor may detect the position of the first moving part 200. The sensor may detect the movement of the first moving part 200. The detected value detected by the sensor may be used for feedback of autofocus driving. The sensor may be disposed inside the driver IC 480. The sensor may be embedded in the driver IC 480. The sensor may be comprised in the driver IC 480. The sensor may be one configuration of the driver IC 480. The sensor may be disposed in the third substrate 470.

The camera device 10 may comprise a gyro sensor 490. The gyro sensor 490 may be disposed in the first substrate 110. The gyro sensor 490 may detect the shaking of the camera device 10. The gyro sensor 490 may detect an angular velocity or a linear velocity caused by shaking of the camera device 10. The gyro sensor 490 may be electrically connected to the driver IC 495. The shake of the camera device 10 detected by the gyro sensor 490 may be used to drive the handshake compensation (OIS).

The camera device 10 may comprise a driver IC 495. The driver IC 495 may be an OIS driver IC. The driver IC 495 may be electrically connected to the second coil 440. The driver IC 495 may apply a current to the second coil 440 to perform OIS driving. The driver IC 495 may apply power to the second coil 440. The driver IC 495 may apply a current to the second coil 440. The driver IC 495 may apply a voltage to the second coil 440. The driver IC 495 may be disposed in the second substrate 310.

The camera device 10 may comprise a connection member. The connection member may be an interposer. The connection member may support the movement of the second moving part 300. The connection member may movably support the second moving part 300. The connection member may connect the second moving part 300 and the fixed part 100. The connection member may connect the first substrate 110 and the second substrate 310. The connection member may electrically connect the first substrate 110 and the second substrate 310. The connection member may connect the first substrate 110 and the second moving part 300. The connection member may guide the movement of the second moving part 300. The connection member may guide the second moving part 300 to move in a direction perpendicular to the optical axis direction. The connection member may guide the second moving part 300 to rotate about the optical axis. The connection member may limit the movement of the second moving part 300 in an optical axis direction.

The connection member may comprise a connection substrate 600. The connection member may comprise an elastic member for connecting the fixed part 100 and the second moving part 300. The connection member may comprise a leaf spring. The connection member may comprise a wire 800. The connection member may comprise a ball being disposed between the fixed part 100 and the second moving part 300. The connection member may comprise a conductive member. The connection member may comprise a conductive tape. The connection member may comprise an EMI tape.

The camera device 10 may comprise a connection substrate 600. The connection substrate 600 may be a connection part. The connection substrate 600 may be a connection member. The connection substrate 600 may be a flexible substrate. The connection substrate 600 may be a flexible substrate. The connection substrate 600 may be a flexible printed circuit board. The connection substrate 600 may be a flexible printed circuit board (FPCB). The connection substrate 600 may have flexibility at least in part thereof. The second substrate 310 and the connection substrate 600 may be integrally formed.

The connection substrate 600 may support the second moving part 300. The connection substrate 600 may support the movement of the second moving part 300. The connection substrate 600 may movably support the second moving part 300. The connection substrate 600 may connect the second moving part 300 and the fixed part 100. The connection substrate 600 may connect the first substrate 110 and the second substrate 310. The connection substrate 600 may electrically connect the first substrate 110 and the second substrate 310. The connection substrate 600 may guide the movement of the second moving part 300. The connection substrate 600 may guide the second moving part 300 to move in a direction perpendicular to the optical axis direction. The connection substrate 600 may guide the second moving part 300 to rotate about the optical axis. The connection substrate 600 may limit the movement of the second moving part 300 in an optical axis direction. A portion of the connection substrate 600 may be coupled to the base 120. The connection substrate 600 may movably support the image sensor 330. The connection substrate 600 may be disposed inside the cover member 140.

The connection substrate 600 may comprise two connection substrates 600 that are spaced apart from each other and formed symmetrically. The two connection substrates 600 may be disposed at both sides of the second substrate 310. The connection substrate 600 may be bent a total of 6 times so as to connect the first substrate 110 and the second substrate 310.

The connection substrate 600 may comprise a first region connected to the second substrate 310 and being bent in an optical axis direction. The first region is connected to the second substrate 310 and may be bent in an optical axis direction. The first region is connected to the second substrate 310 and may be extended in an optical axis direction. The first region is connected to the second substrate 310 and may be bent and extended in an optical axis direction. The connection substrate 600 may comprise a second region being extended from the first region. The connection substrate 600 may comprise a third region being bent in a direction perpendicular to the optical axis direction from the second region. The third region may be bent in a direction perpendicular to the optical axis direction from the second region. The third region may be extended in a direction perpendicular to the optical axis direction from the second region. The third region may be bent and extended in a direction perpendicular to the optical axis direction from the second region.

The connection substrate 600 may comprise a connection part 610 comprising a first region. The connection substrate 600 may comprise an extension part 620 comprising a second region and a third region. The connection substrate 600 may comprise a connection part 610 connected to the second substrate 310. The connection substrate 600 may comprise an extension part 620 being extended from the connection part 610. The connection substrate 600 may comprise a terminal unit 630 being connected to the extension part 620 and comprising a terminal.

The connection substrate 600 may comprise a connection part 610. The connection part 610 may be connected to the second moving part 300. The connection part 610 may be coupled to the second moving part 300. The connection part 610 may be fixed to the second moving part 300. The connection part 610 may be connected to the second substrate 310. The connection part 610 may be coupled to the second substrate 310. The connection part 610 may be fixed to the second substrate 310. The connection part 610 may comprise a first bending region that is bent in an optical axis direction. The connection part 610 may comprise a first region that is bent in an optical axis direction with respect to the second substrate 310 and a second region that is extended from the first region and is bent in a direction perpendicular to the optical axis direction. The connection part 610 may be a first connection substrate. The connection part 610 may be connected to the image sensor 330 by soldering.

The connection part 610 of the connection substrate 600 may be disposed to be more inward than the outer side surface of the base 120. The outer side surface of the base 120 may be disposed at a position corresponding to the inner surface of the side plate 142 of the cover member 140. The connection part 610 of the connection substrate 600 may be disposed at an inner side of the inner surface of the side plate 142 of the cover member 140. The connection part 610 of the connection substrate 600 may be spaced apart from the inner surface of the side plate 142 of the cover member 140. The connection part 610 of the connection substrate 600 may be spaced apart from the side plate 142 of the cover member 140 by more than a stroke space in a direction perpendicular to the optical axis direction. By the groove 122 of the base 120, the terminal unit 630 and the connection part 610 of the connection substrate 600 may be disposed to be spaced apart from the side plate 142 of the cover member 140. The groove 122 of the base 120 may be recessed so that the connection part 610 of the connection substrate 600 is spaced apart from the side plate 142 of the cover member 140 more than the stroke space of the connection part 610. The wing portion 131 of the housing 130 may be disposed in the groove 122 of the base 120. The wing portion 131 of the housing 130 may be disposed between the terminal unit 630 of the connection substrate 600 being disposed in the groove 122 of the base 120 and the side plate 142 of the cover member 140.

The connection part 610 and the extension portion 620 may be connected through the bent portion 615. The bent portion 615 may have a bent shape. As illustrated in FIG. 16, in a modified embodiment, the connection substrate 600 may comprise a hole 601 being disposed in the bent portion 615. Or, the connection substrate 600 may comprise a hole 601 being disposed at a position being overlapped with the bent portion 615 in an optical axis direction. The hole 601 and the bent portion 615 may be disposed together at a position being overlapped with the bent portion 615 in an the optical axis direction. The hole 601 may be a circular hole. The hole 601 may be disposed in the central region of the bent portion 615. The connection part 610 may comprise a first part being disposed on one side with respect to the hole 601 and a second part being disposed on the other side with respect to the hole 601.

As illustrated in FIG. 17, in another modified embodiment, the connection substrate 600 may comprise a hole 602. The hole 602 may be disposed in the bent portion 615 of the connection substrate 600. The hole 602 may be disposed at a position being overlapped with the bent portion 615 of the connection substrate 600 in an optical axis direction. The hole 602 may be extended from the bent portion 615 to a position being overlapped with the bent portion 615 in an optical axis direction. The hole 602 of the connection substrate 600 may have the width in an optical axis direction longer than the width in a direction perpendicular to the optical axis direction. The hole 602 may have an elliptical shape.

As illustrated in FIG. 18, the connection substrate 600 may comprise a plurality of connection substrates. The connection substrate 600 may comprise four connection substrates being spaced apart from each other. The connection substrate 600 may comprise first to fourth connection substrates 600a-1, 600a-2, 600a-3, and 600a-4. The first to fourth connection substrates 600a-1, 600a-2, 600a-3, and 600a-4 may be formed symmetrically with respect to the optical axis. The first to fourth connection substrates 600a-1, 600a-2, 600a-3, and 600a-4 may be spaced apart from one another. The first to fourth connection substrates 600a-1, 600a-2, 600a-3, and 600a-4 may be electrically isolated from one another.

The connection substrate 600 may comprise an extension portion 620. The extension portion 620 may connect the connection part 610 and the terminal unit 630. The extension portion 620 may be extended from the connection part 610. The extension portion 620 may comprise a second bending region that is bent in a direction perpendicular to the optical axis direction. The extension portion 620 of the connection substrate 600 may be spaced apart from the side plate 142 of the cover member 140. The extension portion 620 of the connection substrate 600 may be spaced apart from the side plate 142 of the cover member 140 in a direction perpendicular to the optical axis direction. The width of the extension portion 620 may be smaller than the width of the terminal unit 630. The extension portion 620 may be a second connection substrate. The second connection substrate may connect the first connection substrate and the third connection substrate. The extension portion 620 may be a portion that moves when the second moving part 200 moves. The extension portion 620 may be a flexible portion. The extension portion 620 may be spaced apart from the wing portion 131 of the housing 130. The extension portion 620 may move in a space between the inner surface of the side plate 142 of the cover member 140 in a direction perpendicular to the optical axis direction (refer to L in FIG. 52).

The connection substrate 600 may comprise a terminal unit 630. The terminal unit 630 may be coupled to the fixed part 100. The terminal unit 630 may be fixed to the fixed part 100. The terminal unit 630 may be coupled to the first substrate 110. The terminal unit 630 may be connected to the first substrate 110. The terminal unit 630 may be soldered to the first substrate 110. The terminal unit 630 may be fixed to the first substrate 110. The terminal unit 630 may be coupled to the base 120. The terminal unit 630 may be fixed to the base 120. The terminal unit 630 may comprise a terminal. The terminal may be coupled to the first substrate 110. A plurality of terminals may be disposed at a lower end of the terminal unit 630 of the connection substrate 600. The plurality of terminals of the connection substrate 600 may be disposed at an inner side of the wing portion 131 of the housing 130. The terminal unit 630 may be a third connection substrate. The terminal unit 630 may be connected with the first substrate 110 through soldering.

The terminal unit 630 of the connection substrate 600 may be disposed in the first groove 122 of the base 120. The terminal unit 630 of the connection substrate 600 may be spaced apart from the side plate 142 of the cover member 140. Through this, the stroke space of the extension portion 620 of the connection substrate 600 inside the cover member 140 can be secured.

The terminal unit 630 may comprise a first terminal 631. The first terminal 631 may be connected to the first substrate 110. The first terminal 631 may be electrically connected to the first substrate 110. The first terminal 631 may be coupled to the first substrate 110. The first terminal 631 may be coupled to the first substrate 110 by a conductive member. The first terminal 631 may be coupled to the first substrate 110 through soldering.

The terminal unit 630 may comprise a second terminal 632. The second terminal 632 may be connected to the third substrate 470. The second terminal 632 may be electrically connected to the third substrate 470. The second terminal 632 may be coupled to the third substrate 470. The second terminal 632 may be coupled to the third substrate 470 by a conductive member. The second terminal 632 may be coupled to the third substrate 470 through soldering. The second terminal 632 of the connection substrate 600 may be overlapped with the first terminal 631 of the connection substrate 600 in an optical axis direction. The second terminal 632 may be disposed above the first terminal 631. The second terminal 632 may be spaced apart from the first terminal 631. The second terminal 632 may be disposed higher than the first terminal 631.

The first terminal 631 of the connection substrate 600 may comprise a plurality of first terminals 631. The second terminal 632 of the connection substrate 600 may comprise a plurality of second terminals 632. In a direction perpendicular to the optical axis direction, the separation between the plurality of second terminals 632 may be greater than the separation between the plurality of first terminals 631. In a direction perpendicular to the optical axis direction, the separation between the plurality of second terminals 632 may be different from the separation between the plurality of first terminals 631. The second terminal 632 of the connection substrate 600 may comprise four second terminals.

In the present embodiment, the camera device 10 may comprise a flexible substrate. The flexible substrate may connect the fixed part 100 and the second moving part 300. The flexible substrate may comprise a connection part 610 being connected to the second moving part 300, an extension part 620 being extended from the connection part 610, and a terminal unit 630 being connected to the extension part 620 and comprising a terminal.

In the present embodiment, the connection substrate 600 may comprise a first portion being coupled to the first substrate 110, a second portion being coupled to the second substrate 310, and a third portion connecting the first portion and the second portion. The third portion may be disposed parallel to the optical axis at least in part. The third portion may be formed to have a length in an optical axis direction longer than a thickness. The second portion of the connection substrate 600 may be disposed parallel to the second substrate 310 at least in part. The third portion of the connection substrate 600 may be disposed perpendicular to the second portion at least in part. The third portion of the connection substrate 600 may be bent roundly in a portion corresponding to the corner of the second substrate 310. The second substrate 310 may comprise a first side surface and a second side surface being disposed opposite to each other, and a third side surface and a fourth side surface being disposed opposite to each other. The second portion of the connection substrate 600 may be coupled to the first side surface and the second side surface of the second substrate 310. The first portion of the connection substrate 600 may be coupled to a portion of the first substrate 110 corresponding to the third side surface and the fourth side surface of the second substrate 310.

The camera device 10 may comprise a shielding member. The shielding member may be disposed on one surface of the connection substrate 600. The shielding member may be a conductive tape. The shielding member may be an EMI tape. As a modified embodiment, the shielding member may be disposed separately from the connection substrate 600. The camera device 10 may comprise a conductive tape. The connection member may comprise a conductive tape. The connection substrate 600 may comprise a conductive tape. However, the conductive tape may be understood as a configuration separate from the connection substrate 600. The conductive tape may comprise an electromagnetic interference (EMI) tape. The conductive tape may be a metal member. The conductive tape may be a metal part. The conductive tape may be a metal layer. The conductive tape may be a metal thin film. The conductive tape may be formed of metal. The conductive tape may be formed of an alloy. The conductive tape may be formed of a conductive material. The conductive tape may have an adhesive force. The conductive tape may be distinguished from the conductive layer 602 of the connection substrate 600. The conductive tape may be formed of a material different from the conductive layer 602 of the connection substrate 600.

Conductive tape may be disposed in the connection substrate 600. Conductive tape may be coupled to the connection substrate 600. Conductive tape may be fixed to the connection substrate 600. The conductive tape may be integrally formed with the connection substrate 600. The conductive tape may have elasticity. The conductive tape may be adhered to the outer surface of the connection substrate 600. Or, the conductive tape may be attached to the inner surface of the connection substrate 600.

In an optical axis direction, at least in part, the length of the conductive tape may be equal to the length of the extension portion 620. The conductive tape may be extended to the same length as the extension portion 620 in an optical axis direction. The thickness of the conductive tape may be thinner than the thickness of the connection substrate 600. The thickness of the conductive tape may be the same as the thickness of the connection substrate 600. Conductive tape can be used for impedance matching and noise suppression by connecting to the ground (GND).

At least a portion of the conductive tape may be disposed in the extension portion 620 of the connection substrate 600. The extension portion 620 may comprise a bending region that is bent in a direction perpendicular to the optical axis direction. At this time, the conductive tape may be disposed in the bending region. The conductive tape may be disposed on an inner surface of the extension portion 620. The conductive tape may be disposed on an outer surface of the extension portion 620.

The conductive tape may be formed of a conductive material. The conductive tape may be electrically connected to the second substrate 310. The conductive tape may be electrically connected to the image sensor 330. The conductive tape may be electrically connected to the driver IC 495. The conductive tape may be connected to the terminal 631 of the connection substrate 600. The conductive tape may be electrically connected to the terminal 631 of the connection substrate 600. The conductive tape may be in direct contact with the terminals 631 of the connection substrate 600. A conductive tape may be used as a ground (GND). The conductive tape may be connected to the ground terminal of the connection substrate 600. The conductive tape may be electrically connected with the first substrate 110. In this case, the number of power connection patterns of the connection substrate 600 may be reduced. The conductive tape may be electrically connected to the ground terminal of the image sensor 330.

The camera device 10 may comprise an elastic member 700. The elastic member 700 may be a support member. The elastic member 700 may connect the fixed part 100 and the first moving part 200. The elastic member 700 may elastically connect the fixed part 100 and the first moving part 200. The elastic member 700 may connect the bobbin 210 and the housing 370. The elastic member 700 may elastically connect the bobbin 210 and the housing 370. The elastic member 700 may support the first moving part 200 to be movable against the fixed part 100. The elastic member 700 may be deformed when the first moving part 200 moves. When the movement of the first moving part 200 is finished, the elastic member 700 may position the first moving part 200 at an initial position through a restoring force (elastic force). The elastic member 700 may comprise a leaf spring. The elastic member 700 may comprise a spring. The elastic member 700 may have elasticity at least in part. The elastic member 700 may provide a restoring force (elastic force) to the first moving part.

The camera device 10 may comprise an upper elastic member 710. The elastic member 700 may comprise an upper elastic member 710. The upper elastic member 710 may be an upper spring. The upper elastic member 710 may be disposed above a lower elastic member 720. The upper elastic member 710 may connect the housing 130 and the bobbin 210. The upper elastic member 710 may be coupled to the housing 130. The upper elastic member 710 may be coupled to the bobbin 210.

The upper elastic member 710 may comprise a plurality of upper elastic units. The upper elastic member 710 may comprise two upper elastic units. The upper elastic member 710 may comprise first and second upper elastic units 710-1 and 710-2. The first and second upper elastic units 710-1 and 710-2 may be spaced apart from each other. The first and second upper elastic units 710-1 and 710-2 may electrically connect the third substrate 470 and the AF coil 430. As a modified embodiment, the lower elastic member 720 may comprise a plurality of lower elastic units. The lower elastic member 720 may comprise two lower elastic units.

The driver IC 480 may be disposed on the inner surface of the third substrate 470. The first upper elastic unit 710-1 may be coupled to an inner surface of the third substrate 470. The second upper elastic unit 710-2 may be coupled to an outer surface at an opposite side of an inner surface of the third substrate 470.

The upper elastic member 710 may comprise an outer side portion 711 being coupled to the housing 130. The outer side portion 711 of the upper elastic member 710 may be coupled to an upper portion of the housing 130. The outer side portion 711 of the upper elastic member 710 may be disposed on an upper surface of the housing 130. The upper elastic member 710 may comprise an inner side portion 712 being coupled to the bobbin 210. The inner side portion 712 of the upper elastic member 710 may be coupled to an upper portion of the bobbin 210. The inner side portion 712 of the upper elastic member 710 may be disposed on an upper surface of the bobbin 210. The upper elastic member 710 may comprise a connection part 713 connecting the outer side portion 711 and the inner side portion 712. The connection part 713 may have elasticity.

The connection part 713 of the upper elastic member 710 may comprise a first portion 713*a* connecting the outer side portion 711 and the inner side portion 712. The connection part 713 of the upper elastic member 710 may comprise a second portion 713*b* being extended from the first portion 713*a* to a position corresponding to the groove 212 of the bobbin 210. The second portion 713*b* of the connection part 713 of the upper elastic member 710 may be disposed closer to the outer side portion 711 of the upper elastic member 710 than the inner side portion 712 of the upper elastic member 710. The distance between the second portion 713*b* and the outer side portion 711 may be shorter than a distance between the second portion 173*b* and the inner side portion 712.

In the present embodiment, the second portion 713*b* of the connection part 713 of the upper elastic member 710, as illustrated in FIG. 32(*a*), may be formed in a circular shape having a larger diameter than other portion of the second portion 713*b* at the end portion of the second portion 713*b*. Accordingly, the loss of the second damper 920 may be minimized by increasing the contact area with the second damper 920.

As a modified embodiment, the second portion 713*c* of the connection part 713 of the upper elastic member 710, as illustrated in FIG. 32(*b*), may be formed in a straight line. That is, compared to the present embodiment, the circular round part can be omitted.

As another modified embodiment, the second portion 713*d* of the connection part 713 of the upper elastic member 710, as illustrated in FIG. 32(*c*), may comprise a hole 713*e* being formed in the circular end. The hole 713*e* may be formed in a circular shape. The circular shape of the second portion 713*d* and the circular shape of the hole 713*e* may be concentric. The loss inhibiting effect of the damper may be increased through the hole 713*e* of the second portion 713*d*.

The upper elastic member 710 may comprise a coupling portion 714. The coupling portion 714 may be coupled to the wire 800. The coupling portion 714 may be extended from the outer side portion 711. The coupling portion 714 may comprise a hole 714*a*. The upper elastic member 710 may comprise a hole 714*a* in which the wire 800 is disposed. The upper elastic member 710 may comprise a hole 714*a* through which the wire 800 passes.

The upper elastic member 710 may comprise a terminal unit 715. The terminal unit 715 may be coupled to the third substrate 470. The terminal unit 715 may be connected to a terminal of the third substrate 470. The terminal unit 715 may be coupled to the second terminal 472 of the third substrate 470 through a conductive member.

The camera device 10 may comprise a lower elastic member 720. The elastic member 700 may comprise a lower elastic member 720. The lower elastic member 720 may be a lower side spring. The lower elastic member 720 may be disposed below the upper elastic member 710. The lower elastic member 720 may connect the housing 130 and the bobbin 210. The lower elastic member 720 may be coupled to the housing 130. The lower elastic member 720 may be coupled to the bobbin 210.

The lower elastic member 720 may comprise an outer side portion being coupled to the housing 130. The outer side portion of the lower elastic member 720 may be coupled to the lower portion of the housing 130. The outer side portion of the lower elastic member 720 may be disposed on a lower surface of the housing 130. The lower elastic member 720 may comprise an inner side portion being coupled to the bobbin 210. The inner side portion of the lower elastic member 720 may be coupled to a lower portion of the bobbin 210. The inner side portion of the lower elastic member 720 may be disposed on a lower surface of the bobbin 210. The lower elastic member 720 may comprise a connection part connecting the outer side portion and the inner side portion. The connection part may have elasticity.

The camera device 10 may comprise a wire 800. The wire 800 may be a wire spring. The wire 800 may be an elastic member. As a modified embodiment, the wire 800 may be a leaf spring. The wire 800 may connect the fixed part 100 and the second moving part 300. The wire 800 may elastically connect the fixed part 100 and the second moving part 300. The wire 800 may connect the housing 130 and the second substrate 310. The wire 800 may elastically connect the housing 130 and the second substrate 310. The wire 800 may movably support the second moving part 300. The wire 800 may movably support the second moving part 300 against the fixed part 100. The wire 800 may support the movement of the image sensor 330. The wire 800 may movably support the image sensor 330. The wire 800 may be disposed in an optical axis direction. The wire 800 may support the second moving part 300 to move or rotate in a direction perpendicular to the optical axis direction. The wire 800 may connect the upper elastic member 710 and the coupling member 380. The wire 800 may electrically connect the upper elastic member 710 and the coupling member 380. The wire 800 may be coupled to the upper elastic member 710 through soldering. The wire 800 may be coupled to the coupling member 380 through soldering.

The wire 800 may comprise a first portion being coupled to the upper elastic member 710. At this time, the first portion may be the upper end of the wire 800. However, the first portion may be spaced apart from the upper end of the wire 800. The wire 800 may comprise a second portion being coupled to the coupling member 380. At this time, the second portion may be the lower end of the wire 800. However, the second portion may be spaced apart from the lower end of the wire 800.

The camera device 10 may comprise a first damper 910. The first damper 910 may be an OIS damper. The first damper 910 may inhibit an oscillation phenomenon during OIS driving. The first damper 910 may have viscosity. The first damper 910 may connect the housing 130 and the wire 800. The first damper 910 may be disposed between the housing 130 and the wire 800. The first damper 910 may be applied between the housing 130 and the wire 800. The first damper 910 may be in contact with the housing 130. The first damper 910 may be in contact with the hole 134 of the housing 130. The first damper 910 may be in contact with the wire 800. At least a portion of the first damper 910 may be disposed in the hole 134 of the housing 130. At least a portion of the first damper 910 may be disposed in the dam 136 of the housing 130. The first damper 910 may connect the fixed part housing 130 and the wire 800.

The camera device 10 may comprise a second damper 920. The second damper 920 may be an AF damper. The second damper 920 may inhibit an oscillation phenomenon during AF driving. The second damper 920 may have viscosity. The second damper 920 may connect the bobbin 210 and the upper elastic member 710. The second damper 920 may be connected to the connection part 713 of the upper elastic member 710. The second damper 920 may connect the groove 212 of the bobbin 210 to the second portion 713b of the connection part 713 of the upper elastic member 710. The second damper 920 may be disposed closer to the outer side portion 711 than the inner side portion 712 of the upper elastic member 710. The second damper 920 may be disposed between the groove 212 of the bobbin 210 and the second portion 713b of the connection part 713 of the upper elastic member 710. The second damper 920 may be applied between the groove 212 of the bobbin 210 and the second portion 713b of the connection part 713 of the upper elastic member 710. The second damper 920 may be in contact with the groove 212 of the bobbin 210. The second damper 920 may be in contact with the second portion 713b of the connection part 713 of the upper elastic member 710.

The camera device 10 may comprise a third damper 930. The third damper 930 may be an AF damper. The third damper 930 may inhibit an oscillation phenomenon during AF driving. The third damper 930 may be additionally disposed in the second damper 920. Or, the third damper 930 may be disposed while the second damper 920 is omitted. That is, at least one of the second damper 920 and the third damper 930 may be disposed. The third damper 930 may have viscosity. The third damper 930 may be disposed closer to the outer side portion 711 than the inner side portion 712 of the upper elastic member 710. The distance between the third damper 930 and the outer side portion 711 of the upper elastic member 710 may be shorter than the distance between the second damper 920 and the outer side portion 711 of the upper elastic member 710. The third damper 930 may be disposed between the second damper 920 and the outer side portion 711 of the upper elastic member 710.

The third damper 930 may connect the bobbin 210 and the upper elastic member 710. The third damper 930 may connect the protrusion 213 of the bobbin 210 and the upper elastic member 710. The third damper 930 may connect the bobbin 210 and the connection part 713 of the upper elastic member 710. The third damper 930 may connect the bobbin 210 and the first portion 713a of the upper elastic member 710. The third damper 930 may connect the protrusion 213 of the bobbin 210 to the first portion 713a of the upper elastic member 710. The third damper 930 may be connected to a portion between the second portion 713b and the outer side portion 711 of the first portion 713a of the upper elastic member 710. The third damper 930 may be disposed between the protrusion 213 of the bobbin 210 and the first portion 713a of the upper elastic member 710. The third damper 930 may be applied between the protrusion 213 of the bobbin 210 and the first portion 713a of the upper elastic member 710. The third damper 930 may be in contact with the protrusion 213 of the bobbin 210. The third damper 930 may be in contact with the first portion 713a of the upper elastic member 710.

The camera device 10 may comprise a fourth damper 940. The fourth damper 940 may be an OIS damper. The fourth damper 940 may inhibit an oscillation phenomenon during OIS driving. The fourth damper 940 may be additionally disposed on the first damper 910. Or, the fourth damper 940 may be disposed while the first damper 910 is omitted. That is, at least one of the first damper 910 and the fourth damper 940 may be disposed. The fourth damper 940 may have viscosity. The fourth damper 940 may connect the coupling member 380 and the base 120. The fourth damper 940 may be disposed between the coupling member 380 and the base 120. The fourth damper 940 may be applied between the coupling member 380 and the base 120. The fourth damper 940 may be in contact with the coupling member 380. The fourth damper 940 may be in contact with the base 120. At least a portion of the fourth damper 940 may be disposed in the groove 123 of the base 120. The fourth damper 940 may be connected to the extension portion 383 of the coupling member 380. The fourth damper 940 may be in contact with the soldering portion. The fourth damper 940 may cover a portion of the soldering portion. The fourth damper 940 may be in contact with the coupling portion 380a other than the extension portion 383.

Each of the first to fourth dampers 910, 920, 930, and 940 is an independent configuration, and any one or more of the first to fourth dampers 910, 920, 930, and 940 may be omitted. The first to fourth dampers 910, 920, 930, and 940 may be provided in any one or a combination of two or more.

Hereinafter, the driving of the camera device according to the present embodiment will be described with reference to the drawings.

Figure 55:
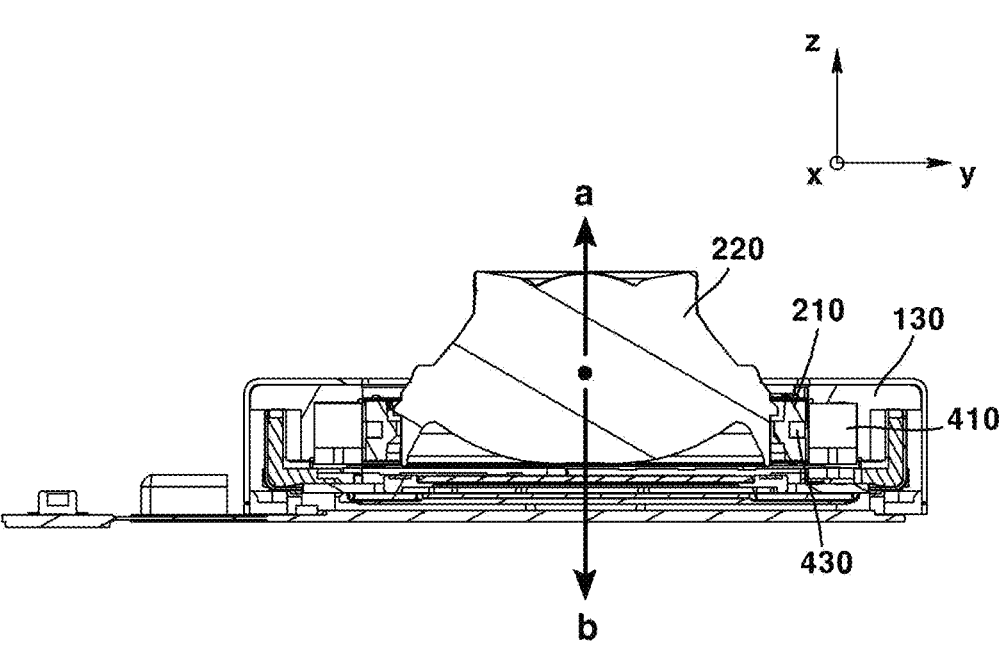
FIG. 55 is a diagram for explaining the operation of an autofocus function of a camera device according to the present embodiment.

FIG. 55 is a diagram for explaining the operation of an autofocus function of a camera device according to the present embodiment.

When power is applied to the AF coil 430 of the camera device 10 according to the present embodiment, an electromagnetic field is formed in the AF coil 430, and the AF coil 430 may move in an optical axis direction (z-axis direction) through electromagnetic interaction with the AF magnet 410. At this time, the AF coil 430 may move in an optical axis direction together with the first moving part 200 comprising the lens 220. In this case, since the lens 220 moves away from or closer to the image sensor 330, the focus of the subject can be adjusted. Any one or more of a current and a voltage may be applied to apply power to the AF coil 430.

When a current in a first direction is applied to the AF coil 430 of the camera device 10 according to the present embodiment, the AF coil 430 may move in an upper direction of the optical axis direction through electromagnetic interaction with the AF magnet 410 (refer to a in FIG. 55). At this time, the AF coil 430 may move the lens 220 in an upper direction of the optical axis direction so as to be moved away from the image sensor 330.

When a current in a second direction opposite to the first direction is applied to the AF coil 430 of the camera device 10 according to the present embodiment, the AF coil 430 can move in a lower direction (refer to b in FIG. 55) of the optical axis direction through electromagnetic interaction with the AF magnet 410. At this time, the AF coil 430 may move the lens 220 in a lower direction of the optical axis to be closer to the image sensor 330.

Figure 58:
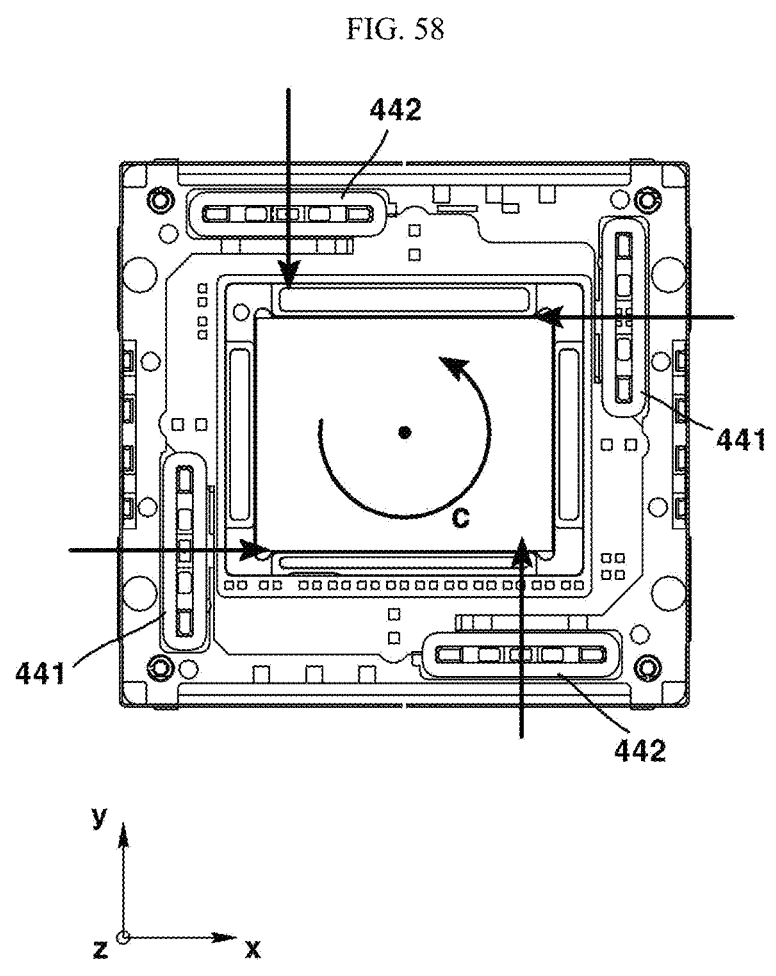

FIGS. 56 to 58 are diagrams for explaining an operation of the handshake correction function of a camera device according to the present embodiment.

When power is applied to the OIS coil 440 of the camera device 10 according to the present embodiment, an electromagnetic field is formed in the OIS coil 440, and the OIS coil 440 may move in a direction perpendicular to the optical axis direction through electromagnetic interaction with the OIS magnet 420. In addition, the OIS coil 440 may rotate about the optical axis through electromagnetic interaction with the OIS magnet 420. At this time, the OIS coil 440 may move or rotate together with the second moving part 300 comprising the image sensor 330. In the present embodiment, the OIS coil 440 may move the image sensor 330 so that the shaking of the camera device 10 detected by the gyro sensor 490 is compensated.

FIG. 56 is a diagram for explaining the x-axis shift handshake correction of a camera device according to the present embodiment.

When a current in a first direction is applied to the first coil 441 of the camera device 10 according to the present embodiment, the first coil 441 may move in one direction (refer to a in FIG. 56) among the first directions (x-axis direction) perpendicular to the optical axis direction through electromagnetic interaction with the OIS magnet 420. At this time, the first coil 441 may move the image sensor 330 in one direction among the first directions perpendicular to the optical axis direction. Conversely, when a current in a second direction opposite to the first direction is applied to the first coil 441, the first coil 441 may move in the other direction among the first directions (x-axis direction) perpendicular to the optical axis direction through electromagnetic interaction with the OIS magnet 420. At this time, the first coil 441 may move the image sensor 330 in the other direction among the first directions perpendicular to the optical axis direction.

FIG. 57 is a view for explaining y-axis shift handshake correction of a camera device according to the present embodiment.

When the current in a first direction is applied to the second coil 442 of the camera device 10 according to the present embodiment, the second coil 442 may move in one direction (refer to b in FIG. 57) among the second directions (y-axis direction) perpendicular to the optical axis direction through electromagnetic interaction with the OIS magnet 420. At this time, the second coil 442 may move the image sensor 330 in one direction among the second directions perpendicular to the optical axis direction. Conversely, when a current in a second direction opposite to the first direction is applied to the second coil 442, the second coil 442 may move in the other direction among the second directions (y-axis direction) perpendicular to the optical axis direction through electromagnetic interaction with the OIS magnet 420. At this time, the second coil 442 may move the image sensor 330 in the other direction among the second directions perpendicular to the optical axis direction.

FIG. 58 is a view for explaining the z-axis rolling handshake correction of a camera device according to the present embodiment.

When a current in a first direction is applied to the first coil 441 and the second coil 442 of the camera device 10 according to the present embodiment, the first coil 441 and the second coil 442 may rotate in one direction about the optical axis through electromagnetic interaction with the OIS magnet 420 (refer to c in FIG. 58). At this time, the first coil 441 and the second coil 442 may rotate the image sensor 330 in one direction about the optical axis. At this time, one direction may be counterclockwise direction. Conversely, when a current in a second direction opposite to the first direction is applied to the first coil 441 and the second coil 442, the first coil 441 and the second coil 442 may rotate in other direction about the optical axis through electromagnetic interaction with the OIS magnet 420. At this time, the first coil 441 and the second coil 442 may rotate the image sensor 330 in other direction about the optical axis. At this time, the other direction may be clockwise direction.

Hereinafter, an optical apparatus according to the present embodiment will be described with reference to the drawings.

Figure 59:
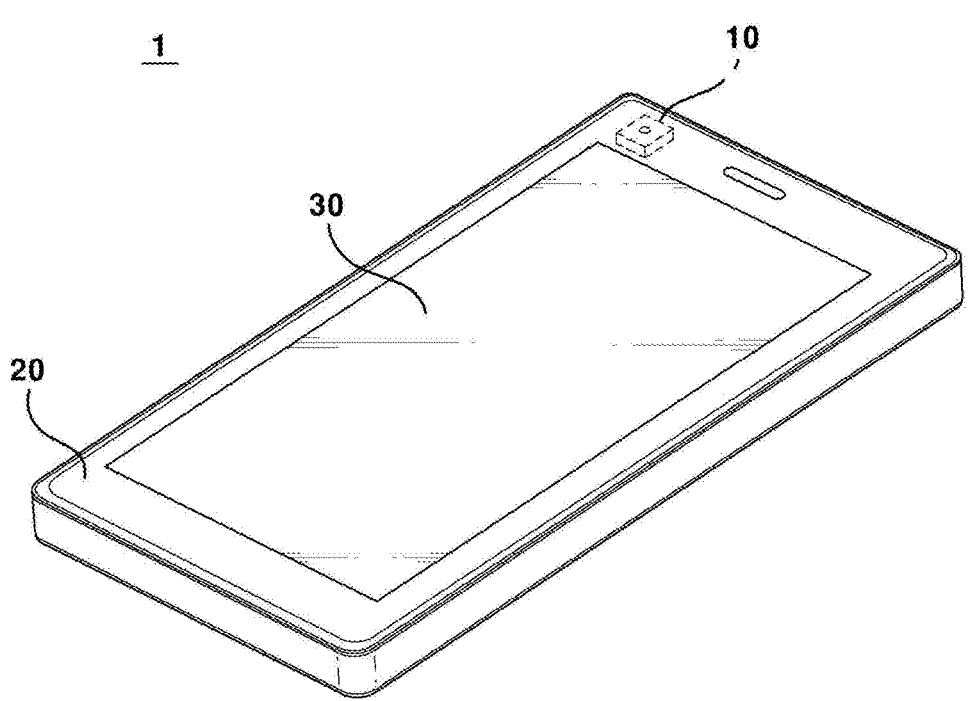
FIG. 59 is a perspective view of an optical apparatus according to the present embodiment.
Figure 60:
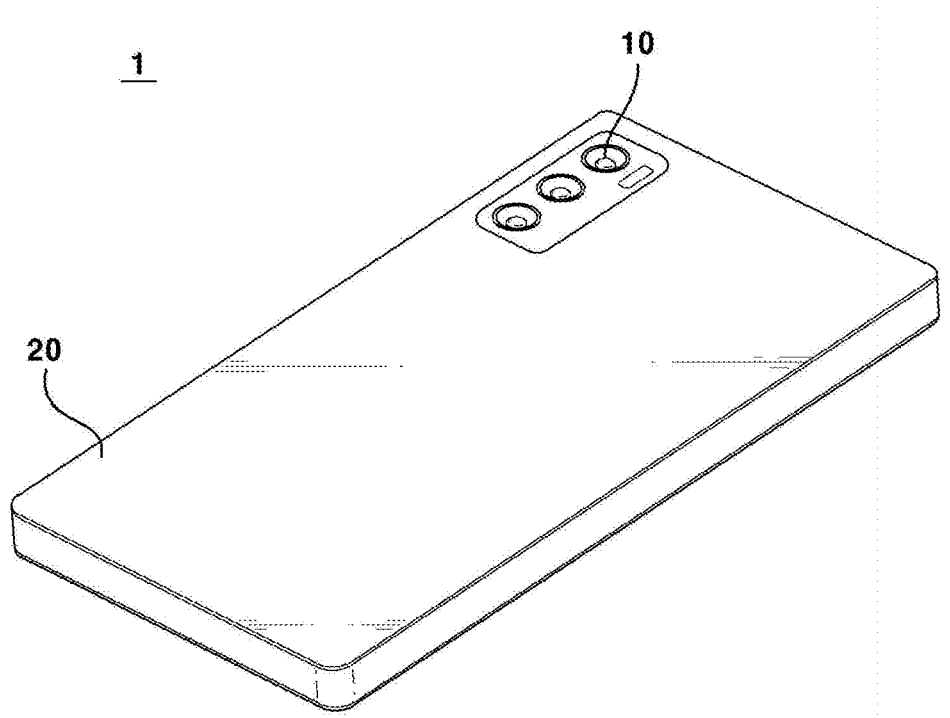
FIG. 60 is a perspective view of an optical apparatus according to the present embodiment, viewed from a different direction from FIG. 59.

FIG. 59 is a perspective view of an optical apparatus according to the present embodiment; and FIG. 60 is a perspective view of an optical apparatus according to the present embodiment, viewed from a different direction from FIG. 59.

The optical apparatus 1 may comprise any one or more among a hand phone, a portable phone, a portable terminal, a mobile terminal, a smart phone, a smart pad, a portable smart device, a digital camera, a laptop computer, a digital broadcasting terminal, a personal digital assistant (PDA), a portable multimedia player (PMP), and a navigation. The optical apparatus 1 may comprise any device for photographing images or photos.

The optical apparatus 1 may comprise a main body 20. The optical apparatus 1 may comprise a camera device 10. The camera device 10 may be disposed in the main body 20. The camera device 10 may photograph a subject. The optical apparatus 1 may comprise a display 30. The display 30 may be disposed in the main body 20. The display 30 may output any one or more of a video and an image photographed by the camera device 10. The display 30 may be disposed on the first surface of the main body 20. The camera device 10 may be disposed on any one or more of a first surface of the main body 20 and a second surface opposite to the first surface.

Although the embodiment of the present invention has been described above with reference to the accompanying drawings, those of ordinary skill in the art to which the present invention belongs will understand that the present invention may be embodied in other specific forms without changing the technical spirit or essential features thereof. Therefore, it should be understood that the embodiments described above are illustrative in all respects and not restrictive.

The invention claimed is:

1. A camera device comprising:
a first substrate;
a fixed part disposed on the first substrate and comprising a base and a housing; and
a moving part comprising an image sensor and a second substrate disposed adjacent to the image sensor, and configured to move in a direction parallel to an upper surface of the image sensor,
wherein the moving part comprises a connection substrate connecting the first substrate and the second substrate, and a shielding member disposed on the connection substrate,
wherein the connection substrate comprises a connection part connected to the second substrate, a terminal unit connected to the first substrate, and an extension part connecting the connection part and terminal unit,
wherein the extension part of the connection substrate comprises a first region extending in a first direction parallel to the upper surface of the image sensor, and a second region extending in a second direction different from the first direction and extending parallel to the upper surface of the image sensor; and
wherein the shielding member is disposed on the first region and the second region.

2. The camera device of claim 1, wherein the shielding member extends along the first region and the second region of the extension part of the connection substrate.

3. The camera device of claim 1, wherein the moving part comprises a holder coupled with the second substrate and having a protruded part coupled with the connection part of the connection substrate.

4. The camera device of claim 3, wherein at least a portion of the connection part is coupled with the holder.

5. The camera device of claim 1, comprising a wire disposed between the fixed part and the moving part; and an upper spring coupled with the housing,
wherein one end of the wire is connected with the upper spring.

6. The camera device of claim 1,
wherein the shielding member is coupled to an outer surface of the extension part of the connection substrate.

7. The camera device of claim 1, wherein the shielding member is electrically connected with a ground terminal of the image sensor.

8. The camera device of claim 1, wherein the shielding member comprises an electromagnetic interference (EMI) tape.

9. The camera device of claim 1, wherein the shielding member is configured to move together with the first region and the second region of the extension part of the connection substrate.

10. The camera device of claim 1, comprising a magnet and a coil configured to move the image sensor with respect to the fixed part,
wherein, when a current is applied to the coil, the coil is configured to move together with the image sensor.

11. The camera device of claim 1, comprising:
a lens disposed on an optical path of the image sensor; and
an auto focus (AF) driving unit configured to move the lens in an optical axis direction of the lens.

12. The camera device of claim 5, wherein the moving part comprises a holder coupled with the second substrate,
wherein the holder comprises a coupling member coupled with an other end of the wire,
wherein each of the coupling member and the upper spring comprises a hole passed by the wire, and
wherein a diameter of the hole of the coupling member is different from a diameter of the hole of the upper spring.

13. The camera device of claim 1,
wherein the connection part and the extension part are connected by a bent part having a bent shape, and
wherein the connection substrate comprises a hole formed on the bent part.

14. The camera device of claim 13, wherein a length of the hole of the connection substrate in an optical axis direction of the image sensor is greater than a length of the hole of the connection substrate in a direction perpendicular to the optical axis direction.

15. An optical apparatus comprising:
a main body;
the camera device of claim 1 disposed on the main body; and
a display disposed on the main body and configured to output a video or an image photographed by the camera device.

16. A camera device comprising:
a first substrate;
a base disposed on the first substrate;
a second substrate spaced apart from the first substrate;
an image sensor disposed on the second substrate;
a magnet and a coil configured to move the image sensor with respect to the base;
a connection substrate connecting the first substrate and the second substrate; and
a shielding member disposed on the connection substrate,
wherein the connection substrate comprises a connection part connected to the second substrate, a terminal unit connected to the first substrate, and an extension part connecting the connection part and terminal unit, wherein the extension part of the connection substrate comprises a first region extending in a first direction parallel to an upper surface of the image sensor, and a second region extending in a second direction different from the first direction and extending parallel to the upper surface of the image sensor; and wherein the shielding member is disposed on the first region and the second region.

17. The camera device of claim 16, wherein the shielding member extends along the first region and the second region of the extension part of the connection substrate.

18. The camera device of claim 16, wherein the shielding member is coupled to an outer surface of the extension part of the connection substrate.

19. The camera device of claim 16, wherein the shielding member is configured to move together with the first region and the second region of the extension part of the connection substrate.

20. The camera device of claim 16, wherein the connection part and the extension part are connected by a bent part having a bent shape, and wherein the connection substrate comprises a hole formed on the bent part.

* * * * *